(12) United States Patent
El-Akkad et al.

(10) Patent No.: US 12,455,364 B2
(45) Date of Patent: Oct. 28, 2025

(54) DETECTING, TRACKING, AND TRANSMITTING TO IDENTIFIED OBJECTS USING MODELS IN A MODULAR SYSTEM

(71) Applicant: Anduril Industries, Inc., Costa Mesa, CA (US)

(72) Inventors: Sam El-Akkad, Poway, CA (US); Christopher Fischer, Lake Forest, CA (US); Travis Whitaker, Costa Mesa, CA (US); Bryden Pearson, Irvine, CA (US); Todd Berk, Lake Forest, CA (US); Thao Pham, San Diego, CA (US); Jon Hsu, Yorba Linda, CA (US); Cameron Dart, Fountain Valley, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 396 days.

(21) Appl. No.: 17/978,807

(22) Filed: Nov. 1, 2022

(65) Prior Publication Data
US 2024/0094375 A1    Mar. 21, 2024

Related U.S. Application Data

(60) Provisional application No. 63/420,247, filed on Oct. 28, 2022, provisional application No. 63/365,115, filed on May 20, 2022.

(51) Int. Cl.
*G01S 13/58* (2006.01)
*G01S 13/02* (2006.01)
(Continued)

(52) U.S. Cl.
CPC ........ *G01S 13/582* (2013.01); *G01S 13/0209* (2013.01); *G01S 13/524* (2013.01)

(58) Field of Classification Search
CPC ... G01S 13/582; G01S 13/0209; G01S 13/524
See application file for complete search history.

(56) References Cited

U.S. PATENT DOCUMENTS

| | | |
|---|---|---|
| 6,094,164 A | 7/2000 | Murphy |
| 6,232,928 B1 | 5/2001 | Zimmerman et al. |
| (Continued) | | |

FOREIGN PATENT DOCUMENTS

| | | |
|---|---|---|
| CN | 104363736 A | 2/2015 |
| CN | 108696774 A | 10/2018 |
| (Continued) | | |

OTHER PUBLICATIONS

U.S. Appl. No. 18/051,743, Modular System for Detecting, Tracking, and Transmitting to Identified Objects, filed Nov. 1, 2022.
(Continued)

*Primary Examiner* — Robert W Hodge
*Assistant Examiner* — Helena H Seraydaryan
(74) *Attorney, Agent, or Firm* — Knobbe, Martens, Olson & Bear, LLP; Andy Pho

(57) ABSTRACT

A modular, radio frequency ("RF") system includes one or more directional antennas and is configured with both hardware and software components to enable the RF system to monitor (e.g., detect or track signals or objects) and/or interact with (e.g., track signals or objects, or transmit signals) objects in particular directions. The RF system includes one or more machine learning models to determine, based on received signals, one or more signals to transmit.

20 Claims, 13 Drawing Sheets

(51) Int. Cl.
  *G01S 13/52* (2006.01)
  *G01S 13/524* (2006.01)

(56) References Cited

U.S. PATENT DOCUMENTS

| | | | |
|---|---|---|---|
| 7,046,513 B2 | 5/2006 | Nishiyama et al. | |
| 7,129,908 B2 | 10/2006 | Edward et al. | |
| 7,859,835 B2 | 12/2010 | Puzella et al. | |
| 8,494,464 B1 | 7/2013 | Kadambe et al. | |
| 9,182,481 B2 * | 11/2015 | Bowring | G01S 13/04 |
| 9,545,991 B1 | 1/2017 | Alley et al. | |
| 9,555,873 B1 | 1/2017 | Alley et al. | |
| 9,580,165 B1 | 2/2017 | Alley et al. | |
| 9,902,487 B2 | 2/2018 | Alley et al. | |
| 9,902,488 B2 | 2/2018 | Alley et al. | |
| 10,494,081 B2 | 12/2019 | Alley et al. | |
| 10,506,436 B1 | 12/2019 | Newman et al. | |
| 10,812,978 B2 | 10/2020 | Newman et al. | |
| 10,965,388 B2 | 3/2021 | Patel et al. | |
| 11,091,227 B2 | 8/2021 | Lebo et al. | |
| 11,117,649 B2 | 9/2021 | Alley et al. | |
| 11,182,043 B2 | 11/2021 | Luckey et al. | |
| 11,214,370 B2 | 1/2022 | Alley et al. | |
| 11,240,932 B1 | 2/2022 | Andrade | |
| 11,268,651 B2 | 3/2022 | Carlson et al. | |
| 11,350,277 B2 | 5/2022 | Newman et al. | |
| 11,385,659 B2 | 7/2022 | Levin et al. | |
| 11,443,640 B2 | 9/2022 | Luckey et al. | |
| 11,585,886 B1 | 2/2023 | Meyer et al. | |
| 11,916,279 B1 | 2/2024 | El-Akkad et al. | |
| 12,255,404 B2 | 3/2025 | El-Akkad et al. | |
| 2006/0002084 A1 | 1/2006 | Wei | |
| 2007/0058339 A1 | 3/2007 | Hoffman et al. | |
| 2007/0247809 A1 | 10/2007 | McClure | |
| 2010/0027222 A1 | 2/2010 | Abert | |
| 2011/0176762 A1 | 7/2011 | Fujikata et al. | |
| 2012/0014154 A1 | 1/2012 | Siracki et al. | |
| 2013/0144166 A1 * | 6/2013 | Specht | A61B 8/4488 600/441 |
| 2013/0279111 A1 | 10/2013 | Lee | |
| 2014/0015693 A1 | 1/2014 | Komoguchi et al. | |
| 2015/0264742 A1 | 9/2015 | Merola | |
| 2015/0349810 A1 | 12/2015 | Baxley et al. | |
| 2015/0350228 A1 | 12/2015 | Baxley et al. | |
| 2015/0382508 A1 | 12/2015 | Tatta et al. | |
| 2017/0031005 A1 | 2/2017 | Jaeger et al. | |
| 2017/0094527 A1 * | 3/2017 | Shattil | H04K 3/92 |
| 2017/0192089 A1 | 7/2017 | Parker et al. | |
| 2017/0269650 A1 | 9/2017 | Kilgore et al. | |
| 2018/0081355 A1 | 3/2018 | Magy | |
| 2018/0246547 A1 | 8/2018 | Degner et al. | |
| 2018/0308013 A1 * | 10/2018 | O'Shea | G06N 20/00 |
| 2019/0053400 A1 | 2/2019 | Hendrix et al. | |
| 2019/0146076 A1 | 5/2019 | Kravets et al. | |
| 2019/0180630 A1 | 6/2019 | Kleinbeck | |
| 2019/0285748 A1 | 9/2019 | DeVries et al. | |
| 2020/0102065 A1 | 4/2020 | Alley et al. | |
| 2020/0143279 A1 | 5/2020 | West et al. | |
| 2020/0167059 A1 | 5/2020 | Luckey et al. | |
| 2020/0184832 A1 | 6/2020 | Kleinbeck | |
| 2020/0363824 A1 | 11/2020 | Levin et al. | |
| 2021/0065564 A1 | 3/2021 | Vacek | |
| 2021/0211212 A1 | 7/2021 | Derr et al. | |
| 2021/0249701 A1 | 8/2021 | Shine et al. | |
| 2021/0371067 A1 | 12/2021 | Lebo et al. | |
| 2021/0403143 A1 | 12/2021 | Alley et al. | |
| 2022/0027038 A1 | 1/2022 | Luckey et al. | |
| 2022/0075056 A1 | 3/2022 | Esmail | |
| 2022/0166909 A1 | 5/2022 | Kelly et al. | |
| 2022/0166915 A1 | 5/2022 | Kelly et al. | |
| 2022/0166948 A1 | 5/2022 | Kelly et al. | |
| 2022/0174235 A1 | 6/2022 | Kelly et al. | |
| 2022/0187416 A1 | 6/2022 | Miu et al. | |
| 2022/0214009 A1 | 7/2022 | Carlson et al. | |
| 2022/0256343 A1 | 8/2022 | Newman et al. | |
| 2022/0274704 A1 | 9/2022 | Alley et al. | |
| 2022/0335840 A1 | 10/2022 | Luckey et al. | |
| 2023/0375693 A1 | 11/2023 | El-Akkad et al. | |
| 2023/0408619 A1 | 12/2023 | El-Akkad et al. | |
| 2024/0094372 A1 | 3/2024 | El-Akkad et al. | |
| 2024/0094378 A1 | 3/2024 | El-Akkad et al. | |
| 2024/0097352 A1 | 3/2024 | El-Akkad et al. | |
| 2024/0097353 A1 | 3/2024 | El-Akkad et al. | |
| 2024/0372272 A1 | 11/2024 | El-Akkad et al. | |

FOREIGN PATENT DOCUMENTS

| | | | |
|---|---|---|---|
| CN | 213580570 U | | 6/2021 |
| DE | 102021209451 A1 | * | 3/2022 |
| EP | 4336210 | | 3/2024 |
| TW | M504351 U | | 7/2015 |
| WO | WO 2021/108361 | | 6/2021 |
| WO | WO 2021/187455 | | 9/2021 |
| WO | WO 2023/225417 | | 11/2023 |

OTHER PUBLICATIONS

U.S. Appl. No. 18/051,801, Modular System for Detecting, Tracking, and Transmitting to Identified Objects, filed Nov. 1, 2022.
U.S. Appl. No. 17/978,736, Modular System for Detecting, Tracking, and Transmitting to Identified Objects, filed Nov. 1, 2022.
U.S. Appl. No. 17/978,822, Modular System for Detecting, Tracking, and Transmitting to Identified Objects, filed Nov. 1, 2022.
U.S. Appl. No. 17/978,701, Modular System for Detecting, Tracking, and Transmitting to Identified Objects, filed Nov. 1, 2022.
U.S. Appl. No. 17/978,868, Detecting, Tracking, and Transmitting to Identified Objects Using Models in a Modular System, filed Nov. 1, 2022.
U.S. Appl. No. 17/978,821, Detecting, Tracking, and Transmitting to Identified Objects Using Models in a Modular System, filed Nov. 1, 2022.
European Search Report in application No. EP 23172878, dated Jan. 23, 2024, in 8 pages.
Invitation to Pay Additional Fees in Application No. PCT/US2023/062772, mailed on Mar. 29, 2023, in 5 pages.
International Search Report and Written Opinion in Application No. PCT/US2023/062772, mailed on May 22, 2023, in 32 pages.
Examination Report received in Australian application No. 2023202807, dated Jun. 23, 2023, in 5 pages.
U.S. Appl. No. 18/773,330, Modular System for Detecting, Tracking, and Transmitting to Identified Objects, filed Jul. 15, 2024.
Extended European Search Report in application No. EP 23720532, dated Mar. 6, 2024, in 10 pages.
Office Action in Taiwan application No. 112118626, dated Jun. 27, 2024, in 11 pages.
Examination Report in European application No. 23172878.3, dated Oct. 4, 2024, in 5 pages.
Office Action with English translation in Japanese application No. 2023-528636, dated Nov. 27, 2024, in 9 pages.
International Preliminary Report on Patentability and Written Opinion in Application No. PCT/US2023/062772, dated Nov. 7, 2024, in 14 pages.

* cited by examiner

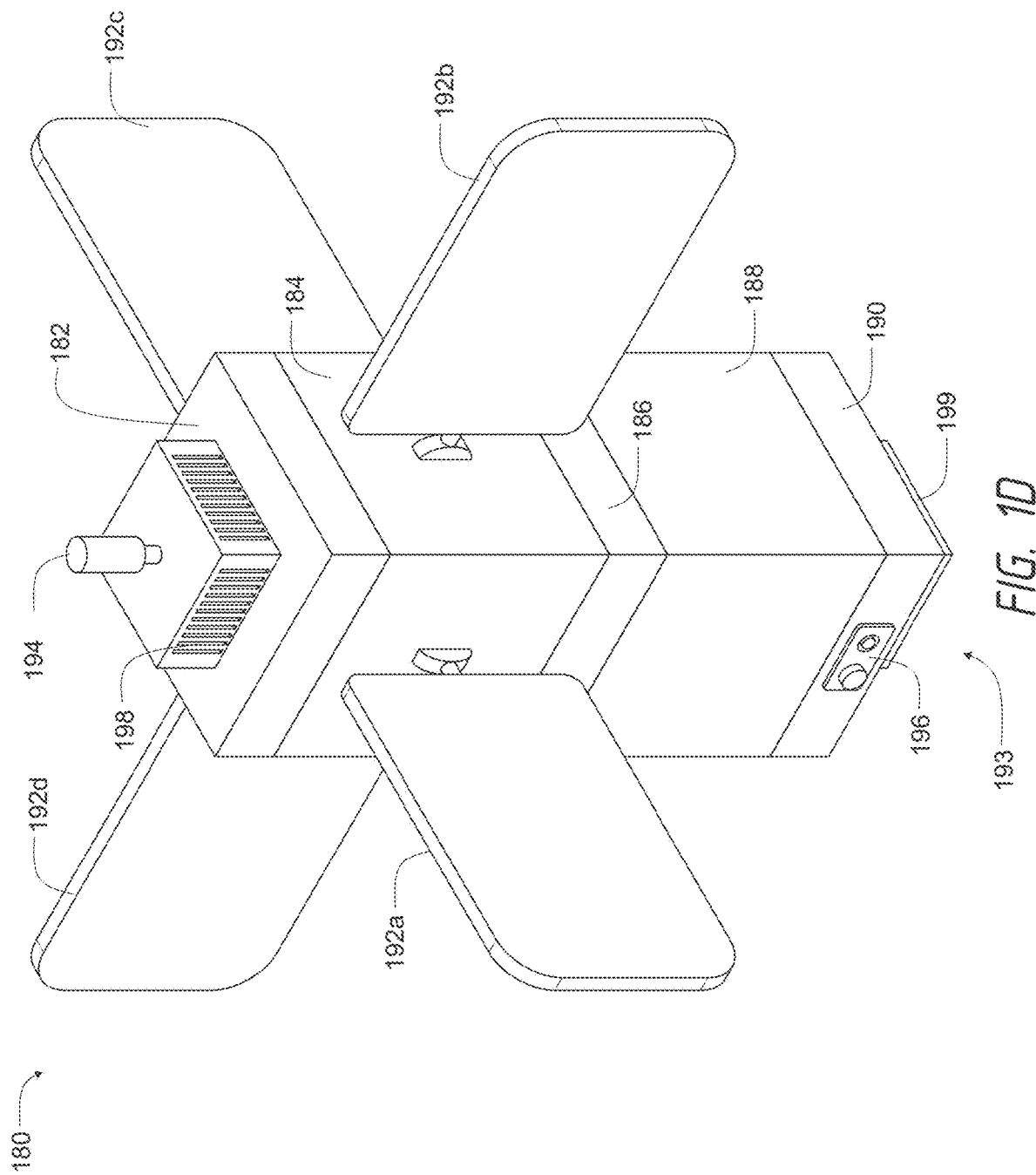

DETECTING, TRACKING, AND TRANSMITTING TO IDENTIFIED OBJECTS USING MODELS IN A MODULAR SYSTEM

CROSS-REFERENCE TO RELATED APPLICATIONS

This application claims benefit of U.S. Provisional Patent Application No. 63/365,115, filed May 20, 2022, and titled "MODULAR SYSTEM FOR DETECTING, TRACKING, AND TRANSMITTING TO IDENTIFIED OBJECTS," and U.S. Provisional Patent Application No. 63/420,247, filed Oct. 28, 2022, and titled "MODULAR SYSTEM FOR DETECTING, TRACKING, AND TRANSMITTING TO IDENTIFIED OBJECTS." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to modular, directional transceiver systems and methods for detecting, tracking, and/or transmitting to identified objects. Embodiments of the present disclosure further relate to devices, systems, and methods for locating or identifying an object in three-dimensional space, tracking the object's movement or location, determining properties associated with one or more signals emanating from or near the object, and generating and transmitting one or more signals in the direction of the object.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Radio frequency ("RF") systems may provide monitoring and/or transmitting functionality for particular radio frequencies. Such RF systems may generally include an omnidirectional antenna, and may be configured to either transmit, or receive, particular radio frequencies.

SUMMARY

The systems, methods, and devices described herein each have several aspects, no single one of which is solely responsible for its desirable attributes. Without limiting the scope of this disclosure, several non-limiting features will now be described briefly.

To monitor a surrounding area, a plurality of specialized equipment can be installed to identify objects, track objects, and transmit signals towards objects. Conventional equipment, and its associated software components, if any, is typically manufactured and/or programmed for one function or purpose only and may be limited to such preconfigured functions. These conventional systems may not be adjusted easily, and in some cases, they cannot be adjusted at all. For example, if the systems can monitor over a particular RF range, the system may not be easily updated to monitor additional RF ranges without significant expense or effort (e.g., new hardware, rewriting of software, and/or the like). Such systems also may not be moved around or installed in new locations or orientations without testing, calibration, new hardware, and the like. Further, such systems may make use of omni directional antennas that radiates in, or receives from, many directions simultaneously, which may eliminate the opportunity to target signal transmission in particular directions, and may have high power requirements.

The systems, methods, and devices of the present disclosure (generally collectively referred to herein as the "RF system") may overcome one or more of these disadvantages, and may include a modular, adaptable, and movable system that can be updated and/or reprogrammed to execute multiple or different purposes and functions.

Hardware components of the described radio frequency ("RF") system can include one or more directional broadbandwidth antennas, one or more module enclosures, one or more processing modules, and one or more RF modules, among other hardware components described in more detail herein. The one or more directional antennas can be physically positioned and configured to transmit or receive at varying power levels and frequencies in one or more specific directions, such that the antennas can collectively provide greater directionality and sensitivity in certain direction(s) than in other directions. Hardware components of the described systems can also include a direction finder, also referred to herein as a radio direction finder or direction finding antenna. The direction finder can use reception of radio waves to determine the direction in which an object is located. In various embodiments, by combining the direction information from multiple sources (e.g., other direction finders in the area, other systems, or one or more of the directional broad-bandwidth antennas, and/or the like), the source of a transmission may be located (e.g., via triangulation or other similar means). In various embodiments, each directional antenna and its associated electronic circuitry can operate independently as well as in a coordinated way with the other directional antennas. The antennas can also be configured to comprise automated or manual adjustability with respect to a vertical angle so that the antenna can face more downwards towards the ground or be adjusted to face more upwards towards the sky.

The RF system can advantageously be modular to enable multiple configurations for various applications. The modularity of the RF system can be found in both the modularity of a particular RF system that can operate on its own (including in coordination with one or more additional systems or sensors), and multiple RF systems that can operated in coordination with one another (including in coordination with one or more additional systems or sensors). For example, the RF system can be implemented with one module enclosure, two module enclosures, or more module enclosures. In the example of two or more module enclosures, the module enclosures of the RF system may be joined together by one or more joining enclosures. Accordingly, in an implementation the RF system may include two stacked module enclosures, joined together by a joining enclosure. In the various implementations, the RF system may further include components for mounting the RF system, such as one or more mounts, clips, slides, pins, and/or the like. Advantageously, the RF system, given its modularity, may be appropriately configured for a given application, and mounted on a tripod, a vehicle, a building, and/or the like.

Each of the module enclosures may house one or more processing modules, one or more RF modules, and one or more power supply modules, as described herein. In various embodiments, a single module enclosure can be connected to two directional broad-bandwidth antennas, where the antennas can be placed at a single location, or the antennas can be placed a distance apart from each other (e.g., 5, 10, 100 feet apart) and connected to the same module enclosure. In various embodiments, the RF modules can include power amplifier technology and positioning, navigation, and timing ("PNT") capabilities (which, in some implementations may be provided in the direction finder).

In various embodiments, the processing modules can include a machine learning component that can be used to assist the RF system in detecting and/or identifying one or more RF signals captured by a connected antenna. For example, the machine learning component can implement machine learning ("ML") algorithms, artificial intelligence ("AI") algorithms, and/or any other types of algorithms (generally collectively referred to herein as "AI/ML algorithms", "AI/ML models", or simply as "ML algorithms", "ML models", and/or the like) that may, for example, implement models that are executed by one or more processors. Having an ML model to identify RF signals can advantageously provide significant improvements as compared to conventional systems because many detected signals may include some level of interference, be relatively weak and hard to detect, or otherwise hard to identify due to other factors. In various embodiments, the machine learning component can use one or more machine learning algorithms to implement one or more models or parameter functions for the detections/identifications. The machine learning component can be configured to apply a model that can help detect which types of RF signals (e.g., a range of RF signals, particular frequencies or combinations of frequencies, and/or the like) indicate which types of objects. Thus, the model can be applied, by the RF system, to received or captured RF signals for identification purposes. For example, various embodiments, the machine learning model of the RF system can be trained by: (1) raw signal sampling, (2) application of trained model, and/or (3) output of classes and probabilities (e.g., associated with type of objects). Then, for example, the processing module can identify a type of object based on the (3) output of classes and probabilities. Also, in various embodiments, application of the trained machine learning model can comprise the preliminary step of (0) filtering base line signal and/or friendly signals.

In various embodiments, the RF system (e.g., via one or more processing modules and/or one or more RF modules) can use identified types of objects (e.g., output from the applied machine learning model) to generate one or more new signals and, using one or more of the directional antennas, transmit the new signals. The new signals may be transmitted in the direction of the identified signal or one or more objects. Generating a signal based on the identified signal can advantageously be beneficial due to increased power efficiency/optimization. For example, instead of transmitting signals in all frequency bands, only signal in a specific frequency or narrow range of frequencies can be transmitted instead, thereby increasing power efficiency and/or signal power to reach father distances.

In various embodiments, there may be other sensors or systems (e.g., and including other RF systems in the area) that can connect to the RF system to provide additional data that can be used to: (1) further train the machine learning model; (2) assist RF system in continuing to track, or begin tracking, an object or signal; and/or (3) generate and transmit, or continue generating and transmitting, a specific signal in the direction of an object, among other functions.

In various embodiments, the RF system may include many other advantageous characteristics, features, functionality, and/or aspects, including, for example, a configurable antenna mount that can be installed without tools and which may enable adjustment of an angle of the directional antennas; a physical modular configuration and materials that efficiently dissipate heat from the components of the system to enable the RF system to operate in high temperature and/or extreme environments; a physical modular configuration that provides physical protection to the components for use in, for example, dirty or extreme environments; and/or electromagnetic interference ("EMI") shielding for components of the RF system; among others described herein.

Further, according to various embodiments, various interactive graphical user interfaces can be provided for allowing various types of users to interact with the systems and methods described herein to, for example, generate, review, and/or modify data captured by or used by one or more RF systems or connected systems.

The interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Accordingly, in various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, and/or the like.

Various embodiments of the present disclosure provide improvements to various technologies and technological fields, and practical applications of various technological features and advancements. For example, as described above, some existing systems are limited in various ways, and various embodiments of the present disclosure provide significant improvements over such systems, and practical applications of such improvements. Additionally, various embodiments of the present disclosure are inextricably tied to, and provide practical applications of, computer technology. In particular, various embodiments rely on specialized hardware installed in specific locations as well as software components to improve energy and processing efficiency. Such features and others are intimately tied to, and enabled by, computer technology, artificial intelligence, and digital signal technology and would not exist except for computer technology, artificial intelligence, and digital signal technology. For example, the RF system, processing module, RF module, and signal detection, generation, and transmission functionality and interactions with detected objects/signals described herein in reference to various embodiments cannot reasonably be performed by humans alone, without the computer and technology upon which they are implemented. Further, the implementation of the various embodiments of the present disclosure via computer technology enables many of the advantages described herein, including more efficient interaction with, and analysis of, various types of electronic data, and the like.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 1D illustrates a perspective view of an example implementation of an RF system comprising two module enclosures, according to various embodiments of the present disclosure;

DETAILED DESCRIPTION

Figure 1A:
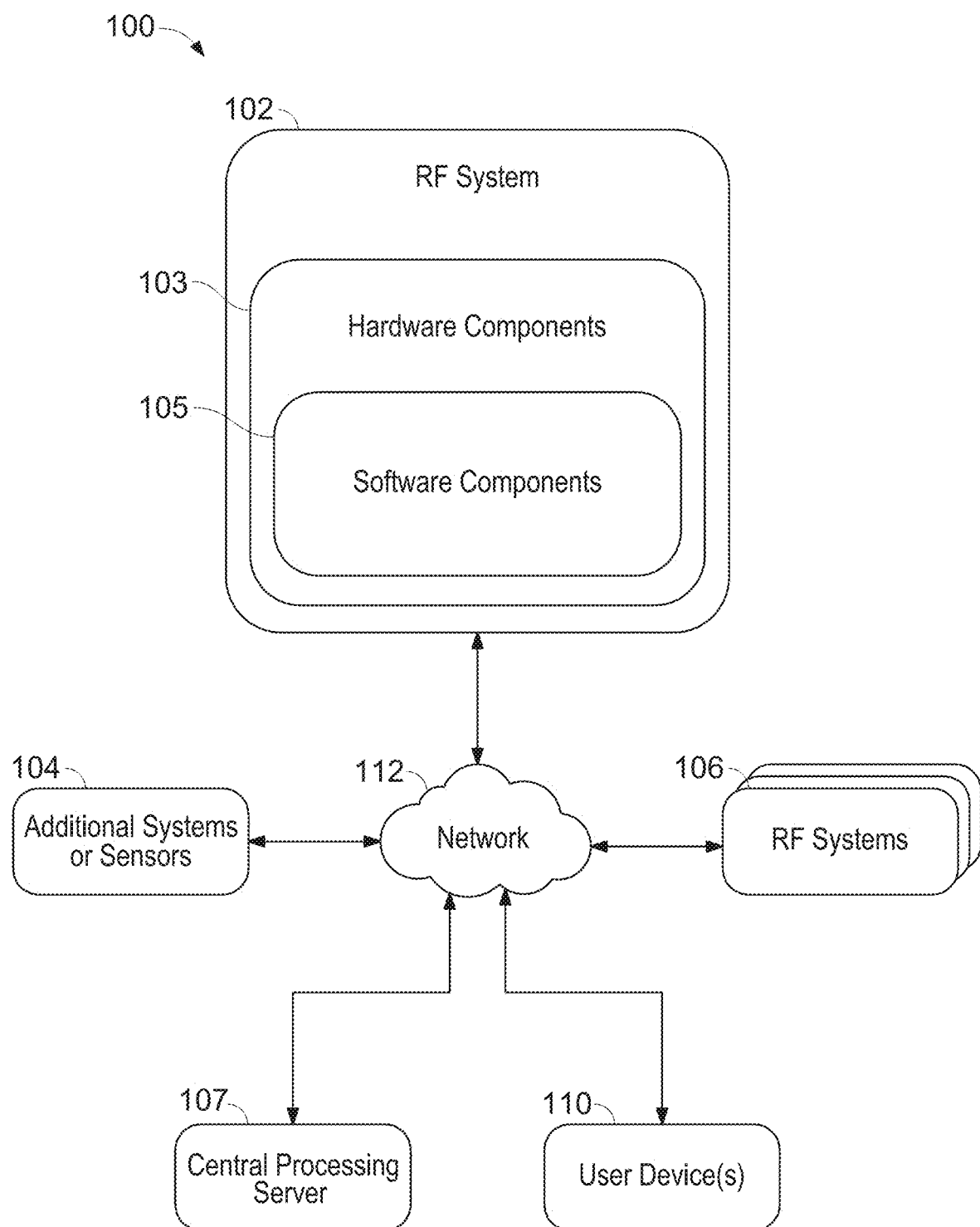
FIG. 1A illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, to monitor a surrounding area, a plurality of specialized equipment can be installed to identify objects, track objects, and transmit signals towards objects. Conventional equipment, and its associated software components, if any, is typically manufactured and/or programmed for one function or purpose only and may be limited to such preconfigured functions. These conventional systems may not be adjusted easily, and in some case, they cannot be adjusted at all. For example, if the systems can monitor over a particular RF range, the system may not be easily updated to monitor additional RF ranges without significant expense or effort (e.g., new hardware, rewriting of software, and/or the like). Such systems also may not be moved around or installed in new locations or orientations without testing, calibration, new hardware, and the like. Further, such systems may make use of omni directional antennas that radiates in, or receives from, many directions simultaneously, which may eliminate the opportunity to target signal transmission in particular directions, and may have high power requirements.

As also mentioned above, the systems, methods, and devices of the present disclosure (generally collectively referred to herein as the "RF system") may overcome one or more of these disadvantages, and may include a modular, adaptable, and movable system that can be updated and/or reprogrammed to execute multiple or different purposes and functions. The RF system may advantageously include the capability of being updated over time for new purposes not currently considered at the time of manufacturing or installation. The systems, methods, and devices described herein pertain to hardware and software components related to one or more modular, adaptable, and movable systems that can be reprogrammed to execute multiple purposes and functions at once or over time.

Hardware components of the described radio frequency ("RF") system can include one or more directional broad-bandwidth antennas, one or more module enclosures, one or more processing modules, and one or more RF modules, among other hardware components described in more detail below. With respect to directionality, the one or more directional antennas can be physically positioned and configured to transmit or receive at varying power levels and frequencies in one or more specific directions, such that the antennas can collectively provide greater directionality and sensitivity in certain direction(s) than in other directions. Directional antennas can provide increased performance over dipole antennas, or omnidirectional antennas, when greater concentration of radiation in a certain direction is desired. Additionally, such directional broad-bandwidth antennas can be used to transmit, receive, or transmit and receive radio signals with a wide frequency spectrum. In various embodiments, the antennas can be configured to transmit and/or receive radio signals in a subset of the wide frequency spectrum. For example, there may be nearby equipment that emits signals in a particular frequency range where an antenna is facing and the system can be programmed to filter received signals (e.g., with software) so as to not interfere with analysis of received signals and/or filter transmitted signals (e.g., with software or additional digital signal filtering equipment) so as to minimize or remove interference with the operation of the nearby equipment. Accordingly, the RF system may selectively transmit signals of varying powers via the various direction antennas.

Hardware components of the described systems can also include a direction finder, also referred to herein as a radio direction finder or direction finding antenna. The direction finder can use reception of radio waves to determine the direction in which an object is located. In various embodiments, by combining the direction information from multiple sources (e.g., other direction finders in the area, other systems, or one or more of the directional broad-bandwidth antennas, and/or the like), the source of a transmission may be located (e.g., via triangulation or other similar means). The direction finder can be used to detect any radio source. The direction finder may communicate with one or more (or all) of the processing modules of the RF system in any given configuration.

In various embodiments, each directional antenna and its associated electronic circuitry can operate independently as well as in a coordinated way with the other directional antennas. For example, a single directional antenna can be configured to face and monitor a 90° field of view, and four of the described directional antennas can be configured to monitor a full 360° (or approximately 360°) field of view. In various embodiments, there can be additional antennas used (e.g., 5 antennas each covering 72°, 6 antennas each covering 60°, 7 antennas each covering about 52°, and/or the like), fewer antennas used (e.g., 1 antenna each covering 360°, 2 antennas each covering 180°, 3 antennas each covering 120°), and/or some fields of view can overlap as well (e.g., 4 antennas with each antenna covering 120°, or the like). The antennas can also be configured to comprise automated or manual adjustability with respect to a vertical angle so that the antenna can face more downwards towards the ground or be adjusted to face more upwards towards the sky. In some applications, there may be an optimum angle that the antenna can adjust to based on empirical data or artificial intelligence/machine learning.

In various embodiments, the directional broad-bandwidth antennas and their associated electronic circuitry can comprise multiple physical configurations. For example, the antennas and associated electronic circuitry can be configured to be detachable and/or stackable so that multiple antennas can be used in one specified location. For example, there might be two antennas at one location, where each antenna is configured to monitor a 90° field of view, for a total field of view of 180° being monitored by the two antennas.

The RF system can advantageously be modular to enable multiple configurations for various applications. The modularity of the RF system can be found in both the modularity of a particular RF system that can operate on its own (including in coordination with one or more additional systems or sensors), and multiple RF systems that can operated in coordination with one another (including in coordination with one or more additional systems or sensors). For example, the RF system can be implemented with one module enclosure, two module enclosures, or more module enclosures. In the example of two or more module enclosures, the module enclosures of the RF system may be joined together by one or more joining enclosures. Accordingly, in an implementation the RF system may include two stacked module enclosures, joined together by a joining enclosure. In the various implementations, the RF system may also include an upper enclosure and a lower enclosure, and may further include components for mounting the RF system, such as one or more mounts, clips, slides, pins, and/or the like. Advantageously, the RF system, given its modularity, may be appropriately configured for a given application, and mounted on a tripod, a vehicle, a building, and/or the like.

Each of the module enclosures may house one or more processing modules, one or more RF modules, and one or more power supply modules, as described herein. In various implementations, the processing modules may comprise system-on-module ("SOM") aspects, and may thus be referred to herein as "SOM modules". Each of the module enclosures, and associated processing module(s), RF module(s), and power supply module(s) may support one or more directional antennas and/or a direction finder, as described herein.

In an implementation, each of the module enclosures includes a single processing module/SOM module, two RF modules, and a power supply module. In this implementation, each of the RF modules supports a single directional antenna (and thus the module enclosure supports up to two directional antennas), the processing module/SOM module supports the two RF modules, and the power supply module provides power to the processing module/SOM module and the two RF modules. Accordingly, in a configuration in which the RF system includes one module enclosure, the RF system can support up to two directional antennas, and in a configuration in which the RF system includes two module enclosures, the RF system can support up to four directional antennas. Additionally, in any of these configurations the RF system can additionally support one or more direction finders via one or more components of the module enclosures (e.g., the processing module/SOM module, the RF module(s), and/or the power supply module).

As noted above, each module enclosure of the RF system can include processing modules and RF modules that include electronic circuitry that can be configured to connect to and operate 1, 2, 3, 4, or more individual directional broad-bandwidth antennas. For example, each processing module can comprise one or more motherboards, one or more processors, one or more graphics processing units ("GPUs"), one or more software-defined radio ("SDR") transceivers, and/or the like, and can be configured to control and operate one or more directional antennas. In various embodiments, a single module enclosure can be connected to two directional broad-bandwidth antennas, where the antennas can be placed at a single location, or the antennas can be placed a distance apart from each other (e.g., 5, 10, 100 feet apart) and connected to the same module enclosure.

In various embodiments, an RF system can be manufactured or assembled with a module enclosure (among other hardware components as described herein) and one or more antennas that can be configured to have a compact, movable, and/or adaptable design. Additionally, in various embodiments, the RF system can be manufactured into a compact and/or lightweight design so that the RF system can be placed in a variety of positions and locations. For example, in an implementation, the RF system may have a total height (e.g., length) of between about 20 cm and about 250 cm, and may have a total weight of between about 10 kg and about 100 kg. Additionally, the directional broad-bandwidth antennas can be disconnected from the module enclosure of the RF system and swapped with different types of antennas that might provide different functionality (e.g., wider or narrower field of view such as omnidirectional, longer range sensitivity, shorter range sensitivity, and the like) and/or different physical attributes for improved mobility or adaptability depending on the application (e.g., reduced or increased size, different shape, and the like). For example, if the RF system is going to be moved from the roof of a building onto a vehicle, there may be the need to use one or more different antennas that are configured to be secured safely to the vehicle while the vehicle is in operation, and satisfy the new requirements associated with the placement at the same time. Such requirements might include being able to monitor a wider field of view than the prior position of being placed on the side of a building, and the wider field of view can be achieved with additional antennas and/or different antennas that are configured differently.

The RF system can also advantageously include a physical modular configuration and materials that efficiently dissipate heat from the components of the system to enable the RF system to operate in high temperature and/or extreme environments. For example, the upper and lower enclosures can include fans, and the upper and lower enclosures, the module enclosure(s), and the joining enclosures, if applicable, together can provide a cavity or channel for air to flow through the RF system to cool the various components of the RF system. The module enclosures can, for example, include heat sinks within the cavity or channel, and thermally coupled to the processing modules, the RF modules, and power supply modules, over which air may flow as pushed or pulled by the fans to cool the components of the RF system. The fans may cause air to flow up from the lower enclosure, through the heat sinks of one or more module enclosures, and out through the upper enclosure.

The RF system can also advantageously include a physical modular configuration that provides physical protection to the components for use in, for example, dirty or extreme environments. For example, each of the module enclosures can include cavities into which the processing module(s), the RF module(s), and the power supply module(s) can be placed. The cavities can be sealed or hermetically sealed from the outside environment. The module enclosures and the upper, lower, and joining enclosures can also include additional cavities for routing of connections and wiring among the various components. These additional cavities can also be sealed or hermetically sealed from the outside environment. These various cavities can also advantageously provide shielding from electromagnetic interference ("EMI") for the various components of the RF system. EMI shielding can be provided, for example, by constructing the cavities of metal and/or other EM shielding materials or components. Additionally, the upper and lower enclosures can include vents, grates, filters, or the like to prevent intrusion of sand or other debris into the cavity or channel of the RF system through which air can flow.

In various embodiments, the RF system, including the various components such as the module enclosures, the upper and lower enclosures, the processing modules, the RF modules, and power supply modules, and/or the antennas can be manufactured to account for and tolerate high temperature and/or extreme environments. For example, specific materials, such as metals, can be used to dissipate heat more quickly. Additionally, for example, each of the processing modules, the RF modules, and power supply modules can include individual housings that can provide additional environmental protection, shock protection, and thermal conductivity for the internal components (e.g., to provide thermal conductivity and heat dissipation to the outside of the individual components). Accordingly, the RF system can advantageously provide shielding of sensitive components from weather, sunlight (e.g., heat), and other external threats that might damage or reduce the efficiency of the equipment (e.g., processor throttling due to high temperatures).

In various embodiments, the RF modules can include power amplifier technology. For example, the RF modules can include a radio frequency ("RF") power amplifier as an electronic amplifier that converts a low-power radio-frequency signal into a higher power signal. The RF modules can also include digital and/or analog filter technology. For example, a digital filter (e.g., in signal processing) can perform mathematical operations on a sampled, discrete-time signal to reduce or enhance certain aspects of that signal. The RF modules can also include multiplexers to provide for receiving and transmitting via the directional antennas.

In various embodiments, the RF system, e.g., the processing modules, can also include positioning, navigation, and timing ("PNT") capabilities. Such PNT capabilities may be provided by one or more PNT components that may include, for example, global navigation satellite system capabilities (e.g., global positioning system ("GPS") capabilities), among other PNT functions. The one or more PNT components may further provide orientation information, altitude information, angle/tilt information, and/or the like. In some implementations, the PNT capabilities may be provided in and/or by the direction finder, in whole or in part. The PNT capabilities of the RF system may be provided by one or more PNT components, and/or the like. The PNT capabilities may also be referred to herein as "positioning capabilities", and the one or more PNT components may also be referred to herein as "positioning components", and/or the like. The PNT capabilities of the RF system may be used, for example, in object location determinations and/or tracking, as described herein, because such functionality may be dependent on the position, orientation, tilt, and/or the like, of the RF system (e.g., such that the correct directional antenna, with the correct orientation and tilt, may be used to detect or target an object).

In various embodiments, the processing modules can include a machine learning component that can be used to assist the RF system in detecting and/or identifying one or more RF signals captured by a connected antenna. For example, the machine learning component can implement machine learning ("ML") algorithms, artificial intelligence ("AI") algorithms, ML models, other programmed algorithms, and/or the like (generally collectively referred to herein as "AI/ML algorithms", "AI/ML models", or simply as "ML algorithms", "ML models", and/or the like) that may, for example, implement models that are executed by one or more processors. Having an AI/ML model to identify RF signals can advantageously provide significant improvements as compared to conventional systems because many detected signals may include some level of interference, be relatively weak and hard to detect, or otherwise hard to identify due to other factors. In various embodiments, the machine learning component can use one or more machine learning algorithms to implement one or more models or parameter functions for the detections/identifications. The machine learning component can be configured to apply a model that can help detect which types of RF signals (e.g., a range of RF signals, particular frequencies or combinations of frequencies, and/or the like) indicate which types of objects.

In various embodiments, a machine learning model of the RF system can be programmed or trained by: (1) sampling raw signals (e.g., captured from one or more connected antennas), (2) signal annotation (e.g., frequency, time, and intensity), (3) signal filtering, and (4) model training. The trained model can then be applied, by the RF system, to received or captured RF signals for identification purposes. For example, in various embodiments, application of the trained machine learning model can comprise: (1) raw signal sampling, (2) application of trained model, and/or (3) output of classes and probabilities (e.g., associated with type of objects). Then, for example, the processing module can identify a captured RF signal and/or a type of object based on the (3) output of classes and probabilities. Also, in various embodiments, application of the trained machine learning model can comprise the preliminary step of (0) filtering base line signal and/or friendly signals.

In various embodiments, sampling raw signals or raw signal (e.g., RF) data can include any form of data sampling. Data sampling, for example, can include a statistical analysis technique used to select, manipulate, and analyze a representative subset of data points to identify patterns and trends in the larger data set being examined. It can enable working with a small, manageable amount of data that may be representative of a larger, unmanageable amount of data. Sampling can advantageously enable analysis of data sets that are too large to efficiently analyze in full or within a desired amount of time. In various embodiments, the RF system may sample the raw signal for some period of time (e.g., some number of milliseconds, such as 1 ms, 2 ms, 3 ms, 5 ms, 10 ms, 50 ms, or some other period of time). In various embodiments, other, or additional, sampling methods may be employed.

In various embodiments, the RF system (e.g., via one or more processing modules and/or one or more RF modules) can use identified types of objects (e.g., output from the applied machine learning model) to generate one or more new signals and, using one or more of the directional antennas, transmit the new signals. The new signals may be transmitted in the direction of the identified signal or one or more objects. Accordingly, the RF system may selectively transmit signals of varying powers via the various direction antennas. In various embodiments, the identified signal corresponds to one or more mobile objects (e.g., vehicle, boat, aircraft, drone, and/or the like), and the transmitted signals may affect communications in the vicinity of the mobile object during transmission. In various embodiments, detections or identification of objects, or identification of signals corresponding to objects, can be received from one or more other systems or sensors. Generating a signal based on the identified signal can advantageously be beneficial due to increased power efficiency/optimization. For example, instead of transmitting signals in all frequency bands, only signal in a specific frequency or narrow range of frequencies can be transmitted instead, thereby increasing power efficiency and/or signal power to reach father distances. In various embodiments, the transmitted signal can be further filtered to limit interference of sensitive friendly systems in the area.

In various embodiments, the RF system can track an identified signal or object (e.g., while the RF system is transmitting or not). In various embodiments, the direction finder can provide more accurate tracking as well. For example, the direction finder in conjunction with the one or more antennas can identify a direction where a detected signal is emanating from (e.g., while the antennas are transmitting or not).

In various embodiments, there may be other sensors or systems (e.g., and including other RF systems in the area) that can connect to the RF system to provide additional data that can be used to: (1) improve the detections performed by the RF system using the machine learning models; (2) assist RF system in continuing to track, or begin tracking, an object or signal; and/or (3) generate and transmit, or continue generating and transmitting, a specific signal in the direction of an object, among other functions.

In various embodiments, each RF system may include software, including the machine learning models or component, that can be updated over-the-air ("OTA") or via electrical hardwire connection. For example, the RF system may connect to the central processing server to receive updates. As another example, if multiple RF systems are installed in an area it may be beneficial for the RF systems to connect and update each other's machine learning models (e.g., by sending the updated models, or relevant data captured so that each RF system can train based on the additional data) over time so that each RF system has the most up-to-date data or model available. In various embodiments, although RF systems may be in the same area, it might be beneficial to only share portions of data or machine learning models between the RF systems since there might be subtle differences between each RF systems field of view that might result in one model being better suited for a first environment/area than another model that is better suited in a second environment/area.

In various embodiments, a series of one or more RF systems can be placed in an area. For example, a first RF system can be placed on the northeast corner of a building with one antenna facing north and another facing east. Also, a second RF system can be placed on the southwest corner of the same building with one antenna facing south and the other facing west. Accordingly, the four antennas connected to the two RF systems (and/or additional RF systems and associated antennas) can monitor a 360° area (or approximately a 360° area) surrounding the building, and at the same time omitting any signal detection coming from the building itself. As a consequence of the orientation, while any of the antennas are transmitting signals, the transmission can be away from the building so that the building and any equipment or personnel in the building are not impacted or affected by any transmissions. The orientation and the signal filtering described herein can further limit interference of friendly areas and equipment in an improved manner.

Further, according to various embodiments, various interactive graphical user interfaces can be provided for allowing various types of users to interact with the systems and methods described herein to, for example, generate, review, and/or modify data captured by or used by one or more RF systems or connected systems.

The interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Accordingly, in various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, and/or the like.

Various embodiments of the present disclosure provide improvements to various technologies and technological fields, and practical applications of various technological features and advancements. For example, as described above, some existing systems are limited in various ways, and various embodiments of the present disclosure provide significant improvements over such systems, and practical applications of such improvements. Additionally, various embodiments of the present disclosure are inextricably tied to, and provide practical applications of, computer technology. In particular, various embodiments rely on specialized hardware installed in specific locations as well as software components to improve energy and processing efficiency. Such features and others are intimately tied to, and enabled by, computer technology, artificial intelligence, and digital signal technology and would not exist except for computer technology, artificial intelligence, and digital signal technology. For example, the RF system, processing module, RF module, and signal detection, generation, and transmission functionality and interactions with detected objects/signals described herein in reference to various embodiments cannot reasonably be performed by humans alone, without the computer and technology upon which they are implemented. Further, the implementation of the various embodiments of the present disclosure via computer technology enables many of the advantages described herein, including more efficient interaction with, and analysis of, various types of electronic data, and the like.

Embodiments of the disclosure are described below with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

To facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, and/or the like, received by a system/device from a user, a representative of a user, an entity associated with a user, and/or any other entity or object. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; to transmit or access data; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, and/or the like), and/or the like. For example, user inputs may comprise a position, orientation, and/or motion of a hand or other appendage, a body, a 3D mouse, and/or the like.

Data Store: Any computer-readable storage medium and/or device (or collection of data storage mediums and/or devices). Examples of data stores include, but are not limited to, optical disks (e.g., CD-ROM, DVD-ROM, and/or the like), magnetic disks (e.g., hard disks, floppy disks, and/or the like), memory circuits (e.g., solid-state drives, random-access memory (RAM), and/or the like), and/or the like. Another example of a data store is a hosted storage environment that includes a collection of physical data storage devices that may be remotely accessible and may be rapidly provisioned as needed (commonly referred to as "cloud" storage).

Database: Any dataset or data structure (and/or combinations of multiple datasets or data structures) for storing and/or organizing data, including, but not limited to, relational databases (e.g., Oracle databases, PostgreSQL databases, and/or the like), non-relational databases (e.g., NoSQL databases, and/or the like), in-memory databases, spreadsheets, comma separated values (CSV) files, eXtensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, and/or the like. As used herein, a data source may refer to a table in a relational database, for example. May also be referred to herein as "dataset" and/or the like.

III. Example Operating Environment

FIG. 1A illustrates a block diagram of an example operating environment 100 in which one or more aspects of the present disclosure may operate, according to various embodiments of the present disclosure. The operating environment 100 may include an RF system 102, optional additional RF systems 106, additional systems or sensors 104, a central processing server 107, and one or more user devices 110. Each RF system 102 (and optional additional RF systems 106) can include various hardware components 103, and software components 105, with can provide various functionality as described further herein.

In various embodiments, communications among the various components of the example operating environment 100 may be accomplished via any suitable device, systems, methods, and/or the like. For example, the RF system 102 and optional additional RF systems 106) may communicate with one another, the additional systems or sensors 104, the central processing server 107, and one or more user devices 110 via any combination of the network 112 or any other wired or wireless communications networks, method (e.g., Bluetooth, WiFi, infrared, cellular, and/or the like), and/or any combination of the foregoing or the like. As further described below, network 112 may comprise, for example, one or more internal or external networks, the Internet, and/or the like.

Further details and examples regarding the implementations, operation, and functionality of the various components of the RF system 102 and the example operating environment 100 are described herein in reference to various figures.

a. Network 112

The network 112 may include any wired network, wireless network, or combination thereof. For example, the network 112 may be a personal area network, local area network, wide area network, over-the-air broadcast network (e.g., for radio or television), cable network, satellite network, cellular telephone network, or combination thereof. As a further example, the network 112 may be a publicly accessible network of linked networks, possibly operated by various distinct parties, such as the Internet. In various embodiments, the network 112 may be a private or semi-private network, such as a corporate or university intranet. The network 112 may include one or more wireless networks, such as a Global System for Mobile Communications (GSM) network, a Code Division Multiple Access (CDMA) network, a Long Term Evolution (LTE) network, C-band, mmWave, sub-6 GHz, or any other type of wireless network. The network 112 can use protocols and components for communicating via the Internet or any of the other aforementioned types of networks. For example, the protocols used by the network 112 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, the network 112 can represent a network that may be local to a particular organization, e.g., a private or semi-private network, such as a corporate or university intranet. In some implementations, devices (e.g., RF system 102, RF systems 106, additional systems or sensors 104, central processing server 107, device(s) 110, and/or the like) may communicate via the network 112 without traversing an external network, such as the Internet. In some implementations, devices connected via the network 112 may be walled off from accessing the Internet, e.g., the network 112 may be not be connected to the Internet. Accordingly, e.g., the user device(s) 110 may communicate with the RF system 102, RF systems 106, or additional systems or sensors 104 directly (via wired or wireless communications) or via the network 112, without using the Internet. Thus, even if the network 112 or the Internet is down, the RF system 102, RF systems 106, or additional systems or sensors 104 may continue to communicate and function via direct communications (and/or via the network 112).

In various implementations, the network 112 and/or various other aspects of the operating environment 100 may incorporate "mesh" type communications among components, and/or secure communications among components. Examples of such mesh and/or secure communications are described in U.S. Pat. No. 10,506,436, issued Dec. 10, 2019, and titled "Lattice Mesh" (the '436 patent), the entire disclosure of which is hereby made part of this specification as if set forth fully herein and incorporated by reference for all purposes, for all that it contains. For example, and in some embodiments as described herein, detection and/or identification of object(s), and/or responding to such a detection and/or identification (e.g., by transmitting one or more RF signals) can be performed by one more systems (e.g., RF systems), devices, sensors, or the like. For instance, any devices and/or sensors can communicate with one or more of the RF systems described herein so that any information transmitted between devices can be used, in whole or in part (e.g., in combination with one or more of the RF systems' own detections), to initiate a response (e.g., transmit one or more RF signals).

b. Additional Systems or Sensors 104

The additional systems or sensors 104 may include, for example, various sensors and monitoring equipment. For example, non-limiting examples of additional systems or sensors 104 may include: sensors/monitors (e.g., temperature, positioning/location, PNT, direction finder, altitude, angle/tilt, levels, vibration, power, pressure, and/or the like); video cameras (e.g., video, audio, position, motion, heat, and/or the like); antennas (e.g., long range, short range, and/or the like); radar devices; light detection and ranging ("LIDAR") devices; mobile systems or sensors (e.g., a sensor on a vehicle or an aerial drone); stationary systems or sensors (e.g., a sensor on a tower station); other types of systems or sensors; and/or any combination of the foregoing. Additional examples of systems or sensors 104 that may be included in the operating environment 100, and which may provide information to, or receive information from, RF systems 102, 106, as described herein, are described in U.S. Patent Application Publication No. 2020/0167059, filed Nov. 27, 2018, and titled "Interactive Virtual Interface" (the '059 Publication), and in U.S. Patent Application Publication No. 2020/0363824, filed May 17, 2019, and titled "Counter Drone System" (the '824 Publication), the entire disclosures of each of which are hereby made part of this specification as if set forth fully herein and incorporated by reference for all purposes, for all that it contains.

As described herein, RF system 102 may communicate with, provide information to, or receive information from, additional systems or sensors 104. Similarly, RF system 102 may communicate with, provide information to, or receive information from, one or more RF systems 106. Similarly, RF systems 106 may communicate with, provide information to, or receive information from, additional systems or sensors 104. In various embodiments, communications among the various components of the operating environment 100 may be accomplished via intermediate communications with a centralized server or database (e.g., central processing server 107), which may store data associated with the additional systems or sensors 104. Alternatively, additional systems or sensors 104 may be communicated with and/or configured via communication with user device(s) 110. Data and information gathered from the additional systems or sensors 104 may be provided directly or indirectly to the RF system 102.

In various implementations, one or more of, or a combination of, the RF system 102, RF systems 106, and/or the user device(s) 110 may provide an application programming interface ("API") by which communications may be accomplished with the additional systems or sensors 104.

The various communications among the components of the operating environment 100 may, as described herein, be used to determine locations of objects (which may include mobile objects) via various methods. Examples of such communications and methods of determining locations of objects are provided in, for example, the '059 Publication and the '824 Publication.

c. Central Processing Server

The central processing server 107 may include, for example, one or more computing systems connected (e.g., via network 112) to the RF systems (e.g., 102 and 106), additional systems or sensors 104, and/or user device(s) 110. For example, data and information gathered from the additional systems or sensors 104, the RF system 102, or RF systems 106 may be provided directly or indirectly to the central processing server 107 for storage, analysis, and/or transmission to other connected systems. For example, one RF system 106 might detect/identify a specific signal and/or object, and the RF system 106 can transmit that data to the central processing service 107, which can then transmit an indication of the detected signal to other systems (e.g., RF system 102). For example, in some examples described herein, RF systems (e.g., 102 and 106) can work together in a network to detect signals around a designated area or location (e.g., a building) since each RF system includes antennas that only face certain directions. In various embodiments, the central processing server 107 may be communicated with and/or configured via communication with user device(s) 110.

As noted above, the various components of the operating environment 100 may, as described herein, be used to determine locations of objects (which may include mobile objects) via various methods. Examples of such methods of determining locations of objects are provided in, for example, the '059 Publication and the '824 Publication. Accordingly, the central processing server 107 and/or user device(s) 110 of the present disclosure may be analogous, in whole or in part, to the interactive virtual interface system of the '059 Publication in that various sensor data and location determinations may be integrated together. Such location information may further be shared among the various components of the operating environment 100, e.g., the RF systems 102, 106, to enable coordination among the components for transmitting generated signals to located objects (which may include mobile objects). Further, as noted above, communications among the various components of the operating environment 100 may be provided via various methods, some examples of which are described in the '436 patent.

Figure 3:
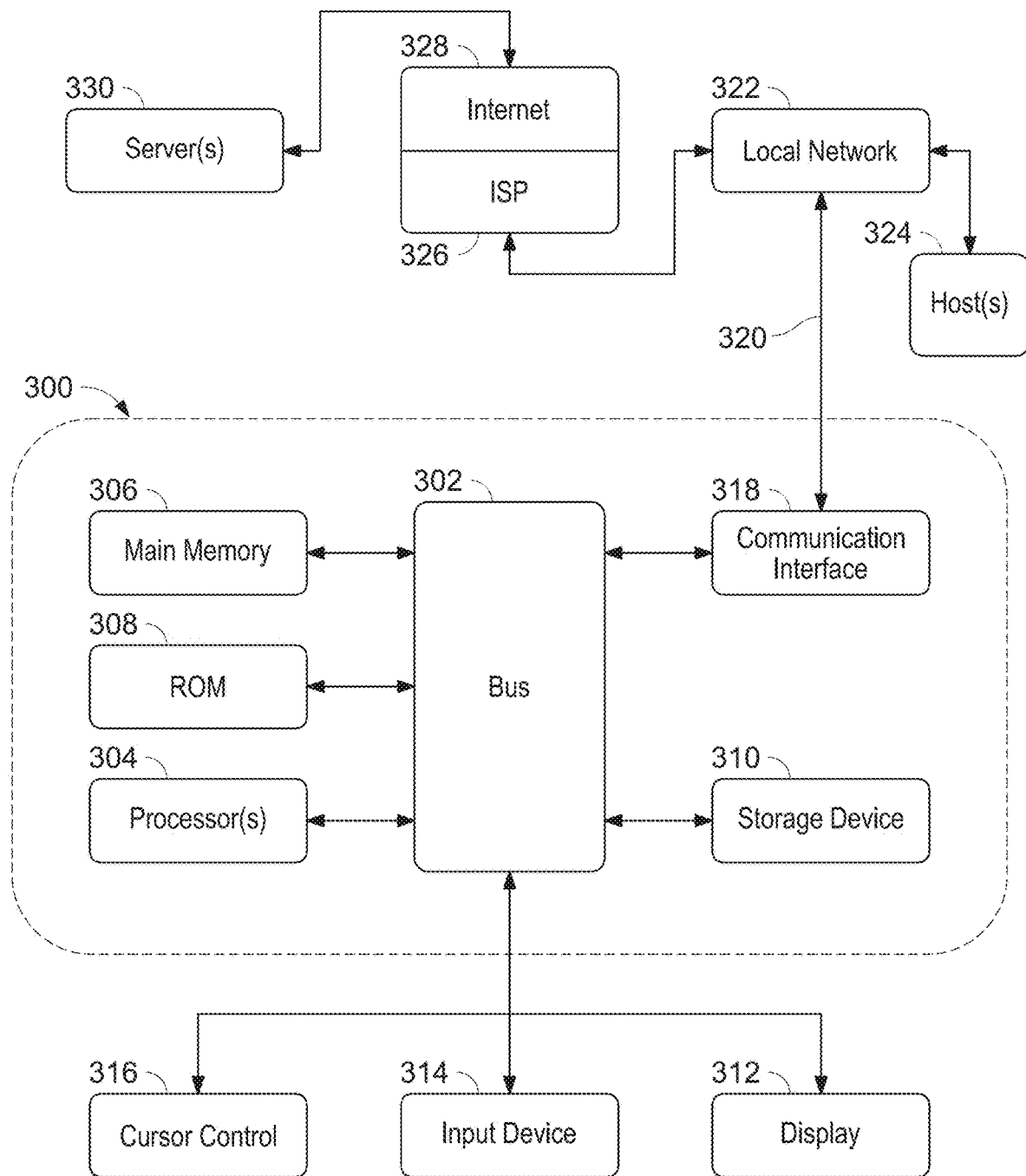
FIG. 3 shows a block diagram illustrating example computer system components by which various aspects of the present disclosure may be implemented.

In various embodiments, the central processing server 107 can comprise hardware similar to that of the computer system described herein in reference to FIG. 3. Alternatively, in various embodiments, the central processing server 107 can exist via software thereby linking a number of RF systems and any other optional additional systems or sensors together so that the systems or sensors can share information among themselves (in such implementations, the various collective components of the RF systems may provide similar functionality to that of the computer system described in reference to FIG. 3). In various embodiments, the central processing server 107 can create a mesh network, an example of which is described in the '436 patent (as noted above). For example, the central processing server 107 can comprise an interface and a processor. The interface can be configured to receive a request to register from a host, wherein the request to register includes a key and a set of asset identifications ("IDs") that the host wishes to claim. The processor can be configured to sign the key to generate a resource authority ("RA") certificate signed key with an RA certificate; update an asset database with the RA certificate signed key; distribute the RA certificate signed host public key through the network; and provide the host with the RA certificate signed key. In various embodiments, the server can further comprise a memory that is coupled to the processor and configured to provide the processor with instructions. The system for a mesh network can include a secure mechanism for communication between nodes (e.g., RF system 102, RF system 106, additional systems or sensors 104, user device 110, and/or the like) that is enabled for messages that have a targeted destination both in a point-to-point mode and a publication mechanism where a message can be targeted at multiple destinations. The security for the communications can be designed to prevent compromised nodes from being used to acquire significant message traffic from the network once the node is compromised. In addition, the network can prioritize real-time data despite variable performance of network links. The network can also ensure security by establishing secure routing using point to point authorizations. The network can also strategically cache data flowing in the network so that when channels are available data can be sent. The mesh network can be an improvement over other networks by improved security. The network can be designed to overcome unstable communication links and the potential for nodes becoming compromised. The mesh network can overcome potential issues using security systems that secure messages, secure routes, and secure backfilling of messages that wait to be sent through the network.

In various implementations, the central processing server 107 may provide an application programming interface ("API") by which communications may be accomplished with the RF system 102, RF systems 106, user device(s) 110, and/or additional systems or sensors 104. For example, data collected or generated by RF system 102 can be sent to the central processing server 107 to be combined with other data collected (e.g., from RF system 106 and/or additional systems or sensors 104) and stored for later transmission to any system on the network 112 or outside of the network 112 (e.g., via the internet using an API). In various embodiments, the central processing server 107 can also implement some or all of the machine learning and/or data or signal processing that the RF systems (e.g., 102 and 106) perform, for example.

d. Example User Device(s)

The user device(s) 110 may comprise computing devices that provide a means for a user or admin to interact with a device (e.g., RF system 102, RF systems 106, additional systems or sensors 104, or central processing server 107). User devices 110 may comprise user interfaces or dashboards that connect a user with a machine, system, or device, commonly used in industrial processes. In various implementations, user device(s) 110 comprise computer devices with a display and a mechanism for user input (e.g., mouse, keyboard, voice recognition, touch screen, and/or the like). In various implementations, the user device(s) 110 comprise tablet computing devices, laptop computing devices, or smart phones.

As noted above, the user device(s) 110 may communicate with the RF system 102, RF systems 106, additional systems or sensors 104, and/or central processing server 107 via direct (e.g., not via a network) wired and/or wireless communications, and/or via a network (e.g., a local network) wired and/or wireless communications. Advantageously, according to various embodiments, a user may configure an interactive user interface layout, and may then push the interactive user interface layout configuration to one or more RF systems 102 and/or 106. In various embodiments, the RF systems 102 and/or 106 may then provide the configured interactive user interface remotely to any user devices 110 connecting to the RF systems 102 and/or 106. Advantageously, such functionality may enable remote and centralized configuration of interactive user interfaces without requiring direct programming or interaction with the RF systems 102 and/or 106 or user device(s) 110. Advantageously, according to various embodiments, because connection interface is provided by the RF systems 102 and/or 106, multiple user devices 110 may simultaneously access and/or communicate with the RF systems 102 and/or 106, and a current configuration/status of the RF systems 102 and/or 106 may be accurately kept synchronized/kept up-to-date from each device and between such devices.

In various implementations, a user may operate the RF system 102 (and/or RF systems 106, among other components of the operating environment 100) via one or more user interfaces accessible via device(s) 110 (and/or other user interfaces of the central processing server 107). Via such user interfaces, the user may review and/or set a configuration or status of the RF system 102, may receive indications from the RF system 102 (and/or central processing server 107, which may provide coordination among various components of the operating environment 100) of an identified object, may provide approval to the RF system 102 (and/or central processing server 107, which may provide coordination among various components of the operating environment 100) to begin transmission to an identified object, may review a battery health of the RF system 102, may access automated logs associated with the RF system 102 (and/or central processing server 107); and/or the like.

In various embodiments, the user devices 110 may comprise relatively streamlined interactive graphical user interfaces. For example, the interactive user devices 110 may comprise relatively few large buttons by which a user may select to stop a currently running configuration, may select a different configuration from a list, may search for a different configuration, and/or may monitor a current status of inputs/outputs, analyses, machine learning models, and/or the like (and as noted above).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, video gateway devices or controller devices, and may enable a user to more quickly and accurately access, navigate, assess, and digest analyses, configurations, received/operational data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, received data), translation and delivery of those inputs to various system components (e.g., RF systems 102 and/or 106), automatic and dynamic execution of complex processes in response to the input delivery (e.g., execution of configurations on RF systems 102 and/or 106), automatic interaction among various components and processes of the system, and automatic and dynamic updating of the user interfaces (to, for example, display the information related to RF systems 102 and/or 106). The interactions and presentation of data via the interactive graphical user interfaces described herein may accordingly provide cognitive and ergonomic efficiencies and advantages over previous systems.

IV. RF Systems

The RF system 102 can comprise hardware and software components, and can be a modular, adaptable, and movable system including one or more antennas. The RF system 102 can be configured to receive or capture external RF signals from one or more directions (e.g., the direction(s) the antennas are facing in conjunction with the configured field of view angle), determine one or more RF signals to transmit based on the received RF signals (e.g., by applying one or more machine learning models and determining a type of object), and generate and transmit the determined one or more RF signals in particular directions and with particular powers, among other functionality as described in more detail herein.

In various implementations, in addition to RF system 102, one or more additional RF systems 106 can be provided (e.g., as illustrated in the example operating environment 100 of FIG. 1A). Each of the RF systems 106 may generally include similar configurations and functionality as the RF system 102. For example, each of the RF system 102 and RF systems 106 may include similar hardware components and software components and functionality. Each of the RF systems may also differ in various ways, for example, each may include one or more module enclosures, and one or more directional antennas, among other features. The description herein provides details of the implementation of RF system 102, but each of RF systems 106 may be similarly implemented.

Although the RF system 102 is shown separately from RF systems 106, in some embodiments, each RF system shown can have functionality that is unique to itself (e.g., based on location/placement, particularities of its trained data model that may be the same or different than other RF systems, different hardware or software, different ranges of frequencies to monitor due to a configured blacklist or whitelist, or other features) or shared functionality among all RF systems (e.g., a shared machine learning model, shared data inputs, shared blacklist of whitelist, or other features). So, in some embodiments, functionality of the RF systems can reside on one device or multiple devices. For example, processing of data signals received by one RF system 102 can be performed by the RF system 102 or a combination of the RF system 102 and other RF systems 106. In some embodiments, RF system 102 can perform functions unique to the RF system 102, and RF system 106 can perform functions unique to the RF system 106. In some embodiments, a combination of features might be available to all RF systems, some features unique to each RF system and some features that can be shared. In some applications, there may only be one RF system used and thus all available features or functionality for the single RF system would reside on the single RF system. In some embodiments, additional systems or sensors 104 can provide additional data or functionality to the RF system(s), as described herein. As described above, coordination among the various components of the operating environment 100 may be direct, and/or via the central processing server 107, among other possible configurations.

In various embodiments, there may be additional RF systems 106 installed in an area associated with or nearby the RF system 102. In various embodiments, the RF systems 102 and 106 can be placed in an area and connected together (e.g., via network 112, or hardwire connection). For example, an RF system 102 can be placed on the northeast corner of a building with one antenna that is connected to RF system 102 facing north and another antenna connected to RF system 102 facing east. Also, RF system 106 can be placed on the southwest corner of the same building with one antenna connected to RF system 106 facing south and the other antenna connected to RF system 106 facing west. Accordingly, the four antennas connected to the two RF systems (and/or additional RF systems and associated antennas) can monitor a 360° area (or approximately a 360° area) surrounding the building, and at the same time omitting any signal detection coming from the building itself. As a consequence of the orientation, while any of the antennas are transmitting signals, the transmission can be away from the building so that the building and any equipment or personnel in the building are not impacted or affected by any transmissions. The orientation and the signal filtering described herein can further limit interference of friendly areas and equipment in an improved manner.

In various embodiments, the RF system can be manufactured into a compact, lightweight, movable, and/or adaptable design such that the RF system can be placed in a variety of positions and locations. For example, in an implementation, the RF system may have a total height (e.g., length) of between about 20 cm and about 180 cm, and may have a total weight of between about 10 kg and about 100 kg. Additionally, the directional broad-bandwidth antennas can be disconnected from the module enclosure of the RF system and swapped with different types of antennas that might provide different functionality (e.g., wider or narrower field of view such as omnidirectional, longer range sensitivity, shorter range sensitivity, and the like) and/or different physical attributes for improved mobility or adaptability depending on the application (e.g., reduced or increased size, different shape, and the like). For example, if the RF system is going to be moved from the roof of a building onto a vehicle, there may be the need to use one or more different antennas that are configured to be secured safely to the vehicle while the vehicle is in operation, and satisfy the new requirements associated with the placement at the same time. Such requirements might include being able to monitor a wider field of view than the prior position of being placed on the side of a building, and the wider field of view can be achieved with additional antennas and/or different antennas that are configured differently.

a. Example Hardware Components of the RF System

Figure 1B:
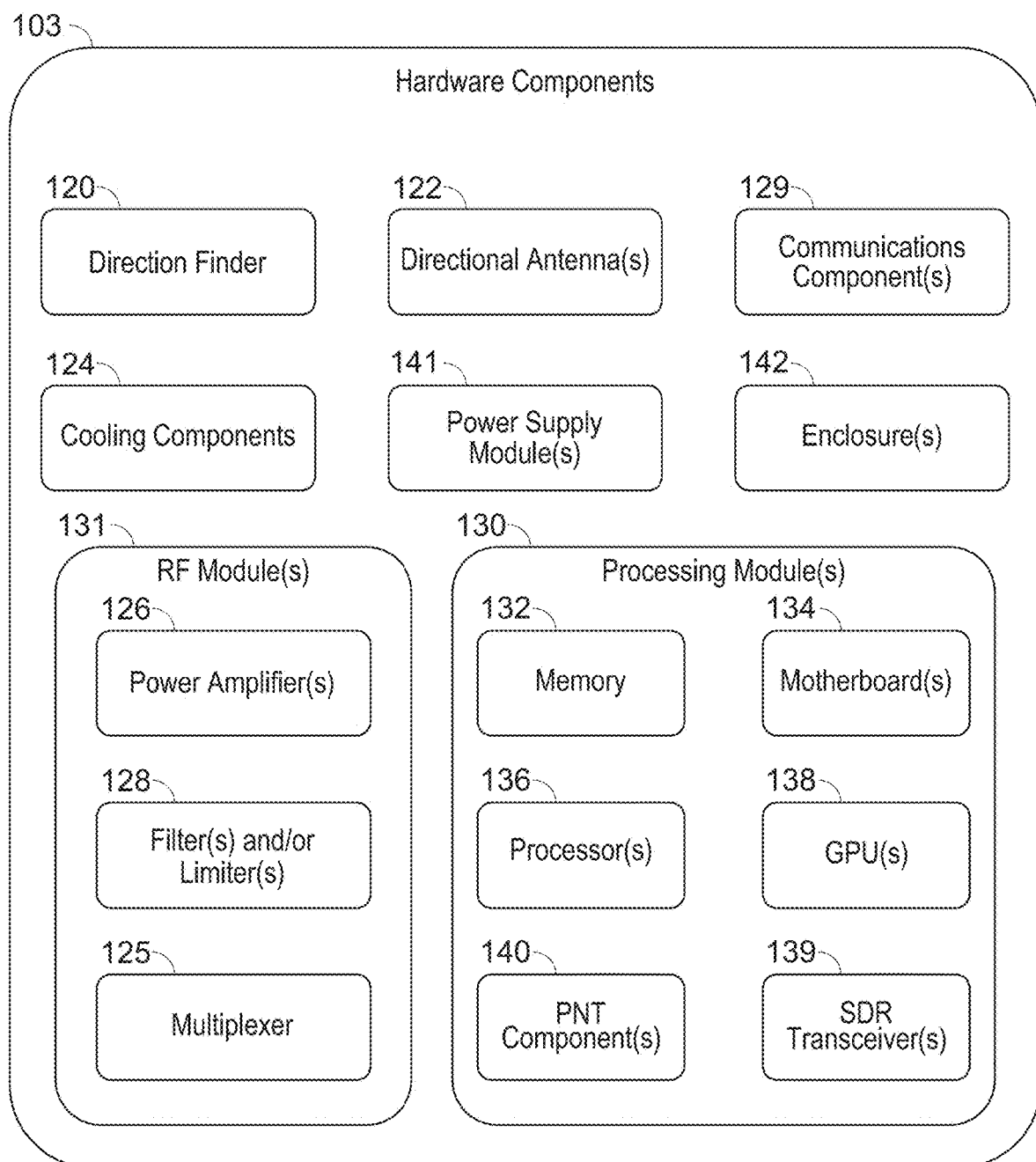
FIG. 1B illustrates a block diagram of example hardware components of an RF system, according to various embodiments of the present disclosure.

FIG. 1B illustrates a block diagram of example hardware components 103 of the RF system 102, according to various embodiments of the present disclosure. The hardware components 103 may include for example, a direction finder 120, one or more directional antennas 122, communication components 129, cooling components 124, one or more power supply modules 141, one or more enclosure components 142, one or more RF modules 131, and one or more processing modules 130. Software components 105 of the RF module 102 may be implemented on various components of the RF system 102, but, according to various implementations, primarily on the one or more processing modules 130, as described herein.

As noted above, the RF system 102 can advantageously be modular to enable multiple configurations for various applications. The modularity of the RF system can be found in both the modularity of a particular individual RF system that can operate on its own (including in coordination with one or more additional systems or sensors), and multiple RF systems that can operated in coordination with one another (including in coordination with one or more additional systems or sensors). The modularity of the RF system can be enabled, in part, by the various enclosures 142 of the RF system 102, which may house or provide attachments for the various other hardware components 103.

For example, the RF system 102 can be implemented with one module enclosure, two module enclosures, or more module enclosures. In the example of two or more module enclosures, the module enclosures of the RF system 102 may be joined together by one or more joining enclosures.

Accordingly, in an implementation the RF system 102 may include two stacked module enclosures, joined together by a joining enclosure. In the various implementations, the RF system may also include an upper enclosure and a lower enclosure, and may further include components for mounting the RF system, such as one or more mounts, clips, slides, pins, and/or the like. Advantageously, the RF system, given its modularity, may be appropriately configured for a given application, and mounted on a tripod, a vehicle, a building, and/or the like.

FIG. 1D illustrates a perspective view of an example implementation 180 of the RF system 102 comprising two module enclosures and four directional antennas, according to various embodiments of the present disclosure. However, in various implementations that RF may include more or fewer antennas, and may include a single module enclosure or more than two module enclosures. The example implementation 180 of the RF system 102 comprises an upper enclosure 182, a first (e.g., top) module enclosure 184, a joining enclosure 186, a second (e.g., bottom) module enclosure 188, and a lower enclosure 190. The example implementation 180 of the RF system 102 further comprises, directional antennas 192a-192d, a direction finder 194, and one or more control panels 196. While not shown in FIG. 1D, the RF system 102 can also include one or more mounting points or surfaces 193, such as on a bottom surface of the lower enclosure 190, for mounting the RF system 102.

As illustrated in FIG. 1D, the various enclosures of the RF system 102 may be joined together to form a main housing of the RF system 102. As shown, the directional antennas 192a-192d, and the direction finder 194, may be mounted to outside (or exterior) surfaces of the enclosures by one or more coupling points or antenna mounts. Each of the one or more antenna mounts can provide one or more degrees of freedom. Each degree of freedom can reflect an ability of the respective antennas to tilt, rotate, or translate along one or more axes.

The upper enclosure can include one or more air vents 198, and the lower enclosure can include one or more air vents 199. The air vents 198, 199 can enable or promote air flow within the RF system housing, such as within an inner portion or cavity of the RF system 402. Such air flow can be caused by one or more fans, which may be located within the upper and/or lower enclosures, to promote the flow of air from the air vents in the lower enclosure 190, up through an interior portion (also referred to herein as an inner portion) or cavity of the RF system 180, and out through the air vents 198. The interior portion or cavity of the RF system may include one or more heat sinks that may be thermally coupled to one or more modules located within a periphery interior portion of the RF system (e.g., within a housing of the modules enclosures 184, 188, as described herein).

Referring again to FIG. 1B, each of the module enclosures may house one or more processing modules 130, one or more RF modules 131, and one or more power supply modules 141. In various implementations, the processing modules 130 may comprise system-on-module ("SOM") aspects, and may thus be referred to herein as "SOM modules". Each of the module enclosures, and associated processing module(s) 130, RF module(s) 131, and power supply module(s) 141 may support one or more directional antennas 122 (e.g., antennas 192a-192d of FIG. 1D) and/or a direction finder 120 (e.g., direction finder 194 of FIG. 1D). In an implementation, each of the module enclosures includes a single processing module 130, two RF modules 131, and a power supply module 141. In this implementation, each of the RF modules 131 supports a single directional antenna 122 (and thus the module enclosure supports up to two directional antennas 122), the processing module 130 supports the two RF modules 131, and the power supply module 141 provides power to the processing module 130 and the two RF modules 131. Accordingly, in a configuration in which the RF system 102 includes one module enclosure, the RF system 102 can support up to two directional antennas 122, and in a configuration in which the RF system 102 includes two module enclosures, the RF system 102 can support up to four directional antennas 122. In the implementations including two or more module enclosures, the multiple processing modules 130 may communicate with one another directly to provide the functionality described herein, or may communicate with one another via a system management module. Additionally, in any of these configurations the RF system 102 can additionally support one or more direction finders 120 via one or more components of the module enclosures (e.g., the processing module 130, the RF module(s) 131, and/or the power supply module 141).

The RF system 102 can advantageously include a physical modular configuration that provides physical protection to the components for use in, for example, dirty or extreme environments. For example, each of the enclosures 142 can include cavities (which may be included in a periphery of the module enclosures) into which the processing module(s) 130, the RF module(s) 131, and the power supply module(s) 141 can be placed. The cavities can be sealed or hermetically sealed from the outside environment. The enclosures can also include additional cavities for routing of connections and wiring among the various components. These additional cavities can also be sealed or hermetically sealed from the outside environment. These various cavities can also advantageously provide shielding from electromagnetic interference ("EMI") for the various components of the RF system 102. EMI shielding can be provided, for example, by constructing the cavities of metal and/or other EM shielding materials or components. Additionally, the upper and lower enclosures can include vents, grates, filters, or the like to prevent intrusion of sand or other debris into portions of the RF system through which air can flow.

Accordingly, in an implementation, each RF module 131 may comprise its own enclosure housing its related components, each processing module 130 may comprise its own enclosure housing its related components, and each power supply module 141 may comprise its own enclosure housing its related components. Each module's housing may be made of a thermally conductive material, such as metal. Each of these individual enclosures of the various modules may then be placed within the cavities of, for example, the module enclosure(s) of the RF system 102. Additionally, the various electrical components of the RF system 102 can be wired for power and data communication with one another via the various cavities. For example, the processing module 130 can be in wired communication with the RF module(s) 131, and the RF module(s) 131 can be in wired communication with the directional antenna(s) 122 and/or direction finder 120. Such data and power wired communications can be accomplished via routing through the cavities of the enclosures, and via connectors on and through surfaces of the enclosures and outside of the enclosures. In some implementations, one or more of the various components of the RF system 102 can in communication with one another through wireless communications.

In addition to the internal power supply modules 141 described above (which can provide appropriate power to the various other modules and components of the RF system 102), the power supply module(s) 141 may also include an external or internal main power supply module that may provide main power to the RF system 102. Such power may be from a wired main power source or a battery source. In some implementations, the RF system 102 includes an internal battery power source that provides power to the components of the RF system 102 via the power supply module(s) 141.

i. Direction Finder

The direction finder 120 (also referred to herein as a radio direction finder or direction finding antenna) can comprise a radio direction finder ("RDF") or other direction finding device, and can be a device configured to find or otherwise identify a direction, or bearing, to a radio source. The direction finder 120 can include one or more antennas configured to conduct direction finding. Direction finding can include using two or more measurements from different locations. Based on the two or more measurements, the location of an unknown object (e.g., a transmitter, vehicle, drone, and/or the like) or other target can be determined. In various embodiments, by combining the direction information from multiple sources (e.g., other direction finders in the area, other systems or sensors, or one or more of the directional broad-bandwidth antennas, and/or the like), the source of a transmission may be located (e.g., via triangulation or other similar means).

The direction finder 120 can be used to detect any radio source. The size of a receiver antenna of the direction finder 120 can be a function of a wavelength of a receiving signal. For example, longer wavelengths (low frequencies) can include larger antennas. The ability to locate a position of a transmitter can be particularly valuable in various applications, including transmission object location searching and identifying. The direction finder 120 can include one or more phased array antennas to allow more rapid beam forming for more accurate finding. The direction finder 120 can include a sense antenna, a dipole antenna, a parabolic antenna, and/or the like. The direction finder 120 may employ one or more of a phase or a doppler technique. In various embodiments, a plurality of direction finders 120 can obtain direction information from two or more suitably spaced receivers (or a single mobile receiver), the source of a transmission may be located via triangulation.

The direction finder 120 may communicate with one or more (or all) of the processing modules 130 of the RF system 102 in any given configuration. In various embodiments, a plurality of direction finders 120 may be coupled to a common processing unit (e.g., processing module 130). As noted herein, in some implementations, the PNT capabilities (e.g., some or part of the PNT components 14) may be provided in and/or by the direction finder 120, in whole or in part.

ii. Directional Antennas

The one or more directional antennas 122 can be configured to transmit and/or receive radio signals. As noted above, each of the directional antennas 122 may be in electrical/wired communication with an RF module 131, which RF module 131 may provide signal receipt or transmission amplification, among other functionalities. In various embodiments, the directional antennas 122 can be designed to transmit and receive radio waves in a particular direction (directional, or high-gain, or "beam" antennas). For example, in various embodiments the directional antennas 122 can be directional and can be configured to radiate or receive signals over an area that is between 80 degrees and 110 degrees in a direction the first antenna is configured to face (e.g., a primary received and/or transmitting angular arc of the antenna). In some implementations, each of the one or more directional antennas 122 can be configured to provide communications within about a 90° angle, and thus two directional antennas can be configured to provide communications within about a 180° angle, three directional antennas can be configured to provide communications within about a 270° angle, and four directional antennas can be configured to provide communications within about a 360° angle. Other combinations of antennas and various arrangements are possible. In various embodiments, the directional antennas 122 can include one or more reflectors (e.g., parabolic reflectors), horns, and/or parasitic elements, which may direct the radio waves into a beam or other desired radiation pattern.

The one or more directional antennas 122 can be physically positioned and configured to transmit or receive at varying power levels and frequencies in one or more specific directions, such that the antennas can collectively provide greater directionality and sensitivity in certain direction(s) than in other directions. Advantageously, this can allow for increased performance and reduced interference from unwanted sources (e.g., sources that are not in the direction of the antenna's directionality). Directional antennas 122 can provide increased performance over dipole antennas, or omnidirectional antennas, when greater concentration of radiation in a certain direction is desired. Additionally, the directional antennas 122 can be broad-bandwidth antennas that can be used to transmit, receive, or transmit and receive radio signals with a wide frequency spectrum. In various embodiments, the directional antennas 122 can be configured to transmit and/or receive radio signals in a subset of the wide frequency spectrum. For example, there may be nearby equipment that emits signals in a particular frequency range where an antenna is facing and the RF system can be programmed to filter received signals (e.g., with software) so as to not interfere with analysis of received signals and/or filter transmitted signals (e.g., with software or additional digital signal filtering equipment) so as to minimize or remove interference with the operation of the nearby equipment. Accordingly, the RF system may selectively transmit signals of varying powers via the various direction antennas.

In various embodiments, each directional antenna 122 and its associated electronic circuitry (e.g., associated RF module 131) can operate independently as well as in a coordinated way with the other directional antennas. For example, a single directional antenna 122 can be configured to face and monitor a 90° field of view, and four of the described directional antennas (e.g., using 1, 2, 3, or 4 RF systems) can be configured to monitor a full 360° (or approximately 360°) field of view. In various embodiments, there can be additional antennas used (e.g., 5 antennas each covering 72°, 6 antennas each covering 60°, 7 antennas each covering about 52°, and/or the like), fewer antennas used (e.g., 1 antenna each covering 360°, 2 antennas each covering 180°, 3 antennas each covering 120°), and/or some fields of view can overlap as well (e.g., 4 antennas with each antenna covering 120°, or the like).

The antennas can also be configured to comprise automated or manual adjustability with respect to a vertical angle or tilt so that the antenna can face more downwards towards the ground or be adjusted to face more upwards towards the sky. In some applications, there may be an optimum angle that the antenna can adjust to based on empirical data or artificial intelligence/machine learning (e.g., the machine learning models described herein, or other models). Adjustability of the angle of the antennas may be provided by an antenna mount that is user-adjustable. The measured angle of an antenna may comprise an angle of elevation or tilt as compared to a plane the RF system is stationed on (which may be the same as a line perpendicular or normal to a side surface of the RF system on which the antenna is mounted, if the RF system is mounted level).

In various embodiments, for the RF system 102, the corresponding one or more directional broad-bandwidth antennas 122 and associated electronic circuitry can comprise multiple physical configurations. For example, the antennas and associated electronic circuitry can be configured to be detachable and/or stackable so that multiple antennas can be used in one specified location. For example, there might be two antennas at one location, where each antenna is configured to monitor a 90° field of view, for a total field of view of 180° being monitored by the two antennas.

iii. Cooling Components, Environmental Protection

The cooling components 124 can be configured to remove heat produced by one or more of the hardware components 103. For example, the cooling components 124 can help avoid temporary malfunction or permanent failure by overheat of power supplies, amplifiers, integrated circuits such as central processing units ("CPUs") and graphics processing units ("GPUs"), and/or other elements described herein. The other hardware components 103 described herein may be configured to generate little heat, but more heat may still be produced than can be removed without use of the cooling components 124. The cooling components 124 can include one or more fans, one or more heat sinks, one or more thermal couplings, one or more heat pipes or conductors, and/or the like, configured to allow removal of heat from the system. Thus, the RF system can advantageously include a physical modular configuration and materials that efficiently dissipate heat from the components of the system to enable the RF system to operate in high temperature and/or extreme environments.

For example, the upper and lower enclosures can include fans, and the upper and lower enclosures, the module enclosure(s), and the joining enclosures, if applicable, together can provide a cavity or channel for air to flow through the RF system to cool the various components of the RF system. The module enclosures can, for example, include heat sinks within the cavity or channel, and thermally coupled to the processing modules, the RF modules, and power supply modules, over which air may flow as pushed or pulled by the fans to cool the components of the RF system. The fans may cause air to flow up from the lower enclosure, through the heat sinks of one or more module enclosures, and out through the upper enclosure. Further, each of the modules (e.g., the processing module(s) 130, the RF module(s) 131, and/or the power supply module(s) 141) may internally include various thermal couplings, heat pipes or conductors, and/or the like, to conduct heat to the thermal interfaces and thereby to the heat sinks.

In various embodiments, the RF system, including the various components such as the module enclosures, the upper and lower enclosures, the processing modules, the RF modules, and power supply modules, and/or the antennas can be manufactured to account for and tolerate high temperature and/or extreme environments. For example, specific materials, such as metals, can be used to dissipate heat more quickly. Additionally, for example, each of the processing modules, the RF modules, and power supply modules can include individual housings that can provide additional environmental protection, shock protection, and thermal conductivity for the internal components (e.g., to provide thermal conductivity and heat dissipation to the outside of the individual components). Accordingly, the RF system can advantageously provide shielding of sensitive components from weather, sunlight (e.g., heat), and other external threats that might damage or reduce the efficiency of the equipment (e.g., processor throttling due to high temperatures). As noted above, the RF system may also include EMI protection, e.g., for the various modules of the system.

In various embodiments, the cooling components 124 can include liquid cooling elements that use liquid (e.g., water, liquid nitrogen) to cool other hardware components 103. Use of the cooling components 124 can maintain or increase a clock speed of the elements of the processing module 130 (e.g., a processor 136, a GPU 138).

iv. Communications Components

Communications components 129 can include various components of the RF system that provide or enable communications among the components of the RF system, and communications with other systems and sensors. Such communications components 129 can include, for example, wires, optical fibers, transceivers, plugs, jacks, connectors, and/or the like.

Communications components 129 include wiring between the directional antennas 122 and the respective RF modules 131. Such wiring may include a plug providing an interface to an exterior of the RF system, and an associated connector on a wire from an antenna to enable plugging the antenna's wire into the plug to provide electrical communications between the antenna and the RF module. Communications components 129 include similar wiring between the direction finder 120 and one or more of the RF modules 131 and/or processing modules 130 (including wires, plugs, connectors, and/or the like to provide electrical communications). Communications components 129 also include wiring or communications among the RF modules 131 and the processing modules 130; among multiple processing modules 130; and between processing modules 130 and external systems or sensor 104, central processing server 107, and/or user devices 110.

In various implementations, the communications components 129 may include electrical, optical, and/or electromagnetic communication channels. The communications components 129 can include components for communicating with other systems remote from the system. For example, the communications components 129 can include a remote data interface, such as a wireless transmitter.

In various embodiments the communications components 129 may include one or more digital data interfaces to send or receive digital data via a wired or a wireless link. For example, the communications components 129 may include one or more wireless transceivers, one or more antennas, and/or one or more electronic systems (e.g., front end modules, antenna switch modules, digital signal processors, power amplifier modules, and/or the like) that support communication over one or more communication links and/or networks. In some examples, each transceiver may be configured to receive or transmit different types of signals based on different wireless standards via the antenna (e.g., an antenna chip). Some transceivers may support communication using a low power wide area network ("LPWAN") communication standard. In some examples, one or more transceivers may support communication with wide area networks ("WANs") such as a cellular network transceiver that enables 3G, 4G, 4G-LTE, or 5G. Further, one or more transceivers may support communication via a Narrowband Long-Term Evolution ("NB-LTE"), a Narrowband Internetof-Things ("NB-IoT"), or a Long-Term Evolution Machine Type Communication ("LTE-MTC") communication connection with the wireless wide area network. In some cases, one or more transceivers may support Wi-Fi communication. In some cases, one or more transceivers may support data communication via a Bluetooth or Bluetooth Low Energy ("BLE") standard. In some examples, one or more transceivers may be capable of down-converting and/or up-converting a baseband or data signal from and/or to a wireless carrier signal. In some examples, the communications components 129 may wirelessly exchange data between other components, such as other portions of the system or another system, a mobile device (e.g., smartphone, a laptop, and/or the like), a Wi-Fi network, WLAN, a wireless router, a cellular tower, a Bluetooth device, and/or the like. The antenna may be capable of sending and receiving various types of wireless signals including, but not limited to, Bluetooth, LTE, or 3G.

The communications components 129, in various embodiments, may also comprise aspects of the PNT component 140.

v. Processing Module

As noted above, each module enclosure of the RF system can include processing modules and RF modules that include electronic circuitry that can be configured to connect to and operate 1, 2, 3, 4, or more individual directional broad-bandwidth antennas. For example, each processing module 130 can comprise can include memory 132, one or more motherboards 134, one or more processors 136, one or more GPUs 138, one or more software-defined radio ("SDR") transceivers, and one or more positioning, navigation, and timing ("PNT") components 140. The processing modules 130 can be configured to receive transmissions from, and provide transmission via, one or more directional antennas. In various embodiments, a single module enclosure can be configured with one processing module 130, and can support two directional broad-bandwidth antennas, where the antennas can be placed at a single location, or the antennas can be placed a distance apart from each other (e.g., 5, 10, 100 feet apart) and connected to the same module enclosure. For example, one might be placed on the north side of the building facing north, and another may be placed on the east side of the same building facing east. Alternatively, the antennas might be placed at the northeast corner at the same location, with one antenna facing north and the other facing east. In various embodiments, two module enclosures joined together in a single RF system can be configured with two processing modules 130, and can support four directional broad-bandwidth antennas, where the antennas can be placed at a single location, or the antennas can be placed a distance apart from each other (e.g., 5, 10, 100 feet apart) and connected to the same RF system.

As also noted above, each of the processing modules 130 may comprise system-on-module ("SOM") aspects, and may thus be referred to herein as "SOM modules". In implementations in which a given RF system 102 includes two or more processing modules 130 (e.g., when the RF system includes two or more module enclosures) the multiple processing modules 130 may communicate with one another directly to provide the functionality described herein, or may communicate with one another via a system management module that may provide coordination functionality among the multiple processing modules 130. In implementations using a system management module, the system management module may provide communications with other external systems or sensors, and may relay those communications to the multiple processing modules 130. In various implementations, the system management module may incorporate components and/or functionality of one or more of the processing modules, such as the PNT components 140. In various implementations, when the RF system 102 includes two or more processing modules 130, one of the processing modules can be manually and/or automatically designated to act as the system management module (and thus no physically separate system management module is present) to provide the coordination and communication functionality described above. The system management module can also be referred to as a system controller module and/or the system management module may comprise a system controller module.

The memory 132 can include non-volatile memory and/or volatile memory. The non-volatile memory may include flash memory or solid-state memory. The memory 132 can store software instructions for implementing operation of the RF system as described herein. The memory 132 can also store the AI/ML model(s) and other information needed for executing the detection of objects, and generation of signals.

The motherboard 134 can be referred to a mainboard, a main circuit board, or some other central processing system. The motherboard 134 can include a main printed circuit board ("PCB"). The motherboard 134 can include various communications interfaces or buses to allow for communications among components of the processing module 130, such as memory 132, one or more processors 136, one or more GPUs 138, one or more SDR transceivers, and one or more PNT components 140. The motherboard 134 can provide connectors for other elements described herein. The motherboard 134 can include significant sub-systems, such as the central processor, the chipset's input/output and memory controllers, interface connectors, and other components integrated for general use.

The one or more processors 136 can include any type of general-purpose central processing unit ("CPU"). In various embodiments, the one or more processors 136 may include more than one processor of any type including, but not limited to complex programmable logic devices ("CPLDs"), field programmable gate arrays ("FPGAs"), application-specific integrated circuits ("ASICs"), or the like.

The one or more GPUs 138 can include any type of specialized electronic circuit that may execute advanced computations that may be executed more slowly, or less efficiently, on a general-purpose processor (or which may not be executable on a general-purpose processor). The GPUs 138 can include fast memory and highly parallel structure to process large blocks of data in parallel. For example, the GPUs 138 may be configured to perform matrix calculation, perform linear algebra calculations, execute Fourier transforms, and/or other advanced calculations, including executing the ML models as described herein. Also, for example, the GPUs 138 may be configured to perform many calculations per second (e.g., 10, 15, 20, 30, or more Tera FLOPS per second). These GPUs 138 may include their own memory and/or processors or may execute instructions stored in the memory 132 and/or as instructed by the processors 136. The instructions may be executed by the processor(s) 136 and/or the GPUs 138. For example, the processor(s) 136 may instruct the GPUs 138 to apply an ML model to sampled RF data to, e.g., determine a type of object, as described herein. Additionally or alternatively, the processor(s) 136 may support in making the calculations and other determinations.

Various aspects and functionality of the processing modules 130 may correspond to aspects of the system described in reference to FIG. 3, and thus the components and functionality described in reference to FIG. 3 may be applicable to the processing modules 130.

The SDR transceivers 139 comprise circuitry and functionality to produce, modify, detect, sense, or otherwise work with RF signals as described herein. For example, the SDR transceivers 139 may be configured to transmit/receive signals that can be mixed, filtered, amplified, modulated/demodulated, and/or detected using one or more components described herein. As a further example, the SDR transceivers 139 can receive instructions from the processor 136 to generate one or more signals to be transmitted by the RF system (e.g., to target an identified object). Thereafter, the SDR transceivers 139 can generate the signals, which can then be communicated to the RF modules 131 (as appropriate for targeting, and including instructions regarding an amount of power to transmit on any applicable antenna) for amplification and transmission via the directional antennas 122.

The SDR transceivers 139 may include one or more analog-to-digital ("ADCs") converters and one or more digital-to-analog converts ("DAC"). For example, received signals (received, e.g., via a directional antenna and RF module, and communicated to the processing module) may be passed through an ADC for further digital domain sampling and analysis, as described herein. Signals to be transmitted may be generated by the SDR transceiver, and passed through a DAC before being communicated to an RF module for amplification and transmission via a directional antenna). In various implementations, the ADCs and DACs may be located elsewhere in the system, e.g., as separate components of the processing modules and/or RF modules.

In various embodiments, the RF system, e.g., the processing modules 130, can include PNT capabilities. Such PNT capabilities may be provided by the one or more PNT components 140 that may include, for example, global navigation satellite system capabilities (e.g., global positioning system ("GPS") capabilities), among other PNT functions. The one or more PNT components 140 may further provide orientation information, altitude information, angle/tilt information, and/or the like. In some implementations, the PNT capabilities 140 may be provided in and/or by the direction finder 120, in whole or in part. The PNT capabilities may also be referred to herein as "positioning capabilities", and the one or more PNT components 140 may also be referred to herein as "positioning components", and/or the like. The PNT capabilities of the RF system may be used, for example, in object location determinations and/or tracking, as described herein, because such functionality may be dependent on the position, orientation, tilt, and/or the like, of the RF system (e.g., such that the correct directional antennas 122, with the correct orientation and tilt, may be used to detect or target an object).

vi. RF Module

Each of the RF modules 131 can include one or more power amplifiers 126, one or more filters and/or limiters 128, and one or more multiplexers 125. As described herein, in various implementations, each RF module 131 may be in communication with one directional antenna 122. Further, each RF module 131 may both receive RF signals via the associated directional antenna, and cause transmission of RF signals via the associated directional antenna. The received signal may be communicated to the processing module 130, with which the RF module 131 is in communication. Similarly, the processing module 130 (via the SDR transceivers 139) can provide signals to the RF module 131 for transmission.

The radio frequency ("RF") power amplifiers 126 can include amplifiers both for received signals, and for transmission of signals. In various implementations, that system can include multiple signal channels, and thus multiple amplifiers, both for receiving and for transmission. In various implementations, the power amplifiers 126 can drive an antenna, or modify a received signal, such that the output can include improved gain, power output, bandwidth, power efficiency, linearity (e.g., low signal compression at rated output), input and output impedance matching, and/or heat dissipation. In various implementations, the power amplifiers 126 can amplify signals in the radio frequency range between about 20 kHz and about 300 GHz, and/or can include preamplifiers that may precede other signal processing stages.

The one or more filters and/or limiters 128 can provide signal filtering and/or limiting, primarily for received signals, but optionally also for transmitting signals. Filters can include, for example, broadband, narrowband, high-pass, low-pass, notch, and/or other kinds of filters for RF signals. In some embodiments, the filters can be configured to reduce noise within a received and/or transmitted RF signal. The limiters can include various circuit elements for limiting the power of signals, e.g., received by the RF system. In general, the RF modules 131 operate in the analog domain (e.g., analog signals are communicated to the RF module from the processing modules/SDR transceivers), but some aspects, in some implementations, may be digital domain (e.g., if ADCs and/or DACs are provided on the RF module, and/or if some filtering and/or limiting is performed by the RF module in the digital domain).

The RF modules can also include multiplexers to provide for receiving and transmitting via the directional antennas. For example, a multiplexer of the RF module can switch between receiving RF signal from the directional antenna (and providing the received signal to the processing module) and transmitting an RF signal (received from the processing module) via the directional antenna. In various implementations, at least two communications links are provided between the processing module and the RF module to enable receiving and transmitting functionality. In various embodiments, the RF system may periodically, intermittently, on demand, rapidly, and/or according to a program, switch between receiving signals and transmitting signals. In various embodiments, the RF system may simultaneously receive and transmit signals (e.g., one set of directional antenna and RF module may be receiving, which another set of direction antenna and RF module is transmitting). In various embodiments, the multiplexer can modulate and/or demodulate a signal that is received and/or transmitted.

In various embodiments, the RF system may include one or more FPGAs or ASICs can be used instead of a general-purpose processor, or a specialized digital signal processor ("DSP") with specific paralleled architecture for expediting operations such as filtering. In various embodiments, the RF system may include one or more additional amplifiers and/or other circuit components to provide the functionality described herein.

a. Example Software Components of the RF System

Figure 1C:
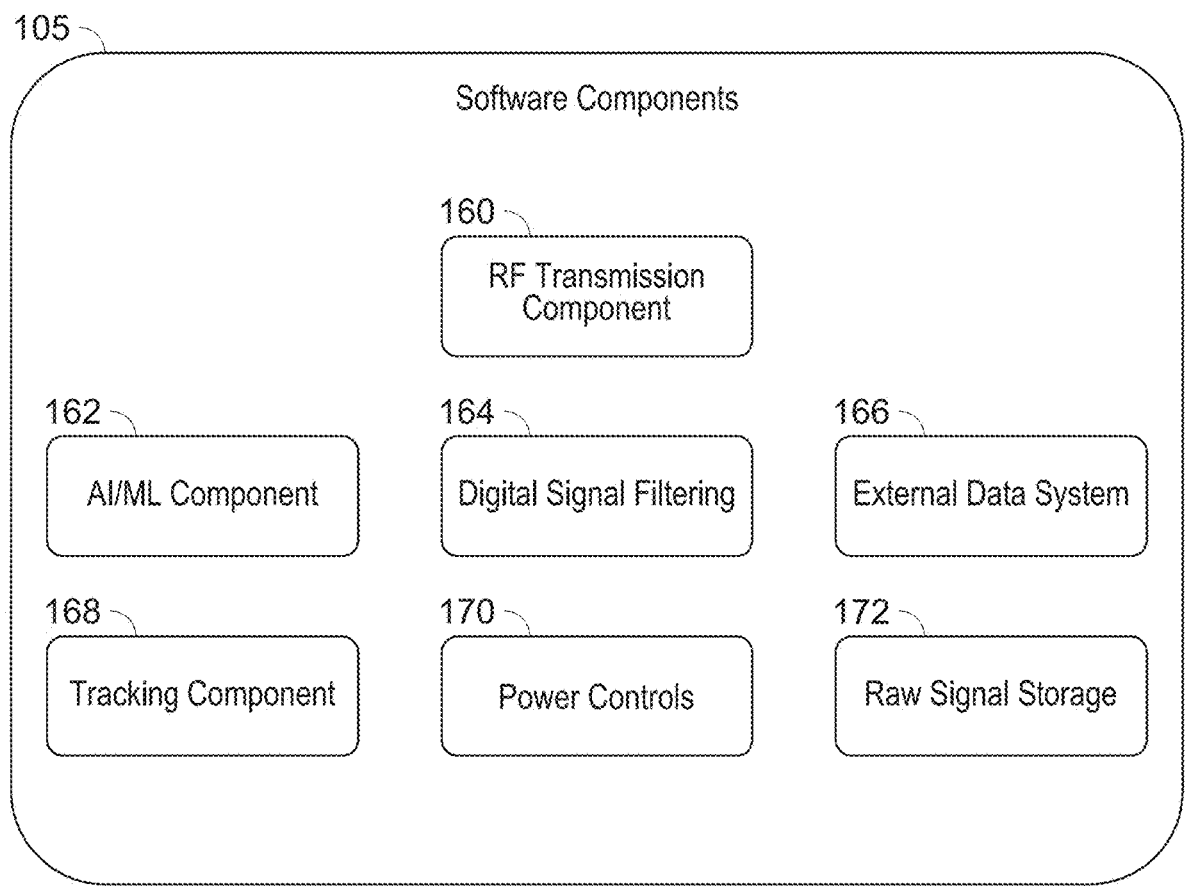
FIG. 1C illustrates a block diagram of example software components of an RF system, according to various embodiments of the present disclosure.

FIG. 1C illustrates a block diagram of example software components 105 of the RF system 102 (and/or RF systems 106), according to various embodiments of the present disclosure. In addition to the description below, further details of the software components and related functionality of the RF system are described below in reference to, for example, FIGS. 4-9. The software components 105 may include RF transmission component 160, AI/ML component 162, digital signal filtering 164, external data system 166, tracking component 168, power controls 170, and raw signal storage 172. In various embodiments, the software components 105 are implemented in one or more of the hardware components 103 of the RF system 102. For example, the software components 105 may be implemented by the processing modules 130 (e.g., may comprise software instructions stored in the memory, and executed by the processor(s), GPU(s), SDR transceiver(s), and/or the like, of the processing modules 130).

In various embodiments, the one or more of the software components 105 may comprise executable software instructions, modules, engines, and/or the like, that may communicate with one another to share computer resources to execute various tasks in conjunction with a specific functionality such as: tracking a signal or object, identifying a signal, generating a signal, transmitting a signal, training/sharing/applying an AI/ML model, reducing/increasing power output, or the like. Each task may include one component of the software components 105 or multiple components. In various embodiments, functionality can be shared by each of the software components 105. In various embodiments, functionality can be shared by some of the software components 105 as well as hardware components (e.g., 103) or other devices and systems.

In general, the software components 105 of the RF system can enable tracking of objects, detecting and/or identifying one or more RF signals captured by a connected antenna, and/or determining and causing transmission of a signal to a tracked object via the one or more directional antennas. For example, software components can implement, e.g., via a machine learning component, machine learning ("ML") algorithms, artificial intelligence ("AI") algorithms, ML models, programmed algorithms, and/or the like (generally collectively referred to herein as "AI/ML algorithms", "AI/ML models", or simply as "ML algorithms", "ML models", and/or the like) that may, for example, implement models that are executed by one or more processors. Having an AI/ML model to identify RF signals can advantageously provide significant improvements as compared to conventional systems because many detected signals may include some level of interference, be relatively weak and hard to detect, or otherwise hard to identify due to other factors. In various embodiments, the machine learning component can apply one or more ML models or parameter functions for the detections/identifications. The machine learning component can be configured to apply one or more ML models that can help detect which types of RF signals (e.g., a range of RF signals, particular frequencies or combinations of frequencies, and/or the like) indicate which types of objects.

The AI/ML component 162 (also referred to above as "machine learning component") can be configured to store, update, and/or apply one or more AI/ML models, programmed algorithms, and/or the like. As will be described in greater detail herein, the AI/ML models implemented at the AI/ML component may be, for example, one or more models trained to identify frequencies (or related signal properties), objects, classes or types of objects, or other characteristics of detected objects based on received RF signals emitted from objects. In some embodiments, the AI/ML component 162 may also be involved with generating and/or training the one or more AI/ML models. In various implementations, the AI/ML component is performed by one or more of the processors or the GPUs of the processing modules 130.

The one or more ML models may be used to determine an expected RF signal frequency range or additional signal properties based on analysis of received or captured data. In various embodiments, signal monitoring criteria or signal identification criteria can be designated by a user, admin, or automatically. For example, the signal monitoring criteria or signal identification criteria can indicate which types of detections to monitor, record, or analyze. By designating specific types of detections, resources (e.g., processing power, bandwidth, and/or the like) can be preserved for only the types of detections desired. Various types of detections are described in more detail herein.

A number of different types of AI/ML algorithms and AI/ML models may be used by RF system. Further, these AI/ML models may be developed, programmed, and/or trained using various methods. For example, certain embodiments herein may use a logistical regression model, decision trees, random forests, convolutional neural networks, deep networks, or others. However, other models are possible, such as a linear regression model, a discrete choice model, or a generalized linear model. The machine learning aspects can be configured to adaptively develop and update the models over time based on new input. For example, the models can be trained, retrained, or otherwise updated on a periodic basis as new received data is available to help keep the predictions in the model more accurate as the data is collected over time. Also, for example, the models can be trained, retrained, or otherwise updated based on configurations received from a user, admin, or other devices. Some non-limiting examples of machine learning algorithms that can be used to train, retrain, or otherwise update the models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), support-vector machines, federated learning, and/or other machine learning algorithm. These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of received data may be analyzed to generate or implement models with minimal, or with no, manual analysis or review by one or more people. In some embodiments, the algorithms may be programmed based on empirical data (e.g., in addition to, or without, machine learning or artificial intelligence being implemented).

In various embodiments, an ML model of the RF system may be trained by: (1) sampling raw signals (e.g., captured from one or more connected antennas), (2) signal annotation (e.g., frequency, time, and intensity), (3) signal filtering, and (4) model training. The trained model can then be applied, by the RF system, to received or captured RF signals for identification purposes. For example, in various embodiments, application of the trained machine learning model can comprise: (1) raw signal sampling, (2) application of trained model, (3) output of classes and probabilities (e.g., associated with type of objects). Then, for example, the processing module can identify a captured RF signal and/or a type of object based on the (3) output of classes and probabilities. Also, in various embodiments, application of the trained machine learning model can comprise the preliminary step of (0) filtering base line signal and/or friendly signals.

In various embodiments, sampling raw signals or raw signal (e.g., RF) data can include any form of data sampling. Data sampling, for example, can include a statistical analysis technique used to select, manipulate, and analyze a representative subset of data points to identify patterns and trends in the larger data set being examined. It can enable working with a small, manageable amount of data that may be representative of a larger, unmanageable amount of data. Sampling can advantageously enable analysis of data sets that are too large to efficiently analyze in full or within a desired amount of time. In various embodiments, the RF system may sample the raw signal for some period of time (e.g., some number of milliseconds, such as 1 ms, 2 ms, 3 ms, 5 ms, 10 ms, 50 ms, or some other period of time). In various embodiments, other, or additional, sampling methods may be employed.

In various embodiments, the machine learning model can be configured (e.g., by its training automatically, or manually, or a combination) to monitor a specific subset of frequencies or subset of other wave properties. For example, although the processing module, via signals received from one or more antennas, can detect and scan for a set of frequencies, the processing module may limit analysis to a specific subset of frequencies. For example, this may be a consequence of the machine learning model training where certain frequencies are not important or useful and are therefore ignored freeing up processing power to analyze other frequencies. Also, for example, the subset of frequencies can be configured manually if there is friendly equipment in the area emitting certain frequencies that the system doesn't need to identify (e.g., the equipment is already known/identified). In various embodiments, each antenna can be operated by the processing module (via one or more RF modules) separately, as well where one antenna may monitor one subset of frequencies and another antenna in communication with the same processing module may monitor a second subset of frequencies different from the first subset. For example, this might be implemented if one antenna is facing friendly equipment and another is not. Also, in various embodiments, the subset of frequencies may adjust based on the time of the day, week, month, or year. For example, during the day a vehicle may be positioned in front of one antenna emitting a signal at a specific frequency, and the vehicle may move such that it is not in front of the antenna during the night.

In various embodiments, the RF system (e.g., via one or more processing modules and/or one or more RF modules) can use identified types of objects (e.g., output from the applied machine learning model) to generate one or more new signals and, using one or more of the directional antennas, transmit the new signals. The new signals may be transmitted in the direction of the identified signal or one or more objects. Accordingly, the RF system may selectively transmit signals of varying powers via the various direction antennas. In various embodiments, the identified signal corresponds to one or more mobile objects (e.g., vehicle, boat, aircraft, drone, and/or the like), and the transmitted signals may affect communications in the vicinity of the mobile object during transmission. In various embodiments, detections or identification of objects, or identification of signals corresponding to objects, can be received from one or more other systems or sensors. Generating a signal based on the identified signal can advantageously be beneficial due to increased power efficiency/optimization. For example, instead of transmitting signals in all frequency bands, only signals in a specific frequency or narrow range of frequencies can be transmitted instead, thereby increasing power efficiency and/or signal power to reach father distances. In various embodiments, the transmitted signal can be further filtered to limit interference of sensitive friendly systems in the area.

The RF transmission component 160 can be configured to cause transmission of RF signals and/or to generate RF signals to be transmitted, as described above and herein. For example, the RF transmission component 160 may be in communication with one or more antennas (e.g., directional antenna(s) 122 of FIG. 1B) or other transmitting devices and configured to cause the one or more antennas to transmit RF signals. In various embodiments, the RF transmission component 160 can include at least a portion of the SDR transceiver, and/or may provide instructions to the SDR transceiver, including software configured to selectively cause transmission of signals at desired frequencies, intensities, and/or directions. The RF transmission component 160 may further be configured to receive tracking data from the tracking component 168, such as to transmit RF signals to an object being tracked by the system.

The digital signal filtering component 164 can be configured to filter raw RF signal data collected by the system, e.g., before the RF signal data is provided to the AI/ML component 162 for signal analysis based on a trained AI/ML model. For example, in various embodiments, the RF system can remove RF signals from the raw RF signal data collected that may correspond to RF signals associated with friendly equipment, equipment that has been manually or automatically flagged as friendly, or filter raw RF signal data based on a whitelist and/or blacklist (e.g., manually and/or automatically populated). The digital signal filtering component 164 can also be configured to filter raw RF signal data transmitted or emitted by the system. For example, in various embodiments, the RF system can remove RF signal frequencies from any generated RF signals (e.g., as transmitted by the RF transmission component 160 or one or more antenna(s)) may correspond to RF signals associated with friendly equipment, equipment that has been manually or automatically flagged as friendly, or based on a whitelist and/or blacklist (e.g., manually and/or automatically populated). As the digital signal filtering is mostly accomplished in the digital domain, received signals are typically converted to digital before this filtering, and generated signals are typically converted to analog after this filtering. In some implementations, the filtering described above may be perform in part or in whole in the analog domain. In various implementations, the digital filtering is performed by one or more of the processors or the SDR transceivers of the processing modules 130.

The tracking component 168 can be configured to track detected objects based on identified RF transmissions received from the detected objects. Further details of the operation of the tracking component 168 are described in greater detail with reference to FIG. 7, for example, and elsewhere herein. In various embodiments, the tracking component 168 can track an identified signal or object (e.g., while the RF system is transmitting or not). In various embodiments, the direction finder can provide more accurate tracking as well. For example, the direction finder in conjunction with the one or more antennas can identify a direction where a detected signal is emanating from (e.g., while the antennas are transmitting or not).

In various embodiments, there may be other sensors or systems (e.g., and including other RF systems in the area) that can connect to the RF system to provide additional data that can be used to: (1) improve the detections performed by the RF system using the machine learning models; (2) assist RF system in continuing to track, or begin tracking, an object or signal; and/or (3) generate and transmit, or continue generating and transmitting, a specific signal in the direction of an object, among other functions. For example, if an object or signal is moving from out of range of one antenna connected a first RF system (e.g., RF system 102) into range of another antenna connected to a second RF system (e.g., RF system 106), the two RF systems can communicate and hand-off the task (e.g., identifying, tracking, transmitting, and/or the like) being implemented by the first RF system can continue to be performed by the second RF system. In various embodiments, the first RF system can shut off and the second RF system can turn on during the transition. In various embodiments, the first RF system and second RF system can stay on and perform the same tasks over a period of time (e.g., 5 second, 1 minute, 10 minutes, and/or the like), or at least until the task is completed and both RF systems stop. In various embodiments, the first RF system can reduce the power utilized to implement the task as the second RF system increases power in conjunction (e.g., there may be a threshold power usage set that limits the total amount of power used by one or both RF systems at one time).

The external data system component 166 can store or retrieve, from any external data storage of external devices, sensors, or systems (e.g., additional systems or sensors 104, central processing server 107, and/or the like), any desired data for implementation in conjunction with the systems and methods of the present technology. For example, AI/ML models, data associated with known objects or classes of objects and/or RF signal characteristics associated with the known objects or classes of objects, data defining signal content to be transmitted to detected and/or tracked objects, and the like, may be stored and/or retrieved via the external data system 166. In various embodiments, the external data system component 166 or associated external data sources or devices can include one or more databases connected to a user device (e.g., 110), a central processing server (e.g., 107), one or more RF systems (e.g., 102 or 106), or additional systems or sensors (e.g., 104), for example. In various embodiments, the data described above may similarly be stored in a memory of the processing modules, as described herein.

The power controls 170 can be configured for software control of power supplied to any of various components of the system, such as any of the hardware components 103 (e.g., FIG. 1B). For example, the power controls 170 may control selective RF transmissions from antennas 122 based at least in part on the power supplied to the antennas 122 (e.g., via RF modules) for transmission. More information regarding power controls is provided elsewhere herein, and an example is described with respect to FIG. 9.

The raw signal storage 172 can store raw RF signals or complex data related to the raw RF signals received by an antenna. In various embodiments, the raw signal storage 172 can store, for example, raw data corresponding to an analog-to-digital conversion of an RF signal received at an antenna, spectrogram data corresponding to the raw data, determined RF signals to be transmitted based on any received RF signals (e.g., as determined by the AI/ML component), or any other type of data structure indicative of a raw RF signal received or transmitted by one or more antennas.

In various embodiments, each RF system may also include software components for performing over-the-air ("OTA") (or via electrical hardwire connection) updates of the various software, components, machine learning models or components, and/or the like. For example, the RF system may connect to the central processing server 107 to receive updates. As another example, if multiple RF systems are installed in an area it may be beneficial for the RF systems to connect and update each other's machine learning models (e.g., by sending the updated models, or relevant data captured so that each RF system can train based on the additional data) over time so that each RF system has the most up-to-date data or model available. In various embodiments, although RF systems may be in the same area, it might be beneficial to only share portions of data or machine learning models between the RF systems since there might be subtle differences between each RF systems field of view that might result in one model being better suited for a first environment/area than another model that is better suited in a second environment/area.

V. Example Implementation of RF Systems

Figure 2A:
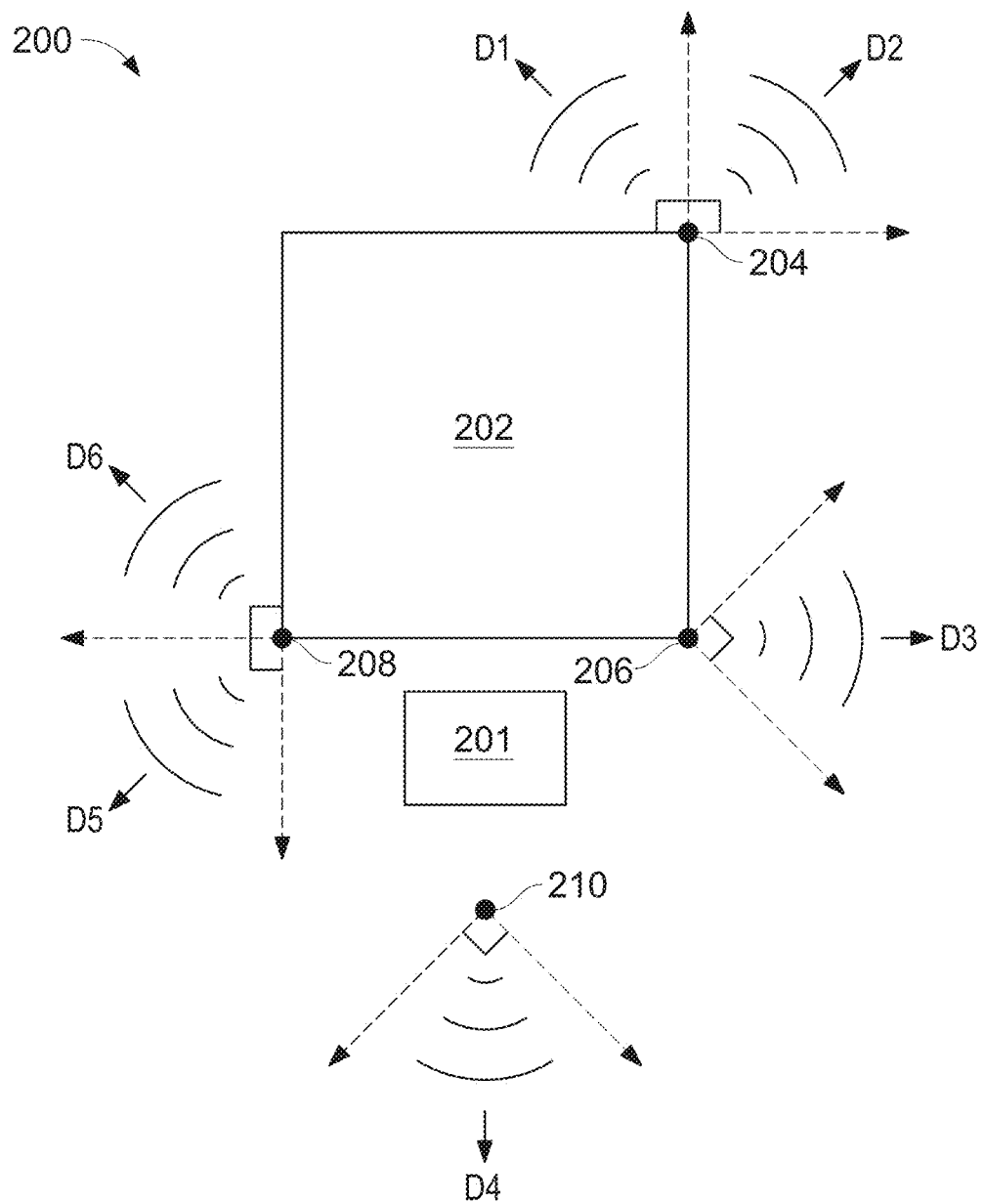
FIG. 2A illustrates an example implementation and orientation of a plurality of RF systems, according to various embodiments of the present disclosure.
Figure 2B:
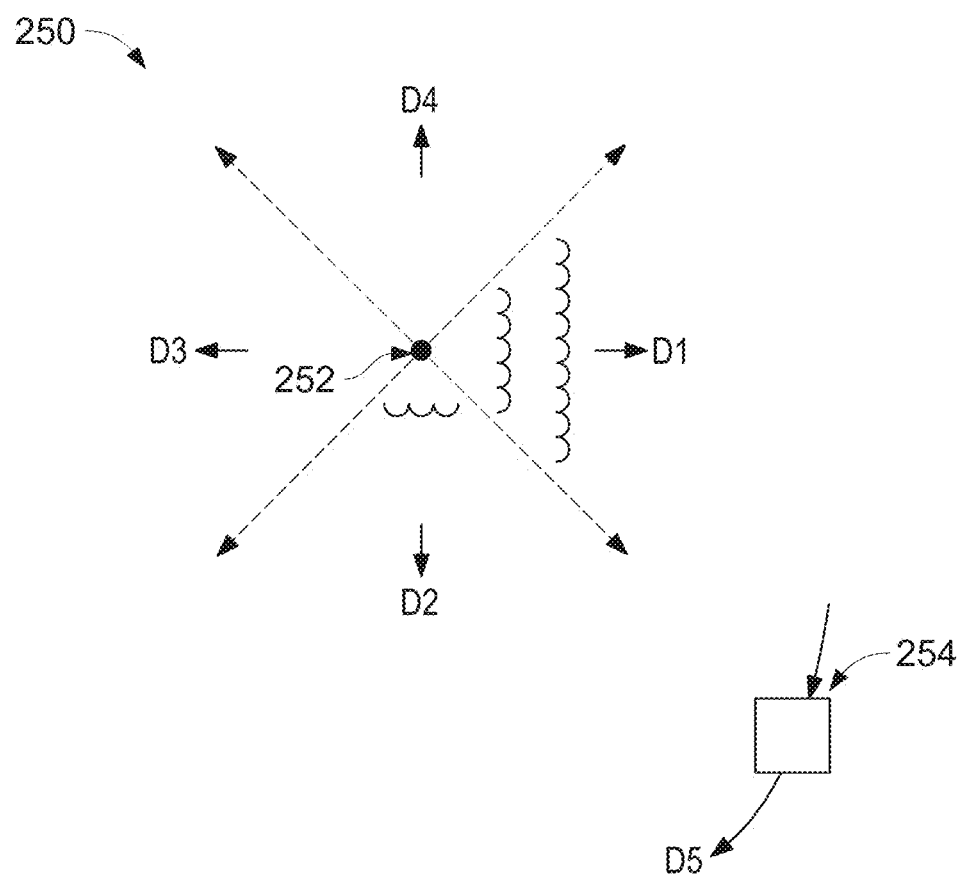
FIG. 2B illustrates an example implementation and orientation of an RF system interacting with an object, according to various embodiments of the present disclosure.

FIGS. 2A and 2B illustrate example implementations and orientations of one or more RF systems (e.g., RF systems 102 and/or 106) in operation, according to various embodiments of the present disclosure.

FIG. 2A illustrates an example implementation and orientation 200 of a plurality of RF systems (e.g., RF systems 102 and/or 106). In FIG. 2A, the plurality of RF systems 204, 206, 208, and 210 can be placed surrounding a building or area 202 such that corresponding antennas connected to the RF systems can face directions away from locations that may comprise sensitive equipment or is otherwise designated as a protected area to be omitted from monitoring by the RF systems. Although FIG. 2A shows one arrangement, infinite arrangements can be devised for each site where RF systems are deployed/installed. For example, placement of each RF system, hardware components (e.g., 103) or software components (e.g., 105) of each RF system, the type of data being shared between the RF systems, the areas or buildings to omit from the antennas' fields of view, and other criteria can vary for each site such RF systems are to be deployed in.

Additionally in FIG. 2A, the RF systems (e.g., 204, 206, 208, and 210) are shown with 1-2 directional broad-bandwidth antennas corresponding to each RF system. For example, RF systems 204 and 208 are shown being installed either on the roof of building 202, adjacent building 202, or on one of the side walls of building 202. The RF systems 204 and 208 also correspond to two antennas each, with each antenna facing a particular direction with a 90° field of view. For example, RF system 204 has one antenna facing D1 and a second antenna facing D2, both with a 90° field of view. Also, for example, RF system 208 has one antenna facing D5 and a second antenna facing D6, both with a 90° field of view. The RF systems 206 and 210 also correspond to two antennas each, with each antenna facing a particular direction with a 90° field of view. For example, RF system 206 has one antenna facing D3, and RF system 210 has one antenna facing D4, both antennas having a 90° field of view. In various embodiments, for example, RF system 204 could have 1 antenna with 180° field of view, or 3 antennas with a 60° field of view, or other similar combinations, to have the same overall field of view achieved by the two antennas shown. In various embodiments, RF systems (e.g., 204, 206, 208, and 210) can include any number of antennas (e.g., 1, 2, 3, 4, 5, 6, and/or the like), and antennas facing specific direction(s) can be turned on or off based on software instructions, orientation relative to sensitive equipment, orientation relative to other RF systems, customized preferences (e.g., based on the terrain or surrounding area), detected objects in the vicinity, or the like.

Advantageously, the RF systems and their corresponding antenna(s) are arranged such that the building 202 and area 201 (e.g., which could be another building, temporary building, stationary vehicle, or other friendly or sensitive equipment, or the like) are located outside of the antennas' fields of view. In various embodiments, data can be transmitted between the RF systems such that detections (e.g., training or application of a machine learning model), tracking, and/or transmissions can be coordinated, for example.

FIG. 2B illustrates an example implementation and orientation 250 of an RF system interacting with an object 254, according to various embodiments of the present disclosure. In FIG. 2B, an RF system 252 can be placed in a location (e.g., near or on a building or area). In various embodiments, multiple directional broad-bandwidth antennas can be used to cover a surrounding area. For example, FIG. 2B shows RF system 252 including at least 4 antennas facing directions D1, D2, D3, and D4. Although FIG. 2B shows one arrangement, infinite arrangements can be devised where an RF system can include any number of antennas (e.g., 1, 2, 3, 4, 5, 6, and/or the like), and antennas facing specific direction(s) can be turned on or off based on software instructions, orientation relative to sensitive equipment, orientation relative to other RF systems, customized preferences (e.g., based on the terrain or surrounding area), detected objects in the vicinity, or the like. The antennas also are shown with at least a 90° field of view. In various embodiments, for example, RF system 252 could have 8 antennas with 45° field of view, or 80 antennas with a 4.5° field of view, or other similar combinations, to have the same overall field of view achieved by the four antennas shown. Also, for example, placement of the RF system 252, hardware components (e.g., 103) or software components (e.g., 105) of the RF system 252, the type of data being shared between the RF system 252 and other RF systems or devices/sensors (e.g., 104), areas or buildings to omit from any of the antennas' fields of view, and other criteria can vary for the RF system 252.

Furthermore, in FIG. 2B, object 254 is shown moving in direction D5 from an area covered by a first antenna facing direction D1 towards an area covered by a second antenna covering direction D2. In various embodiments, power can be provided to the first antenna to improve the first antenna's performance related to receiving/transmitting RF signals in direction D1 while object 254 is in the area covered by the first antenna. As the object 254 moves along direction D2 into the area covered by the second antenna, power can be diverted from the first antenna to the second antenna so that the RF system 252 can continue to effectively receive/transmit RF signals in relation to the object 254. In various embodiments, power can be ramped down for the first antenna (e.g., ⅔ power signals shown in the direction D1 corresponding to the first antenna) and simultaneously ramped up for the second antenna (e.g., ⅓ power signals shown in the direction D2 corresponding to the second antenna). In various embodiments, power can be binary, and the first antenna can be turned off as the second antenna turns on. In various embodiments, the power for each antenna, based on movement of an identified/tracked object (e.g., 254) can be controlled by one or more computing processing modules of the RF system (or one or more RF systems) such as those described herein so that performance can be optimized (e.g., based on velocity of the identified/tracked object, distance of the identified/tracked object as compared to the RF system doing the tracking, properties of the tracked signal (e.g., strength, wavelength, frequency, or the like), or the like). Additionally, in the example shown in FIG. 2B, a third antenna facing direction D3 and a fourth antenna facing direction D4 are shown as being deactivated or turned off since the object 254 is not in the area covered by the third antenna or fourth antenna. In various embodiments, all antennas can be turned on or off at the same time as well.

In another example arrangement not shown in a figure, a first RF system can be placed on the northeast corner of a building with one antenna facing north and another facing east. Also, a second RF system can be placed on the southwest corner of the same building with one antenna facing south and the other facing west. Accordingly, the four antennas connected to the two RF systems (and/or additional RF systems and associated antennas) can monitor a 360° area (or approximately a 360° area) surrounding the building, and at the same time omitting any signal detection coming from the building itself. As a consequence of the orientation, while any of the antennas are transmitting signals, the transmission can be away from the building so that the building and any equipment or personnel in the building are not impacted or affected by any transmissions. The orientation and the signal filtering described herein can further limit interference of friendly areas and equipment in an improved manner.

Advantageously, an infinite number of other arrangements (in addition to the examples provided above) of one or more RF systems, and one or more directional antennas per RF system, are possible with the modular and configurable RF system of the present disclosure.

VI. Additional Example Software-Related Features and Functionality

The description of FIGS. 4-9 below provides further details regarding implementations, components, and related functionality of the RF system. While different numerals may be used to describe the various aspects of the RF system as compared to the foregoing description, it is to be understood that similar components and aspects may include similar or the same functionality. Thus, aspects described above may be applied to aspects described below, and vice versa.

Figure 4:
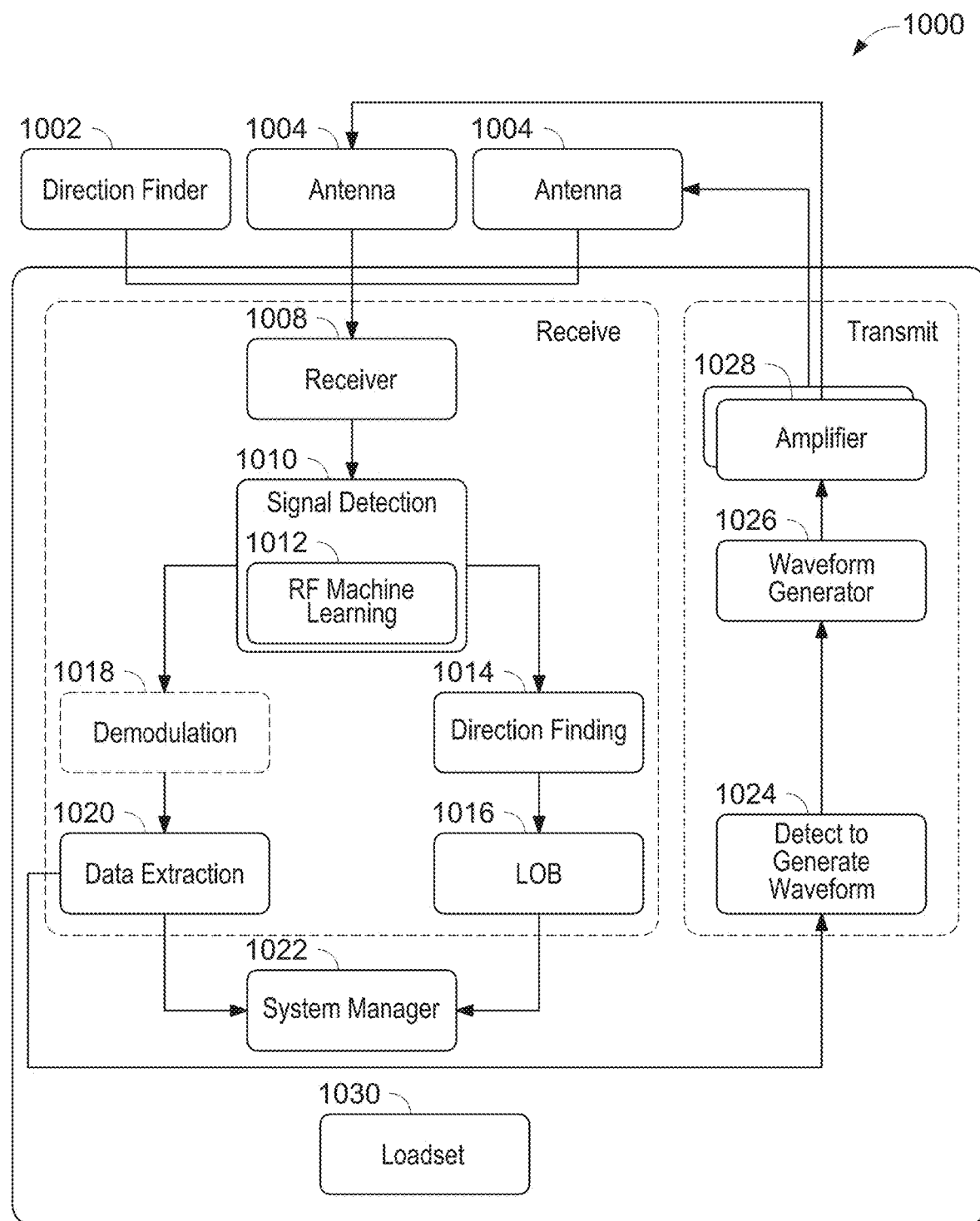
FIG. 4 illustrates a block diagram of example functionality of an RF system, according to various embodiments of the present disclosure.

FIG. 4 illustrates a block diagram 1000 of example functionality of the RF system, with example relational information, according to various embodiments of the present disclosure. Various aspects of the functional blocks of diagram 1000 may be implemented by one or more of the hardware components and/or the software components described above, e.g., in reference to FIGS. 1B-1C. The functional blocks illustrated schematically in FIG. 4 will be described with reference to certain such software and hardware components of the present disclosure. However, it will be understood that the functional blocks of FIG. 4 and/or individual components or subsets thereof may equally be implemented in conjunction with other hardware and/or software components and/or systems without departing from the scope of the present disclosure.

In some embodiments, the functional blocks of FIG. 4 may be implemented in conjunction with, or by, RF systems 102 and 106 (e.g., including any software components, such as those described in relation to FIG. 1C, and/or hardware components, such as those described in relation to FIG. 1B) of the present disclosure, for example. In some embodiments, processing of any software or electronic data can be executed by one or more components of the processing module(s) 130 and/or the RF module(s) 131, for example. For instance, in some embodiments, machine learning algorithms can be trained or applied using GPU(s) 138 and/or other components of the processing module(s) 130. Additionally, in some instances, an RF signal can be generated by an SDR transceiver 139, then sent to the RF module 131 prior to transmitting via one or more directional antenna(s) 122, for example. Additionally, in some instances, an RF signal can be received by one or more directional antennas 122, then sent through the RF module 131, before being processed by the processing module 130 (e.g., by application of a machine learning algorithm or model, for example, using a GPU 138). With respect to ensuring a transmitted RF signal is sent in the proper direction or by the appropriate directional antenna, each RF system can use a PNT component 140 to determine feature or characteristics associated with the corresponding RF system's location, directional orientation, elevation/altitude, and the like. Such information from the PNT component 140, or data received pertaining to the PNT component 140 of another RF system, can be used to determine which directional antenna(s) to activate and transmit from or to use to track identified objects. For example, the PNT component can be used to determine relational location and directional information for each and all RF systems in a network. Also, in some embodiments, there may be multiple antennas directly or indirectly connected to a processing module. In some embodiments, one antenna is paired to one RF module so that each RF module can control the receipt or transmission of any RF signals for the single antenna so that each antenna can operate independently from other antennas. Additional information regarding the hardware components is described herein with respect to FIGS. 1B and 3.

The functional blocks of FIG. 4 generally include a receive group corresponding to software and hardware functions associated with received signals, and a transmit group corresponding to software and hardware functions associated with transmission of signals. The receive and transmit groups of blocks include communications with one or more antennas and/or direction finders, depending on the particular configuration of an RF system (e.g., 102 or 106) associated with the software components. For example, the receive and transmit groups may include communications with at least one antenna or direction finder 1002, at least one directional antenna 1004, and/or any other directional antennas, direction finders, and/or other hardware components configured for transmission and/or reception of RF signals.

In some embodiments, direction finder 1002 may be configured to receive RF signals and antenna(s) 1004 may be configured to receive and/or transmit RF signals. Alternatively, either or both of the direction finder 1002 and antenna(s) 1004 may be configured to receive and transmit RF signals. Direction finder 1002 and/or antenna(s) 1004 may include broad-bandwidth antennas configured (e.g., via hardware) and/or tuned (e.g., via software, such as in a software defined antenna configuration) to transmit and/or receive RF signals across a wide range of frequencies. In some embodiments, direction finder 1002 and/or antenna(s) 1004 may be directional antennas configured to transmit and/or receive within a defined angular range, as described elsewhere herein. In some embodiments, the use of sectorized and/or directional antennas may advantageously prevent detection of signals emitted from the system or other transmitters near the system, which would otherwise interfere with the detection and analysis of signals from remote emitters that are intended to be detected by the system. Similarly, in some embodiments, the use of sectorized and/or directional antennas may advantageously prevent transmission of signals emitted from the system in a direction near the system and close to friendly devices or systems, which would otherwise interfere with the operation of the friendly devices or systems.

In some embodiments, the receive group of blocks is generally configured to receive and analyze data from one or more antennas (e.g., 1002 and/or 1004) corresponding to RF signals received at the one or more antennas (e.g., corresponding to one or more directions or areas). In some embodiments, the receive group of blocks can include a receiver block 1008, a signal detection block 1010, an RF machine learning block 1012, a direction finding block 1014, a line of bearing ("LOB") block 1016, a demodulation block 1018, and/or a data extraction block 1020. Some or all of the receive group blocks, such as the LOB 1016 and data extraction 1020 blocks, may include communications with a system manager 1022.

In some embodiments, the transmit group of blocks is generally configured to cause transmission of RF signals (e.g., corresponding to one or more directions or areas), using one or more antennas (e.g., 1002 and/or 1004), based on an output from the receive group of blocks. In some embodiments, the transmit group of blocks can include a detect to generate waveform block 1024, a waveform generator 1026, and an amplifier 1028.

In some embodiments, the receiver blocks 1008 is in communication with the one or more antennas such as antenna or direction finder 1002 and/or antenna 1004. In some embodiments, the receiver block 1008 is configured to receive raw signals from the one or more antennas. In some embodiments, the raw signals may be analog signals comprising one or more RF signal blocks, or may be digital signals generated by analog-to-digital conversion at the one or more antennas. The receiver 1008 may be configured for analog-to-digital conversion of analog RF signals received from the one or more antennas. In some embodiments, the receiver 1008 is in communication with the signal detection block 1010 and can send signals received from the one or more antennas, and/or converted to digital signals, to the signal detection block 1010.

In some embodiments, the signal detection block 1010 is configured to analyze signals received from the one or more antennas via the receiver block 1008. In some cases, the signals received from the receiver block 1008 may include a superposition of a plurality of signals emitted by different sources within the directional range of the one or more antennas. Accordingly, in some embodiments, the signal detection block 1010 is configured to identify and/or separate individual block signals based on the signals received from the receiver block 1008. The signal detection block 1010 annotates and/or filters the received signals based on factors such as frequency, time, intensity, and/or the like.

In some embodiments, the RF machine learning block 1012 (e.g., which is similar to any other machine learning blocks or embodiments described herein) may be implemented to train and/or apply one or more AI and/or ML models or parameter functions based at least in part on the raw, annotated, and/or filtered signals received from the receiver block 1008. In some embodiments, the machine learning block can implement one or more machine learning or artificial intelligence algorithms or parameter functions that may, for example, implement models that are executed by one or more processors for the detections/identifications. The machine learning block can be configured to apply a model that can help detect which types of RF signals (e.g., a range of RF signals, particular frequencies or combinations of frequencies, and/or the like) indicate which types of objects. One or more of these models may be used to determine an expected RF signal frequency range or additional signal properties based on analysis of received or captured data. In some embodiments, signal monitoring criteria or signal identification criteria can be designated by a user, admin, or automatically. For example, the signal monitoring criteria or signal identification criteria can indicate which types of detections to monitor, record, or analyze. By designating specific types of detections, resources (e.g., processing power, bandwidth, and/or the like) can be preserved for only the types of detections desired.

With respect to any software-related features (e.g., those described herein and with respect to FIGS. 1C and 4-9), the training, retraining, updating, implementation of, or use of any AI or ML models or parameter functions. For example, ML can improve automatically through experience and by the use of data (e.g., RF signal data). Although the terms machine learning and/or artificial intelligence are used herein, the scope of each term shall include each and every type of machine learning, artificial intelligence, neural network, and the like, known to a person of ordinary skill in the art. An AI or ML model can be built or trained based on sample data or training data in order to make predictions or decisions without being explicitly programmed to do so. In some embodiments, machine learning algorithms, models, and/or programs can perform tasks without being explicitly programmed to do so. For example, some aspects of the present disclosure may include training an AI/ML model in a computer to carry out certain desired tasks that a human may not be able to manually perform.

A number of different types of AI/ML algorithms and AI/ML models or approaches may be used by the machine learning component to implement the models. For example, certain embodiments herein may use a logistical regression model, decision trees, random forests, convolutional neural networks, deep networks, or others. However, other models are possible, such as a linear regression model, a discrete choice model, or a generalized linear model. The machine learning aspects can be configured to adaptively develop and update the models over time based on new input. For example, the models can be trained, retrained, or otherwise updated on a periodic basis as new received data is available to help keep the predictions in the model more accurate as the data is collected over time. Also, for example, the models can be trained, retrained, or otherwise updated based on configurations received from a user, admin, or other devices. Some non-limiting examples of machine learning algorithms that can be used to train, retrain, or otherwise update the models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), support-vector machines, federated learning, and/or other machine learning algorithm. These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of received data may be analyzed to generate or implement models with minimal, or with no, manual analysis or review by one or more people.

In some embodiments, supervised learning algorithms can build a mathematical model of a set of data that contains both the inputs and the desired outputs. For example, training data can be used, which comprises a set of training or labeled/annotated examples. Each training example has one or more inputs and the desired output, also known as a supervisory signal. In the mathematical model, for example, each training example is represented by an array or vector (e.g., a feature vector), and the training data is represented by a matrix. Through iterative optimization of an objective function, supervised learning algorithms can learn a function that can be used to predict the output associated with new inputs. An optimal function, for example, can allow the algorithm to correctly determine the output for inputs that were not a part of the training data. For instance, an algorithm that improves the accuracy of its outputs or predictions over time is said to have learned to perform that task. Types of supervised-learning algorithms may include, but are not limited to: active learning, classification, and regression. Classification algorithms, for example, are used when the outputs are restricted to a limited set of values. Regression algorithms, for example, are used when the outputs may have any numerical value within a range. As an example, for a classification algorithm that filters emails, the input would be an incoming email, and the output would be the name of the folder in which to file the email. In some embodiments, similarity learning, an area of supervised machine learning, is closely related to regression and classification, but the goal is to learn from examples using a similarity function that measures how similar or related two objects are. In some embodiments, similarity learning has applications in ranking, recommendation systems, visual identity tracking, face verification, and speaker verification.

In some embodiments, unsupervised learning algorithms can take a set of data that contains only inputs, and find structure in the data, like grouping or clustering of data points. For example, the algorithms can learn from test data that has not been labeled, classified, or categorized. Instead of responding to feedback, unsupervised learning algorithms can identify commonalities in the data and react based on the presence or absence of such commonalities in each new piece of data. In some embodiments, unsupervised learning encompasses summarizing and explaining data features. In some embodiments, cluster analysis is the assignment of a set of observations into subsets (e.g., clusters) so that observations within the same cluster are similar according to one or more predesignated criteria, while observations drawn from different clusters are dissimilar. In some cases, different clustering techniques can make different assumptions on the structure of the data, often defined by some similarity metric and evaluated, for example, by internal compactness, or the similarity between members of the same cluster, and separation, the difference between clusters. Other methods, for example, can be based on estimated density and graph connectivity.

In some embodiments, semi-supervised learning can be a combination of unsupervised learning (without any labeled training data) and supervised learning (with completely labeled training data). For example, some of the training examples may be missing training labels, and in some cases such training examples can produce a considerable improvement in learning accuracy as compared to supervised learning. In some embodiments, and in weakly supervised learning, the training labels can be noisy, limited, or imprecise; however, these labels are often cheaper to obtain, resulting in larger effective training sets.

In some embodiments, an area of machine learning is concerned with how software agents ought to take actions in an environment so as to maximize some notion of cumulative reward. In some embodiments, the environment is typically represented as a Markov decision process (MDP). In some embodiments, reinforcement learning algorithms use dynamic programming techniques. In some embodiments, reinforcement learning algorithms do not assume knowledge of an exact mathematical model of the MDP, and are used when exact models are infeasible.

In addition to supervised learning algorithms, unsupervised learning algorithms, and semi-supervised learning, and in some embodiments, other types of machine learning methods can be implemented, such as: reinforcement learning (e.g., how software agents ought to take actions in an environment so as to maximize some notion of cumulative reward); dimensionality reduction (e.g., process of reducing the number of random variables under consideration by obtaining a set of principal variables); self-learning (e.g., learning with no external rewards and no external teacher advice); feature learning or representation learning (e.g., preserve information in their input but also transform it in a way that makes it useful); anomaly detection or outlier detection (e.g., identification of rare items, events or observations which raise suspicions by differing significantly from the majority of the data); association rules (e.g., discovering relationships between variables in large databases); and/or the like.

In some embodiments, the direction finding block 1014 can be configured to determine a direction associated with a signal or signal component detected at the signal detection block 1010. In some embodiments, the direction finding block can be configured to find a direction of the signal or signal component based on two or more measurements from different locations and/or different antennas. For example, in some embodiments, the direction finding block 1014 may employ a phase and/or a doppler technique to more precisely find a direction based on a matching signal received at a plurality of antennas, as described elsewhere herein. Data analyzed by the direction finding block 1014, for example, may include data captured by the one or more direction finder 1002 and/or the antenna(s) 1004. For example, data from multiple receiving antennas can be used together to determine a more accurate location of an identified object emitting detected signals.

In some embodiments, the line of bearing ("LOB") block 1016 can be configured to generate and provide a LOB in conjunction with the direction finding block 1014. The LOB may be, for example, an azimuth from direction finder 1002 or antenna(s) 1004 to a transmitter associated with a received signal. In the case of moving emitters such as ground or aerial vehicles, the LOB block 1016 may further be configured to determine multiple LOBs associated with an individual emitter over time to track the location and/or motion of the emitter.

In some embodiments, the demodulation block 1018 can be configured to extract information-bearing signals from signals received at the one or more antennas. In some embodiments, the demodulation block 1018 can be optional and the system can move straight from the signal detection block 1010 to data extraction 1020, for example. For example, in some cases, RF signals may be carrier waves modulated with an information-bearing signal which may contain useful information associated with a mobile object or other object that transmitted the signal. The demodulation block 1018 can extract such information which may be, for example, in the form of an audio signal, a video signal, a binary data signal, or other information-bearing signal transmitted in a carrier wave signal received at the one or more antennas.

In some embodiments, the data extraction block 1020 can receive and analyze any demodulated signals generated by the demodulation block 1018. For example, the data extraction block can identify any data payloads being transmitted in a received signal. The data extraction block 1020 can further be configured for associated functionality such as decryption or other analysis of extracted data.

In some embodiments, the system manager 1022 is in communication with the data extraction block 1020, the LOB block 1016, and/or any other functional blocks as illustrated in FIG. 4. In some embodiments, the system 1022 can receive the information output from one or more of the connected components and provide it to an administrator or other system in the network. In some embodiments, the system 1022 can configure one or more of the connected components to adjust functionality or settings, as needed.

In some embodiments, the detect to generate waveform block 1024 determines a waveform to be transmitted, for example, based on an output from the signal detection 1010 and/or RF machine learning 1012 blocks. The waveform may include, for example, signal components and/or operational instructions in frequencies on which the emitting device is known to transmit and/or receive, based at least in part on the output of the RF machine learning model and/or based on the loadset 1030.

In some embodiments, the waveform generator 1026 receives the desired waveform from the detect to generate waveform block 1024 and converts the waveform to an analog waveform for transmission via one or more antennas. The waveform generator 1026 sends the analog waveform to the amplifier 1028 (e.g., a power amplifier).

In some embodiments, the amplifier 1028 may be an amplifier or booster configured to amplify an analog waveform to be transmitted by one or more antennas, for example, the antenna(s) 1004. An output from the amplifier 1028 is sent to the antenna(s) 1004 for transmission (e.g., in one or more directions or areas).

In some embodiments, the functional blocks can further include one or more loadsets 1030. A loadset 1030 may include one or more predetermined parameters corresponding to an operational environment in which the system is deployed. For example, in some embodiments the loadset 1030 may determine parameters associated with an operational detection frequency range, transmission frequency range, change rate, or other attributes of the system. The loadset 1030 may further include known properties and/or signal components, transmission frequencies, and/or the like associated with types of emitters known to exist in the operational environment and possibly expected to be detected by the system. For example, the loadset 1030 may include a whitelist and/or a blacklist corresponding to known friendly or non-friendly equipment. The loadset 1030 may be predetermined and/or may be generated and/or updated during operation as emitters are detected, discovered, identified, tracked, recovered, or the like.

Figure 5:
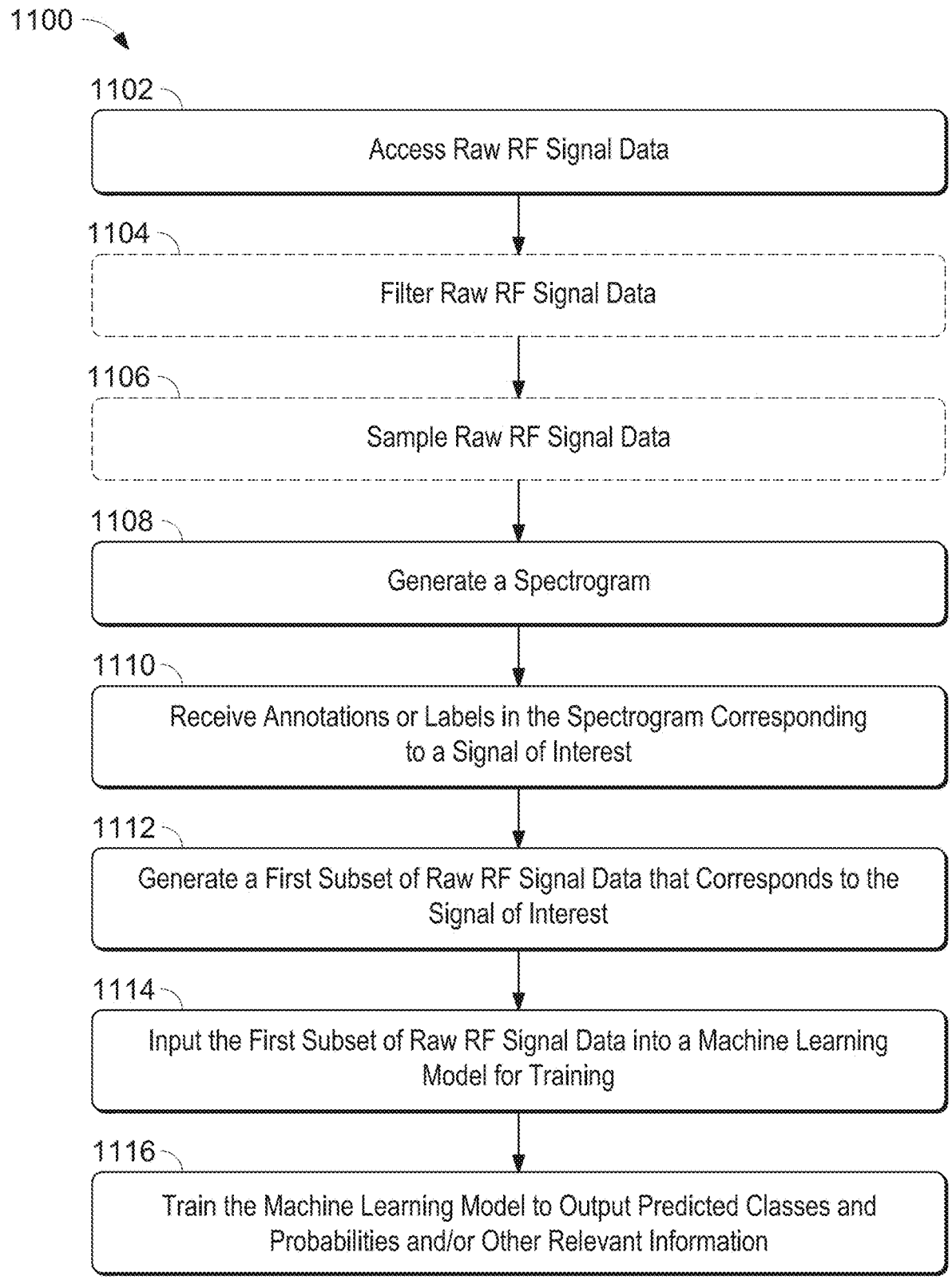
FIG. 5 illustrates an example flow for training an RF artificial intelligence, machine learning model, according to various embodiments of the present disclosure.
Figure 6:
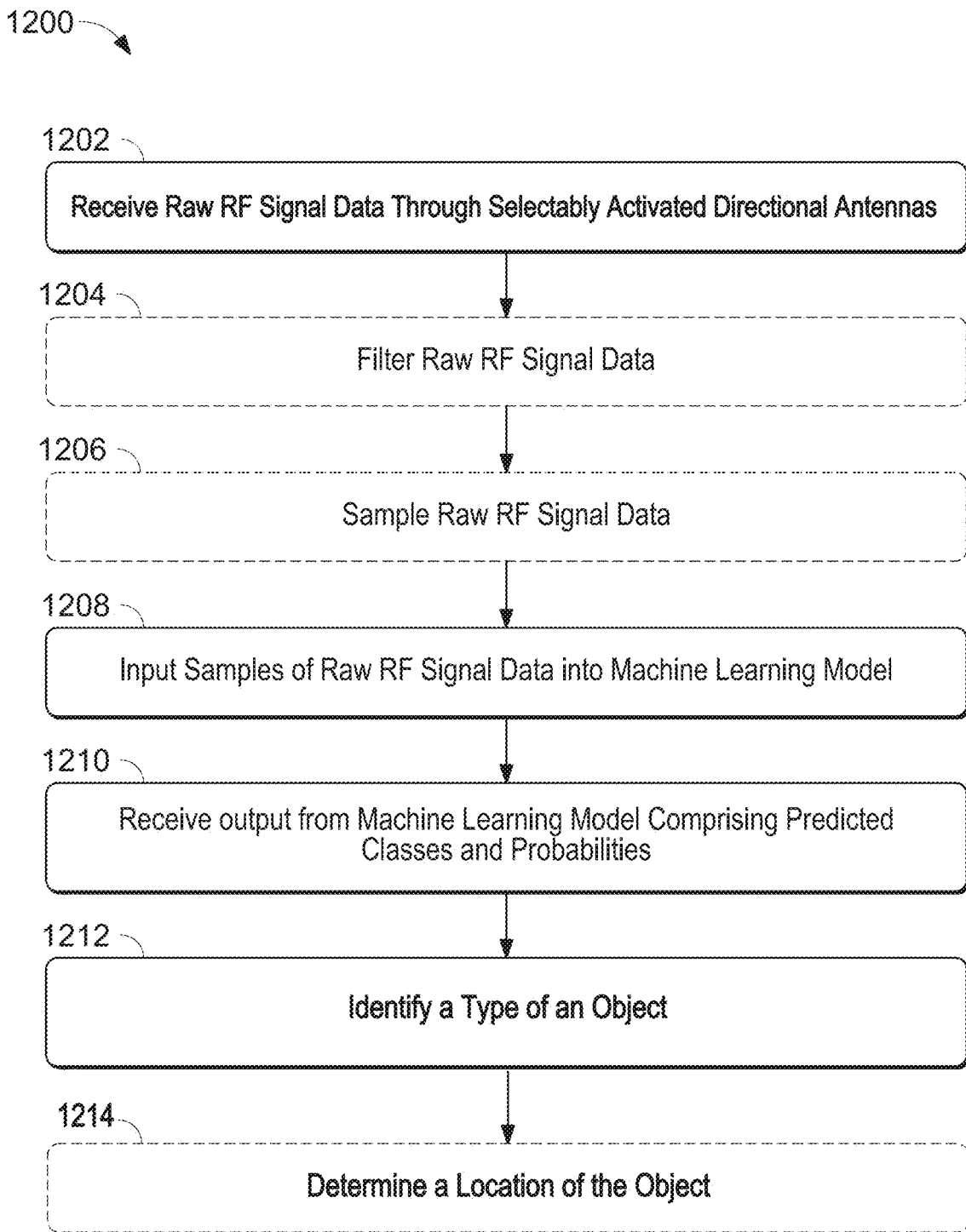
FIG. 6 illustrates an example flow for applying a trained RF artificial intelligence, machine learning model, according to various embodiments of the present disclosure.

FIGS. 5-6 illustrate example flows pertaining to training and application of an RF AI/ML model, according to various embodiments of the present disclosure. The blocks of the flowcharts illustrate example implementations, and in various other implementations various blocks may be rearranged, optional, and/or omitted, and/or additional blocks may be added. In various implementations (e.g., with respect to FIGS. 5-6), various aspects of the functionality described may be accomplished in substantially real-time, e.g., received data may be processed as it is received. Alternatively, various aspects of the functionality described (e.g., with respect to FIGS. 5-6) may be accomplished in batches and/or in parallel, and/or by multiple systems or devices. In some embodiments, the example software components of FIGS. 5-6 may be implemented in conjunction with, or by, one or more of any systems or devices described herein, such as those described in FIG. 1A, for example. In some embodiments, training of a machine learning algorithm (e.g., FIG. 5) can be performed on one device (e.g., with input from a person) and application of the trained machine learning algorithm can be implemented by one or more RF systems. In some embodiments, the example software components of FIGS. 5-6 may be implemented in conjunction with, or by, RF systems 102 and 106 (e.g., including any software components, such as those described in relation to FIG. 1C, and/or hardware components, such as those described in relation to FIG. 1B) of the present disclosure, for example. In some embodiments, processing of any software or electronic data can be executed by one or more components of the processing module(s) 130 and/or the RF module(s) 131, for example. For instance, in some embodiments, machine learning algorithms can be trained or applied using GPU(s) 138 and/or other components of the processing module(s) 130. Additionally, in some instances, an RF signal can be generated by an SDR transceiver 139, then sent to the RF module 131 prior to transmitting via one or more directional antenna(s) 122, for example. Additionally, in some instances, an RF signal can be received by one or more directional antennas 122, then sent through the RF module 131, before being processed by the processing module 130 (e.g., by application of a machine learning algorithm or model, for example, using a GPU 138). With respect to ensuring a transmitted RF signal is sent in the proper direction or by the appropriate directional antenna, each RF system can use a PNT component 140 to determine feature or characteristics associated with the corresponding RF system's location, directional orientation, elevation/altitude, and the like. Such information from the PNT component 140, or data received pertaining to the PNT component 140 of another RF system, can be used to determine which directional antenna(s) to activate and transmit from or to use to track identified objects. For example, the PNT component is an important component in determining relational location and directional information for each and all RF systems in a network. Also, in some embodiments, there may be multiple antennas directly or indirectly connected to a processing module. In some embodiments, one antenna is paired to one RF module so that each RF module can control the receipt or transmission of any RF signals for the single antenna so that each antenna can operate independently from other antennas. Additional information regarding the hardware components is described herein with respect to FIGS. 1B and 3. FIG. 5 illustrates an example flow 1100 for training an RF AI/ML model, according to various embodiments of the present disclosure. The flow 1100 pertains generally to collecting and inputting raw RF signal data (e.g., filtered and/or sampled raw RF signal data and/or a subset thereof) into an RF AI/ML model for training the model to generate outputs such as predicted classes and probabilities. Although the description below with respect to blocks 1102-1116 describes an example RF system as implementing the blocks, one or more of blocks 1102-1116 can be implemented by any of one or more systems or devices (e.g., sensors, devices, antennas, servers, or one or more RF systems).

At block 1102, raw RF signal data can be collected by one or more systems in an area (e.g., sensors, devices, antennas, one or more RF systems). For example, an RF system (e.g., 102 or 106) can use one or more of its corresponding broad-bandwidth antennas to detect and record raw RF signal data. In some embodiments, the broad-bandwidth antennas can be configured (e.g., via hardware) or tuned (e.g., via software) to detect frequencies within a specified range. In some embodiments, the broad-bandwidth antennas can be configured or tuned to detect all RF frequencies. The raw RF signal data for model training may be RF signal data associated with a known emitter or class of emitters such that the RF signal data can be associated with a desired output (e.g., the known emitter or class of emitters and/or characteristics associated with the known emitter or class of emitters).

At block 1104, the RF system can be configured to filter raw RF signal data collected from block 1102. For example, in some embodiments, the RF system can remove RF signals from the raw RF signal data collected that may correspond to RF signals associated with friendly equipment, equipment that has been manually or automatically flagged as friendly, or filter raw RF signal data based on a whitelist and/or blacklist (e.g., manually and/or automatically populated). In some embodiments, block 1104 can be optional, and in some embodiments, or for some RF systems in a network, there may be no filtering present. For example, a first RF system in an area may face friendly equipment that emits one or more RF signals. The first RF system may exclude/filter the one or more RF signals from the raw RF signal data collected at block 1102. In some embodiments, the filtering can include a complete or partial suppression of one or more aspects of the raw RF signal data, or any of the raw RF signal data that has been processed in any way (e.g., by sampling, or the like). For example, the complete or partial suppression of the one or more aspects can include removing specific RF signals (e.g., as described in this paragraph or elsewhere herein) or attributes (e.g., certain portions of an RF signal corresponding to noise or low quality data, or the like) associated with specific RF signals from the raw RF signal data.

In some embodiments, the RF system can include hardware and/or or software filter technology. For example, there may be nearby equipment that emits signals in a particular frequency range where an antenna corresponding to an RF system is facing, and the antenna can be (1) designed/configured to operate in certain frequency bands (e.g., excluding specific RF frequency bands), (2) programmed to filter received signals (e.g., with software) so as to not interfere with analysis of received signals, and/or (3) filter transmitted signals (e.g., with software or additional digital signal filtering equipment) so as to minimize or remove interference with the operation of the nearby equipment.

At block 1106, the RF system can sample the raw RF signal data received from block 1102 or 1104 (depending on whether any filtering is implemented by the specific RF system). In some embodiments, sampling at block 1106 may occur prior to filtering at block 1104, vice versa, or at the same time. In some embodiments, very large amounts of data are collected very quickly, and processing such large amounts of data (e.g., using the RF AI/ML model) can require large amounts of energy, processing power, and/or time. In practice, the RF system should be able to detect an object, identify a signal associated with the object, and transmit a signal towards the object (e.g., see FIGS. 7-9) within seconds. Any delays could result in poor performance and unreliability of the RF system. Thus, sampling of raw RF data can be used to reduce the quantity of data that is processed by the RF AI/ML model but to maintain a high quality (e.g., due to the signal data not varying over such small amounts of time). So, in some embodiments, the sampling of raw RF signal data can vary based on numerous factors: (1) hardware or processing limitations of the RF system (e.g., processing power as a product of local temperatures or hardware selection), (2) quantity/quality of collected raw RF signal data to process (e.g., if a lot of the raw RF signal data was filtered at block 1204, less sampling would be needed), and any other factors that impact speed of processing by the RF system. Application of the RF AI/ML model can require significant amounts of processing power to process all the collected data and sampling can provide a balance between reduced computational demands, maintaining system performance, and providing accurate results. The RF system may, for example, sample the raw signal for some period of time (e.g., some number of milliseconds, such as 1 ms, 2 ms, 3 ms, 5 ms, 10 ms, 50 ms, or some other period of time). In various embodiments, other, or additional, sampling methods may be employed. For example, in some embodiments, sampling raw signals or raw signal (e.g., RF) data can include any form of data sampling such as: (1) sampling based on probability (e.g., an approach that uses random numbers that correspond to points in the data set to ensure that there is no correlation between points chosen for the sample) such as systematic sampling (e.g., a sample is created by setting an interval or timestep (e.g., which can be preconfigured or determined by the system automatically) at which to extract data from the larger population—for example, selecting all raw RF signal data every 1 ms, 5 ms, 10 ms, 20 ms, 50 ms, and/or the like), or (2) sampling based on nonprobability (e.g., an approach in which a data sample is determined and extracted based on the judgment of an analyst), or (3) a combination. In some embodiments, for example and as mentioned above, the sampling of raw RF signal data can vary based on numerous factors (e.g., hardware or processing limitations of the RF system, or quantity or quality of the collected raw RF signal data, and/or the like). In some embodiments, an interval or timestep can be automatically determined by each specific RF system automatically (e.g., on the fly) depending on one or more of the numerous factors. In some embodiments, the interval or timestep can be preconfigured manually. In some embodiments, a maximum or minimum interval or timestep can be preconfigured, where each RF system can automatically determine an actual interval or timestep within the range. For example, an operator can manually, or the RF system can automatically, set the interval or timestep to a range at 0ms (e.g., no sampling) to 15 ms (e.g., or any other time interval).

At block 1108, the RF system can generate a spectrogram based on the raw RF signal data (e.g., signal data received at block 1102) and/or based on sampled raw RF signal data (e.g., signal data sampled at block 1106). The spectrogram can describe and/or display the raw RF signal data or sampled raw RF signal data as a function of frequency, time, and/or intensity. For example, in some embodiments the spectrogram may be generated based on the time-domain RF signal data using a Fourier transform.

At block 1110, the RF system can receive annotations or labels in the spectrogram corresponding to a signal of interest occurring over a period of time. The annotations or labels may indicate a variety of characteristics that may be useful for AI/ML model training including, but not limited to, individual frequency components corresponding to signals of interest within the spectrogram, combinations of individual frequency components, intensities of individual frequency components, relative intensities among different frequency components, and/or any time variation associated with signals of interest such as time variation of intensity of a signal or frequency component thereof, stepwise or period variation in a signal or frequency component thereof, and/or the like.

At block 1112, the RF system can filter or generate a subset of the raw RF signal data that corresponds to the signal of interest based on the annotations or labels applied at block 1110. In some embodiments, the filtering may include removal of signal data (e.g., signal noise and/or signal components) that are not part of the signal of interest to be used for AI/ML model training. Filtering can further include selection of a time-based segment of the annotated spectrogram (e.g., a segment of 0.5 ms, 1 ms, 2 ms, and/or the like). In some embodiments, the filtering can include removing one or more RF signals from the raw RF signal data that correspond to: (1) one or more base line RF signals, (2) one or more previously-identified RF signals, (3) one or more RF signals already identifiable or otherwise known, (4) RF signals associated with friendly equipment, (5) RF signals associated with equipment that has been manually or automatically flagged as friendly, or (6) a preconfigured whitelist or blacklist.

At block 1114, the RF system can input a subset of raw RF signal data (e.g., the subset obtained by filtering at block 1112) into a machine learning model (e.g., in the RF machine learning component 1012 of FIG. 4) such as the RF AI/ML model for training the machine learning model. The subset of raw RF signal data may be associated with additional data such as the spectrogram generated at block 1108 or a portion thereof, and/or data corresponding to the annotations or labels received at block 1110.

At block 1116, the RF machine learning component 1012 trains the machine learning model. The training at block 1116 can train the machine learning model to generate outputs based on subsequent signals. For example, the machine learning model may be trained to analyze subsequent signals and output predicted classes of emitters corresponding to received signals and associated probabilities that a signal of interest identifies a particular class of emitter. In another example, the machine learning model may be trained to output data corresponding to the RF signal data as a function of time corresponding to the period of time in which the signal of interest is identified to occur. For instance, complex data associated with the signal of interest can be compiled into a snippet of data corresponding to a period of time the signal of interest occurred. For example, a signal of interest may have been detected to occur of 3 seconds and the complex data associated with that raw RF signal data can be output alongside the predicted classes and probabilities to be used later when the machine learning model is applied to new data (e.g., as described in more detail in FIG. 6). In some embodiments, the training at block 1116 may be supervised training in which the inputs at block 1114 are associated with a known emitter or class of emitters, or one or more characteristics thereof, such that the machine learning model is trained to associate characteristics of the subset of the raw RF signal data input at block 1114 with the correct emitter or class of emitters. The method 1100 may be repeated any number of times based on a large number of RF signal data samples and/or subsets so as to iteratively train the machine learning model to accurately classify emitters or other objects based on RF signal emissions detected in subsequent operation of the system.

FIG. 6 illustrates an example flow 1200 for applying a trained RF artificial intelligence, machine learning model, according to various embodiments of the present disclosure. The flow 1200 pertains generally to collecting and inputting raw RF signal data (e.g., filtered and/or sampled) into an RF AI/ML model, receive classes and probabilities output from the RF AI/ML model, then identify a type of object based on the classes and probabilities. Although the description below with respect to blocks 1202-1214 described an example RF system as implementing the blocks, blocks 1202-1214 can be implemented by any of one or more systems or devices (e.g., sensors, devices, antennas, servers, one or more RF systems).

At block 1202, raw RF signal data can be collected or received by one or more systems in an area (e.g., sensors, devices, antennas, one or more RF systems). For example, an RF system (e.g., 102 or 106) can use one or more of its corresponding broad-bandwidth antennas to detect, receive, and/or record raw RF signal data. In some embodiments, the broad-bandwidth directional antennas can be configured (e.g., via hardware) or tuned (e.g., via software) to detect frequencies within a specified range. In some embodiments, the broad-bandwidth directional antennas can be configured or tuned to detect all RF frequencies. In some embodiments, the broad-bandwidth directional antennas can be selectably activated. For example, each broad-bandwidth directional antenna (e.g., associated with an RF system) can be configured to be turned on or turned off by the associated system, and/or the associated system can determine or select to receive or use signals from particular ones, or groups of, the directional antenna. For instance, each broad-bandwidth directional antenna may be in a specific position and/or facing a specific direction, which may be in a direction where RF signals are not needing to be detected (e.g., friendly equipment may be emitting signals, no target objects detected in the area, or the like), and the associated system would be able to turn off or turn on, or selectively receive or use signals from, such broad-bandwidth directional antenna(s).

At block 1204, the RF system can be configured to filter raw RF signal data collected from block 1202. For example, in some embodiments, the RF system can remove RF signals from the raw RF signal data collected that may correspond to RF signals associated with friendly equipment, equipment that has been manually or automatically flagged as friendly, or filter raw RF signal data based on a whitelist and/or blacklist (e.g., manually and/or automatically populated). Block 1204 can be optional, and in some embodiments, or for some RF systems in a network, there may be no filtering present. For example, a first RF system in an area may face friendly equipment that emits one or more RF signals. The first RF system may exclude/filter the one or more RF signals from the raw RF signal data collected at block 1202. In some embodiments, the filtering can include removing one or more RF signals from the raw RF signal data that correspond to: (1) one or more base line RF signals, (2) one or more previously-identified RF signals, (3) one or more RF signals already identifiable or otherwise known, (4) RF signals associated with friendly equipment, (5) RF signals associated with equipment that has been manually or automatically flagged as friendly, or (6) a preconfigured whitelist or blacklist.

In some embodiments, the RF system can include hardware and/or or software filter technology. For example, there may be nearby equipment that emits signals in a particular frequency range where an antenna corresponding to an RF system is facing, and the antenna can be (1) designed/configured to operate in certain frequency bands (e.g., excluding specific RF frequency bands), (2) programmed to filter received signals (e.g., with software) so as to not interfere with analysis of received signals, and/or (3) filter transmitted signals (e.g., with software or additional digital signal filtering equipment) so as to minimize or remove interference with the operation of the nearby equipment.

At block 1206, the RF system can sample the raw RF signal data received from block 1202 or 1204 (depending on whether any filtering is implemented by the specific RF system). In some embodiments, sampling at block 1206 may occur prior to filtering at block 1204, vice versa, or at the same time. In some embodiments, very large amounts of data are collected very quickly, and processing such large amounts of data (e.g., using the RF AI/ML model) can require large amounts of energy, processing power, and/or time. In practice, the RF system should be able to detect an object, identify a signal associated with the object, and transmit a signal towards the object (e.g., see FIGS. 7-9) within seconds. Any delays could result in poor performance and unreliability of the RF system. Thus, sampling of raw RF data can be used to reduce the quantity of data that is processed by the RF AI/ML model but to maintain a high quality (e.g., due to the signal data not varying over such small amounts of time). So, in some embodiments, the sampling of raw RF signal data can vary based on numerous factors: (1) hardware or processing limitations of the RF system (e.g., processing power as a product of local temperatures or hardware selection), (2) quantity of collected raw RF signal data to process (e.g., if a lot of the raw RF signal data was filtered at block 1204, less sampling would be needed), and any other factors that impact speed of processing by the RF system. Application of the RF AI/ML model can require significant amounts of processing power to process all the collected data and sampling can provide balance between reduced computational demands, maintaining system performance, and providing accurate results. The RF system may, for example, sample the raw signal for some period of time (e.g., some number of milliseconds, such as 1 ms, 2 ms, 3 ms, 5 ms, 10 ms, 50 ms, or some other period of time). In various embodiments, other, or additional, sampling methods may be employed. For example, in some embodiments, sampling raw signals or raw signal (e.g., RF) data can include any form of data sampling such as: (1) sampling based on probability (e.g., an approach that uses random numbers that correspond to points in the data set to ensure that there is no correlation between points chosen for the sample) such as systematic sampling (e.g., a sample is created by setting an interval at which to extract data from the larger population—for example, selecting all raw RF signal data every 1 ms, 5 ms, 10 ms, 50 ms, and/or the like), or (2) sampling based on nonprobability (e.g., an approach in which a data sample is determined and extracted based on the judgment of an analyst), or (3) a combination.

At block 1208, the raw RF signal data (e.g., that has been filtered at block 1204 and/or sampled at block 1206) is input into a machine learning model, such as the RF AI/ML model. The machine learning model, for example, can be the same as described elsewhere herein such as in FIG. 5 with respect to training the model.

At block 1210, the RF system receives output from the machine learning model (e.g., the RF AI/ML model) which comprises predicted classes and probabilities. In some embodiments, each class corresponds to a signal or type of object the machine learning model is trained to identify, and the probabilities indicate a likelihood that a signal analyzed from the raw RF signal data (e.g., as input into the machine learning model at block 1208) corresponds to an RF signal or type of object the machine learning model has been previously trained to identify (e.g., using the methodology described herein and/or with respect to FIG. 5). In some embodiments, the methodology can be stopped here and the classes and probabilities can be output for the RF system, or any other system or device implementing the machine learning model, to use as data to identify an object associated with a specific signal of interest identified in the raw RF signal data collected. For example, block 1213 in FIG. 7 discloses determination of additional features associated with the signals of interest identified in the raw RF signal data corresponding to a first type of object which may be applied here.

At block 1212, the RF system identifies a type of object associated with one or more signals of interest identified in the collected raw RF signal data based on an output of the machine learning model (e.g., classes and probabilities output from the machine learning model at block 1210). In some embodiments, block 1212 can implement similar methodology as described in relation to block 1213 in FIG. 7, which discloses determination of additional features associated with the signals of interest identified in the raw RF signal data corresponding to a first type of object which may be applied here. Additionally, and in some embodiments, a look-up table may be implemented and used to cross-reference signals of interest with a database comprising information regarding known devices/objects and corresponding signal ranges so that the identified signal of interest can be matched with one or more known devices/objects in the look-up table. In some embodiments, the look-up table can be proprietary, public, or both, or created using information from public or proprietary resources. For example, specification sheets may be used to supplement data in the look-up table. Also, for example, confirmed identifications by the machine learning model can be added to the look-up table as well. The look-up table can be updated regularly or semi-regularly automatically (through the use of APIs connecting to manufacturer or third-party servers) or manually.

At block 1214, the RF system can optionally determine the location of the object associated with one or more signals of interest identified in the collected raw RF signal data (e.g., based on positioning of associated directional antennas). For example, if an antenna is facing north and it detects the object (e.g., by collecting RF signal data associated with the object), then the RF system can determine that the object is located or positioned to the north of the RF system. In some embodiments, using a series of RF systems and corresponding antennas, a more precise location or position of the object can be determined as well. In some embodiments, signal strength received by various antennas can additionally be used to determine object location or positions. Such object location or position can be determined over time, such that a movement of the object can be determined. In some embodiments, the RF system can also transmit location and/or movement information associated with the object to another external system, for example, to one or more of a second RF system, additional systems or sensors (e.g., 104), and/or a central processing server (e.g., 107). Such external systems can then determine, activate, or implement an appropriate response based on the detection provided by first RF system, for example. Also, such external systems can be used to determine a more precise location or movement information associated with the object, for example. Additionally, as noted above, further examples of communicating and coordinating with one or more external or other systems, device, and/or sensors components are provided in, for example, the '059 Publication and the '824 Publication. For example, any information related to detections, tracking, identifications, determinations, or the like performed by the RF system (and/or other RF systems, for example) can be provided to one or more external or other systems, device, and/or sensors so that the one or more external or other systems, device, and/or sensors can work independently and/or in tandem with one another (e.g., including the originating RF system (and/or other RF systems)) to activate one or more responses, such as to intercept the object (e.g., as described in the '824 Publication), and/or to make one or more determinations.

Figure 7:
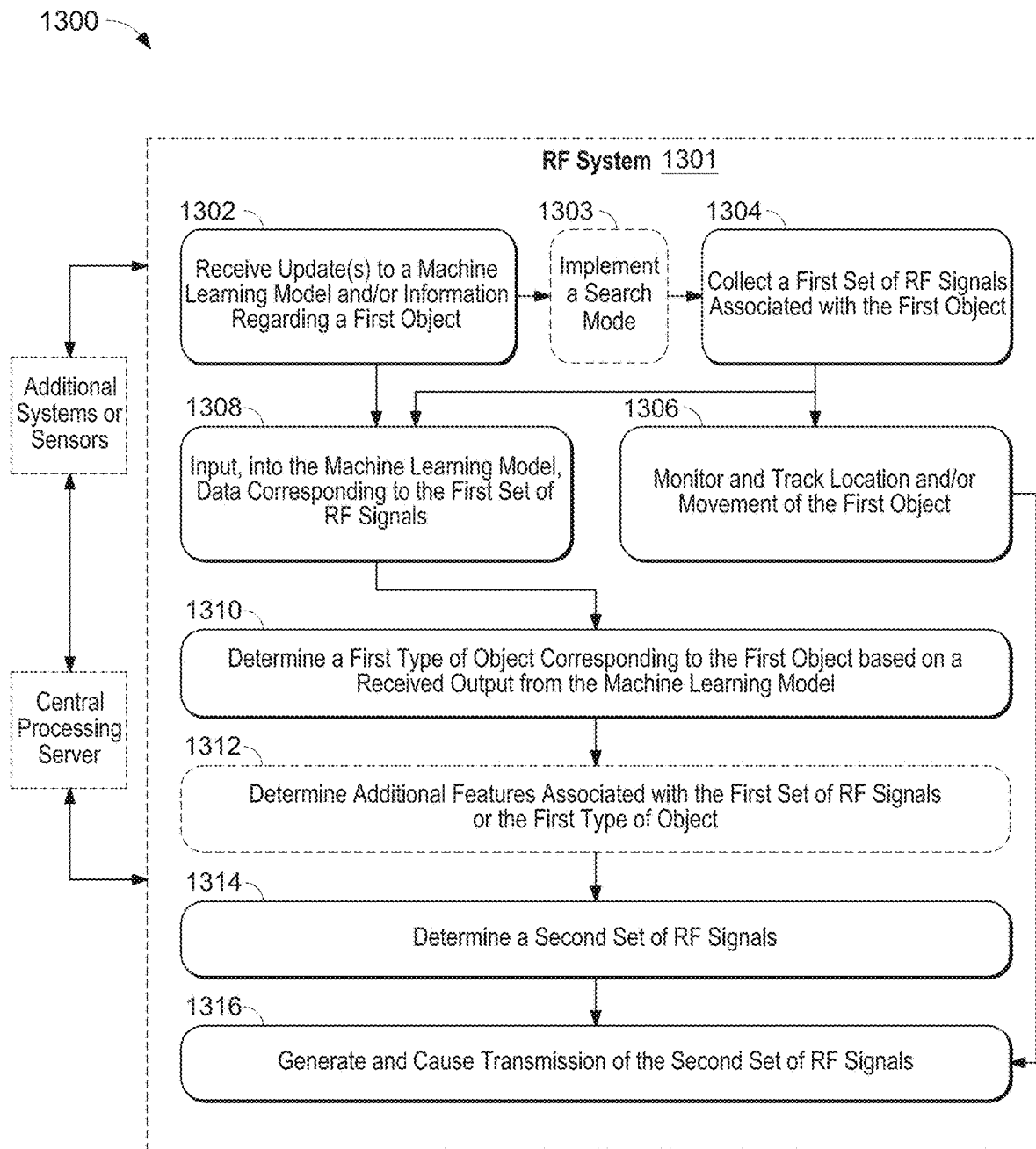
FIG. 7 illustrates an example flow for transmission and tracking of an object using an RF system, according to various embodiments of the present disclosure.
Figure 8:
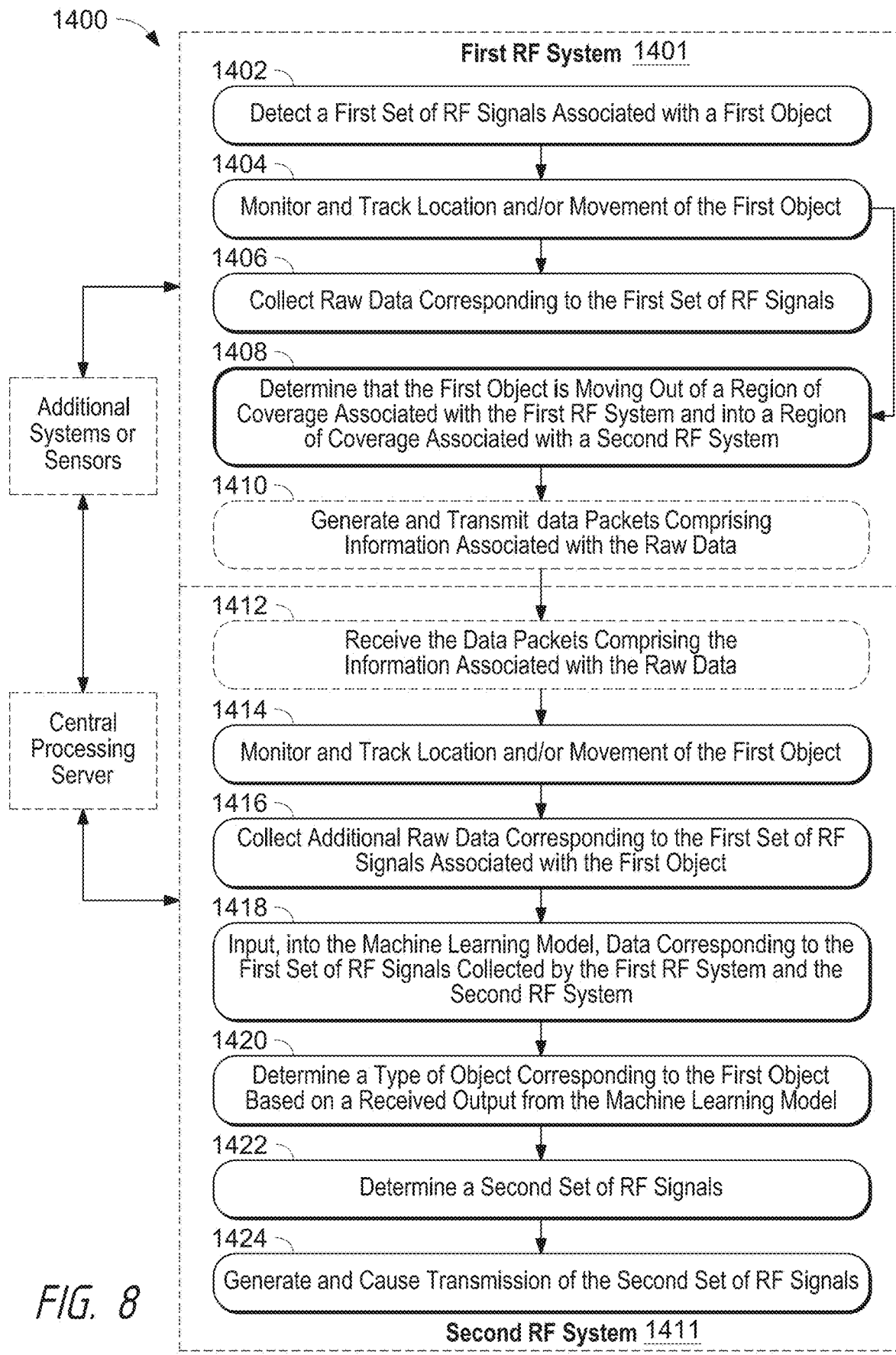
FIG. 8 illustrates an example flow for coordinating the application of an RF artificial intelligence, machine learning model between multiple connected systems and devices, according to various embodiments of the present disclosure.
Figure 9:
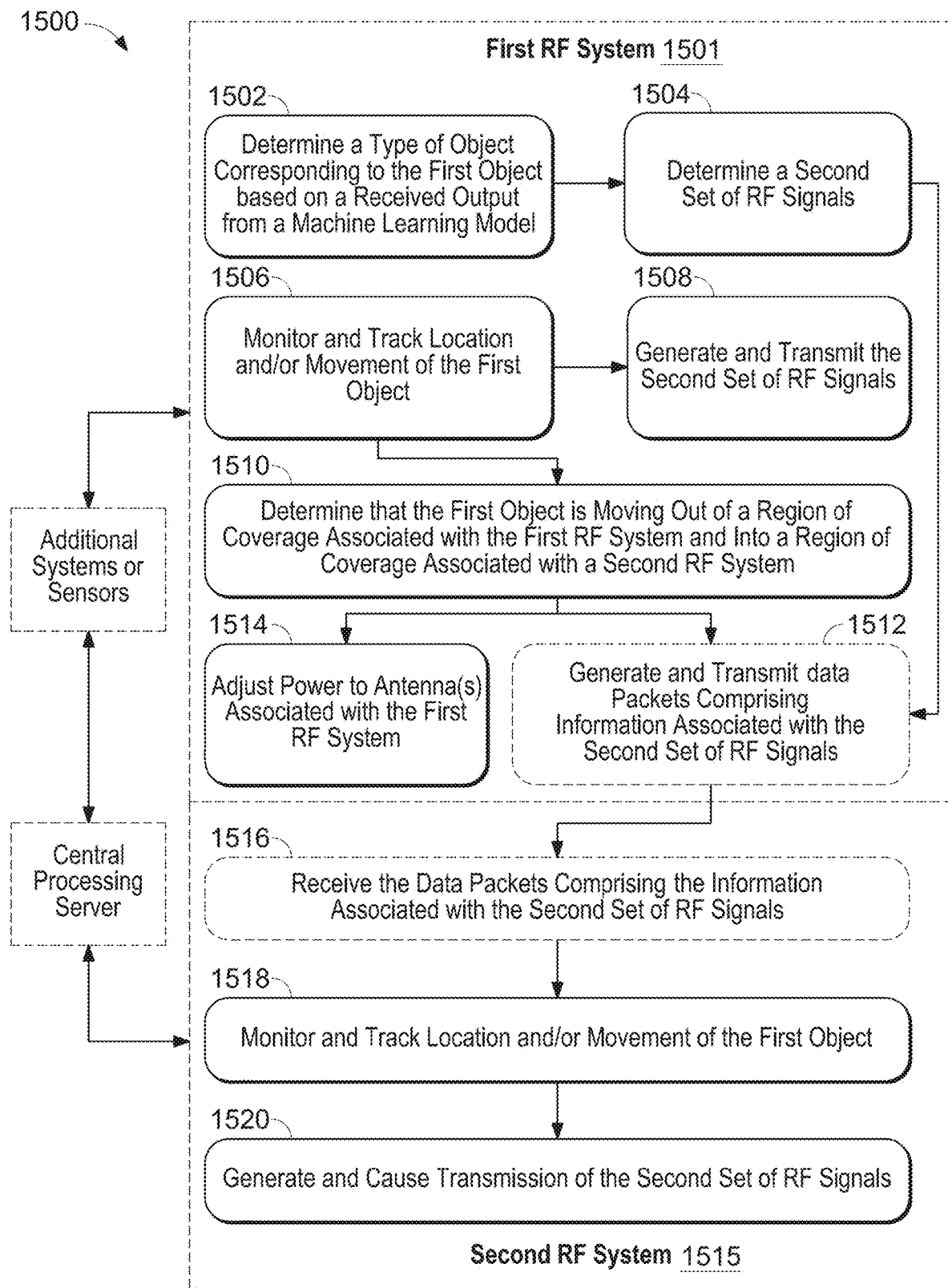
FIG. 9 illustrates an example flow for coordinating multiple connected systems and devices, according to various embodiments of the present disclosure.

FIGS. 7-9 are flowcharts illustrating example methods and functionality of one or more RF systems, according to various embodiments of the present disclosure. The blocks of the flowcharts illustrate example implementations, and in various other implementations various blocks may be rearranged, optional, and/or omitted, and/or additional blocks may be added. The terms and concepts described in FIGS. 7-9 are similar to, and related to, those described in FIGS. 4-5 and elsewhere herein and should be used to provide additional clarification and understanding to FIGS. 7-9. In various implementations (e.g., with respect to FIGS. 7-9), various aspects of the functionality described may be accomplished in substantially real-time, e.g., received data may be processed as it is received. Alternatively, various aspects of the functionality described (e.g., with respect to FIGS. 7-9) may be accomplished in batches and/or in parallel, and/or by multiple systems or devices. In some embodiments, the example software components of FIGS. 7-9 may be implemented in conjunction with, or by, RF systems 102 and 106 (e.g., including any software components, such as those described in relation to FIG. 1C, and/or hardware components, such as those described in relation to FIG. 1B) of the present disclosure, for example. For instance, in some embodiments, machine learning algorithms can be trained or applied using GPU(s) 138 and/or other components of the processing module(s) 130. Additionally, in some instances, an RF signal can be generated by an SDR transceiver 139, then sent to the RF module 131 prior to transmitting via one or more directional antenna(s) 122, for example. Additionally, in some instances, an RF signal can be received by one or more directional antennas 122, then sent through the RF module 131, before being processed by the processing module 130 (e.g., by application of a machine learning algorithm or model, for example, using a GPU 138). With respect to ensuring a transmitted RF signal is sent in the proper direction or by the appropriate directional antenna, each RF system can use a PNT component 140 to determine feature or characteristics associated with the corresponding RF system's location, directional orientation, elevation/altitude, and the like. Such information from the PNT component 140, or data received pertaining to the PNT component 140 of another RF system, can be used to determine which directional antenna(s) to activate and transmit from or to use to track identified objects. For example, the PNT component is an important component in determining relational location and directional information for each and all RF systems in a network. Also, in some embodiments, there may be multiple antennas directly or indirectly connected to a processing module. In some embodiments, one antenna is paired to one RF module so that each RF module can control the receipt or transmission of any RF signals for the single antenna so that each antenna can operate independently from other antennas. Additional information regarding the hardware components is described herein with respect to FIGS. 1B and 3.

FIG. 7 illustrates an example flow 1300 for transmission and tracking of an object using, for example, an RF system 1301. The flow 1300 pertains generally to identifying a first set of signals corresponding to a first object and transmitting a second set of signals (e.g., in the direction of the first object) while tracking movement of the first object. The flow 1301 can also coordinate between multiple connected systems and devices, according to various embodiments of the present disclosure. For example, data can be moved between a first RF system (e.g., 102), one or more additional RF systems (e.g., 106), additional systems or sensors (e.g., 104), and/or a central processing server (e.g., 107). Data can also be provided by a user via a user device (e.g., 110).

At block 1302, an RF system 1301 can receive updates to a machine learning model (e.g., from one or more other systems or sensors, such as 104 in FIG. 1A). For example, in some embodiments, the RD system 102 may include a machine learning model (e.g., the model described in FIGS. 4-5 and elsewhere herein) that can be used to identify a type of object. The machine learning model can be updated or trained (e.g., FIG. 4) using (1) data captured by the RF system 1301, (2) data received from one or more other systems or devices (e.g., 104 or 106 in FIG. 1A), or (3) data received from a central processing server (e.g., 107 in FIG. 1A). The central processing server, in some embodiments, can provide groupings of data captured from numerous devices. The machine learning model can also be updated or trained (e.g., FIG. 4) based on additional input received from a user (e.g., 110 in FIG. 1A).

Additionally at block 1302, and in some embodiments, the RF system 1301 can receive information or data packets associated with identification of a first object. For example, the information or data packets can comprise information that indicates a type of a first object, a location of the first object, a velocity of the first object, confidence scores associated with any of the type, velocity, or location, or any other relevant information with respect to the first object.

At block 1302, an RF system 1301 can also receive information regarding identification of a first object. For example, the RF system 1301 can receive data from one or more other systems (e.g., 106 or 107) indicating where the first object is, including estimated size of the object, distance, velocity, type, or other relevant information (if available and/or already determined). Also, for example, the RF system 1301 can receive data that assists RF system 1301 in detecting the first object, tracking the first object, determining the type of object associated with the first object, and/or determining RF signals to transmit (e.g., based on a type of object corresponding to the first object).

At block 1303, the RF system 1301 can optionally implement or enable a search mode. For example, in some embodiments, the RF system (e.g., 102, 106, 1301) can perform a searching function or include functionality for a search mode. Aspects of the software components can be adjusted to optimize the RF system to search for: (1) a particular frequency or set of frequencies; (2) specific area(s) or location(s) in three-dimensional space; (3) one or more identified objects; (4) and/or the like. With respect to (1), in some embodiments, an RF system can use one or more antennas to monitor for specific frequenc(ies). For instance, in one situation, a type of object may be identified (e.g., which may be associated with a specific frequency) but the location unknown. By utilizing some or all antennas facing an area, or in and around an area, to collect and process frequencies in only the specific frequenc(ies) (e.g., filtering raw signal data similar to block 1204), the RF system (and in some cases other RF systems in conjunction) can identify the designated frequenc(ies) more efficiently by only processing the signals corresponding to the specific frequenc(ies). With respect to (2), in some embodiments, information related to an object may be received/determined (e.g., information suggesting that an object may be entering or in range of an RF system) and transmitted to one or more RF systems. For example, information related to an object can be received from other systems and/or sensors, which may include other RF systems. The one or more RF systems can activate antennas facing or near the area where the object was located to monitor for the object. Like (2), but with respect to (3), in some embodiments, information related to an object's actual or approximated location may be received/determined (e.g., a sensor or camera may spot an object but might be otherwise unable to identify it or continue tracking it) and transmitted to one or more RF systems. The one or more RF systems can activate antennas facing or near the area where the object was located to monitor for the object.

In some embodiments, all antennas for all RF systems in a network or area may be monitoring. However, in some embodiments, antennas may be put in a low-power mode or high-power mode depending on a determined threat level. In some embodiments, for example, a high-power mode may be activated for some antennas based on information indicating that an object is nearby and needs to be identified. Whereas, in some embodiments, for example, a low-power mode may be activated for some antennas during certain parts of a day or after periods of no changes to base RF signals collected.

At block 1304, the RF system 1301 collects a first set of RF signals associated with the first object. For example, the first set of RF signals can be emitted by the first object and/or transmitted to the first object by a transmitter (e.g., controller configured to control the first object). In some embodiments, the RF system 1301 can use one or more antennas pointed in the direction of the first object to collect the first set of RF signals.

At block 1306, the RF system 1301 can monitor and/or track movement of the first object. In some embodiments, the RF system 1301 can use one or more antennas pointed in the direction of the first object to determine whether the first object is in a specific location corresponding to the one or more antennas and to monitor movements of the first object (e.g., velocity, acceleration, and/or the like). In some embodiments, the RF system 1301 can use a direction finder to determine whether the first object is in a specific location and to monitor movements of the first object (e.g., velocity, acceleration, and/or the like). In some embodiments, the RF system 1301 can use one or more antennas pointed in the direction of the first object in conjunction with a direction finder to determine whether the first object is in a specific location. Depending on the type of hardware used, tracking or monitoring of a first object can be improved upon using more data collected from multiple devices on the same RF system 1301 (e.g., multiple antennas, direction finders, and/or the like), or multiple devices on multiple RF systems (e.g., 102 and 106) because gathering data from different vantage points can limit the effects of interference and limitations due to hardware configurations (e.g., antennas covering a large area such as 90 degrees).

At block 1308, the RF system 1301 inputs data corresponding to the first set of RF signals collected into a machine learning model to determine a first type of object corresponding to the first object. In some embodiments, application of the machine learning model can be based on the steps described in relation to FIG. 6 or otherwise herein (e.g., 162 in FIG. 1C). In some embodiments, training of the machine learning model can be based on the steps described in relation to FIG. 5 or otherwise herein (e.g., 162 in FIG. 1C). In some embodiments, the machine learning model is stored and accessed locally to improve efficiency of data transfer. For example, the collection of the first set of RF signals may include large amounts of data impractical to transmit to another device in time to process and provide an out so that the RF system 1301 can effectively track or transmit. However, in some embodiments, it is also possible to filter and/or sample the collected first set of RF signals so that the data transfer to another device or system to assist with or handle the processing of the input data is possible and effective at returning the output in sufficient time for the RF system 1301 to complete the flow 1300 in a desired time frame (e.g., less than 5 seconds, less than 30 seconds, less than 2 minutes, and/or the like) depending on the detected object or object characteristics (e.g., type, size, location, or velocity, and/or the like) or the location/placement of the specific RF system 1301.

At block 1310, the RF system 1301 determines a first type of object corresponding to the first object based on the received output from the machine learning model (e.g., as described in FIG. 6) interacted with at block 1308. In some embodiments, the RF system 1301 can also transmit location and/or movement information as well as any data corresponding to the received output from the machine learning model that is associated with the first object to another external system, for example, to one or more of a second RF system, additional systems or sensors (e.g., 104), and/or a central processing server (e.g., 107). Such external systems can then determine, activate, or implement an appropriate response based on the detection provided by the RF system 1301, for example.

At block 1312, the RF system 1301 can optionally determine additional features associated with the first set of RF signals or the first type of object. For example, additional features can include bandwidth, channel, signal rate, or the like. The RF system 1301 can determine such additional features itself and/or in conjunction with data received or accessed from one or more other devices or systems (e.g., 104, 106, 107, or 110 in FIG. 1A).

At block 1314, the RF system 1301 determines a second set of RF signals to transmit (e.g., in the direction of the first object). In some embodiments, the second set of RF signals are based on the type of object (e.g., as determined by using the machine learning model) and/or the additional features determined at block 1312.

At block 1316, the RF system 1301 generates and causes transmission of the second set of RF signals using one or more antennas connected to the RF system 1301. In some embodiments the RF system 1301 can transmit the second set of RF signals determined at block 1314 to another RF system (e.g., 106 in FIG. 1A) to transmit. In some embodiments, the RF system 1301 transmits the second set of RF signals in the direction of the first object. In some embodiments, the RF system 1301 transmits the second set of RF signals in all directions surrounding the RF system 1301. In some embodiments, the RF system 1301 transmits the second set of RF signals in one or multiple directions surrounding the RF system 1301. In some embodiments, the RF system 1301 transmits the second set of RF signals also while continuing to track the movement of the first object. It is advantageous to track the location and/or movement of the first object to determine whether or not an antenna the RF system 1301 is using to transmit the second set of RF signals may be unnecessary and another antenna may need to be used instead. For example, if the first object moves out of an area of coverage associated with a first antenna connected to the RF system 1301 into an area of coverage associated with a second antenna connected to the same RF system 1301, the first antenna should be turned off to conserve power and/or the second antenna should be turned on to maintain effective transmission in the area or direction of the first object. Also, for example, if the first object moves out of an area of coverage associated with a first antenna connected to the RF system 1301 into an area of coverage associated with a second antenna connected to a different RF system (e.g., 106), the first antenna should be turned off, or deactivated, to conserve power and/or the second antenna should be turned on, or activated, to maintain effective transmission in the area or direction of the first object. In some embodiments, the first antenna can be turned off, or deactivated, contemporaneously with the second antenna being turned on, or activated. In some embodiments, the first antenna can be turned off, or deactivated, once a period of time (e.g., 1 second, 5 seconds, 30 seconds, or the like) elapses after the second antenna is turned on, or activated. Additionally, when an RF system (e.g., 1301) begins transmission of the second set of RF signals, the transmission can be emitted after a delay, or a period of time elapses (e.g., 1 second, 5 seconds, 30 seconds, or the like), or the transmission can be emitted immediately and with its transmission power ramped up (e.g., 10% power for a period of time, then 20% power for another period of time, and/or the like). For example, the ramping up of power may be helpful in some circumstances when power stability may be an issue (e.g., in high temperatures, damaged equipment, old equipment, faulty equipment, and/or the like).

More examples related to such hand-offs of transmission (e.g., on/off, delayed off, ramp up/down, and/or the like) or coordination between antennas of one RF system and antennas of multiple RF systems are described in more detail herein and with respect to FIGS. 8 and 9. Additionally, as noted above, further examples of methods of determining locations of objects by communications among various components are provided in, for example, the '059 Publication and the '824 Publication.

In some embodiments, blocks 1314 and/or 1316 may not occur such that no transmission of RF signals occurs, and instead, another system or device may initiate a response based on the detection and/or identification of the first object.

FIG. 8 illustrates an example flow 1400 for coordinating the application of an RF artificial intelligence, machine learning model between multiple connected systems and devices, according to various embodiments of the present disclosure. For example, data can be moved between a first RF system (e.g., 102), second RF system (e.g., 106), additional systems or sensors (e.g., 104), and/or a central processing server (e.g., 107). Data can also be provided by a user via a user device (e.g., 110).

At block 1402, a first RF system 1401 detects a first set of RF signals associated with a first object. For example, the first RF system 1401 can use one or more antennas connected to the first RF system 1401 to receive signals.

At block 1404, the first RF system 1401 monitors and tracks location and/or movement of the first object. For example, once the first RF system 1401 detects the first set of RF signals associated with the first object at block 1402, the first RF system 1401 can use one or more antennas and/or a direction finder to monitor the location and movement of the first object (e.g., to determine which antenna(s) cover a current location of the first object, and/or a future location of the first object based on the first object's estimated location, velocity, and/or acceleration). In some embodiments, one or more other systems can provide location and/or tracking information to the first RF system 1401 to assist with the tracking of the first object's movements. For example, the determination of the second set of RF signals can also comprise the steps and components similar to block 1306 in FIG. 7. In some embodiments, the first RF system 1401 can also transmit location and/or movement information associated with the first object to another external system, for example, to one or more of a second RF system (e.g., 1411), additional systems or sensors (e.g., 104), and/or a central processing server (e.g., 107). Such external systems can then determine, activate, or implement an appropriate response based on the detection provided by the first RF system 1401, for example. Additionally, as noted above, further examples of communicating and coordinating with one or more external or other systems, device, and/or sensors components are provided in, for example, the '059 Publication and the '824 Publication. For example, any information related to detections, tracking, identifications, determinations, or the like performed by the RF system 1401 (and/or other RF systems, for example) can be provided to one or more external or other systems, device, and/or sensors so that the one or more external or other systems, device, and/or sensors can work independently and/or in tandem with one another (e.g., including the originating RF system 1401 (and/or other RF systems)) to activate one or more responses, such as to intercept the object (e.g., as described in the '824 Publication) and/or to make one or more determinations.

At block 1406, the first RF system 1401 collects raw data corresponding to the first set of RF signals (e.g., using one or more antennas connected to the first RF system 1401).

At block 1408, the first RF system 1401 determines that the first object is moving out of a region or area of coverage associated with one or more antennas corresponding to the first RF system 1401 (e.g., and potentially into a region or area of coverage associated with a second RF system 1411). For example, data determined at block 1404 with respect to tracking the movement and location the first object can be used to make the determination at block 1408. In some embodiments, the determination at block 1408 is a prediction or likelihood (e.g., above a threshold value) that the first object is on a trajectory to move out of a region or area of coverage associated with one or more antennas corresponding to the first RF system 1401 and into a region or area of coverage associated with a second RF system 1411. For example, a first object may be at the edge of a region of coverage associated with a first antenna of the first RF system 1401 and moving closer to the edge based on an estimated velocity. The edge may be next to a second antenna corresponding to the second RF system 1411 (or in some cases corresponding to the first RF system 1401). In some embodiments, the determination at block 1408 can also be based on the environment and/or data collected or determined by one or more external or other systems, device, and/or sensors. For example, other systems, devices, and/or sensors may be monitoring or tracking the first object and data collected by those other systems, devices, and/or sensors could be used (e.g., by a central processing service, one or more RF systems, etc.) to make the determination at block 1408.

At block 1410, the first RF system 1401 optionally generates and causes transmission, to the second RF system 1411 (and/or other system(s), such as the central processing server, etc.), data packets comprising information associated with the first set of RF signals (e.g., raw data, filtered raw data, sampled raw data, or a combination). In some embodiments, a first object can be detected by one RF system (e.g., the first RF system 1401) but insufficient amounts of data can be collected in time to apply a machine learning model (e.g., FIG. 6) to determine a type of object associated with the first object. However, in some embodiments, data packets comprising information associated with the raw data collected can be transmitted to a second RF system (e.g., the second RF system 1411) to supplement with additional data collected by the second RF system prior to inputting into a machine learning model. Alternatively, the second RF system can locate the first object based on data received from the first RF system (and/or other devices or systems) and collect all raw data necessary prior to inputting into a machine learning model without using any raw data collected from the first RF system. For example, if the first RF system data may be inaccurate (e.g., distorted, noisy, and/or the like), the second RF system may choose not to use the data. Similarly, if the raw data collected by the first RF system may be inaccurate (e.g., distorted, noisy, and/or the like), data packets comprising information associated with the raw data collected may not be transmitted to a second device and instead only data that pertains to location or tracking instead, for example. Additionally, as noted above, further examples of communicating and coordinating with one or more external or other systems, device, and/or sensors components are provided in, for example, the '059 Publication and the '824 Publication. For example, any information related to detections, tracking, identifications, determinations, or the like performed by the RF system 1401 (and/or other RF systems, for example) can be provided to one or more external or other systems, device, and/or sensors so that the one or more external or other systems, device, and/or sensors can work independently and/or in tandem with one another (e.g., including the originating RF system 1401 (and/or other RF systems)) to activate one or more responses, such as to intercept the object (e.g., as described in the '824 publication). For example, any information related to detections, tracking, identifications, determinations, or the like performed by the RF system 1401 (and/or other RF systems, for example) can be provided to one or more external or other systems, device, and/or sensors so that the one or more external or other systems, device, and/or sensors can work independently and/or in tandem with one another (e.g., including the originating RF system 1401 (and/or other RF systems)) to activate one or more responses, such as to intercept the object (e.g., as described in the '824 Publication) and/or to make one or more determinations.

At block 1412, the second RF system 1411 optionally receives the data packets comprising the information associated with the raw data collected from the first RF system 1401 (and/or other system(s), such as the central processing server, etc.). In some embodiments, the second RF system 1411 can determine how much of the data to use (e.g., depending on the quality of the data). For example, it might be the situation that the first object is moving away from both the first RF system 1401 and the second RF system 1411 so that the first RF system 1401 collects more accurate data which the second RF system 1411 chooses to use or rely on more than data collected by the second RF system 1411. Alternatively, for example, it might be the situation that the first object is moving closer to both the first RF system 1401 and the second RF system 1411 so that the first RF system 1401 collects less accurate data which the second RF system 1411 chooses to rely on less than data collected by the second RF system 1411. In some embodiments, the first RF system 1401 and second RF system 1411 can operate independently at any point in time and can locate, track, identify, and transmit without communication with each other and/or any other devices or sensors. For example, blocks 1414-1424 can function without any input received from the first RF system 1401 and/or any other system.

At block 1414, similar to block 1404, the second RF system 1411 monitors and tracks location and/or movement of the first object. For example, once the second RF system 1411 is aware of the first object (e.g., detected itself or based on data received from another device or system such as the first RF system 1401 at block 1412), the second RF system 1411 can use one or more antennas and/or a direction finder to monitor the location and movement of the first object (e.g., to determine which antenna(s) cover a current location of the first object, and/or a future location of the first object based on the first object's estimated location, velocity, and/or acceleration). In some embodiments, one or more other systems can provide location or tracking information to the second RF system 1411 to assist with the tracking of the first object's movements.

At block 1416, similar to block 1406, the second RF system 1411 collects additional raw data corresponding to the first set of RF signals (e.g., using one or more antennas connected to the second RF system 1411).

At block 1418, the second RF system 1411 inputs data corresponding to the first set of RF signals (e.g., collected via the first RF system 1401 and/or the second RF system 1411) into a machine learning model to determine a first type of object corresponding to the first object. In some embodiments, application of the machine learning model can be based on the steps described in relation to FIG. 6 or otherwise herein (e.g., 162 in FIG. 1C). In some embodiments, training of the machine learning model can be based on the steps described in relation to FIG. 5 or otherwise herein (e.g., 162 in FIG. 1C).

At block 1420, the second RF system 1411 determines a first type of object corresponding to the first object based on the received output from the machine learning model (e.g., as described in FIG. 6) interacted with at block 1418.

After block 1420, and before block 1422, the second RF system 1411 can optionally determine additional features associated with the first set of RF signals or the first type of object. For example, additional features can include bandwidth, channel, signal rate, or the like. The second RF system 1411 can determine such additional features itself and/or in conjunction with data received or accessed from one or more other devices or systems (e.g., 104, 106, 107, or 110 in FIG. 1A). In some embodiments, the second RF system 1411 can also transmit location and/or movement information as well as any data corresponding to the received output from the machine learning model that is associated with the first object to another external system, for example, to one or more of a third RF system, additional systems or sensors (e.g., 104), and/or a central processing server (e.g., 107). Such external systems can then determine, activate, or implement an appropriate response based on the detection provided by the RF system 1411, for example. Additionally, as noted above, further examples of communicating and coordinating with one or more external or other systems, device, and/or sensors components are provided in, for example, the '059 Publication and the '824 publication. For example, any information related to detections, tracking, identifications, determinations, or the like performed by the RF system 1401 (and/or other RF systems, for example) can be provided to one or more external or other systems, device, and/or sensors so that the one or more external or other systems, device, and/or sensors can work independently and/or in tandem with one another (e.g., including the originating RF system 1401 (and/or other RF systems)) to activate one or more responses, such as to intercept the object (e.g., as described in the '824 Publication), and/or to make one or more determinations.

At block 1422, the second RF system 1411 determines a second set of RF signals to transmit (e.g., in the direction of the first object). In some embodiments, the second set of RF signals are based on the type of object (e.g., as determined by using the machine learning model) and/or any additional features determined. For example, the determination of the second set of RF signals can also comprise the steps and components similar to blocks 1312 and 1314 in FIG. 7.

At block 1424, the second RF system 1411 generates and causes transmission of the second set of RF signals using one or more antennas connected to the second RF system 1411. In some embodiments, the second RF system 1411 can transmit the second set of RF signals determined at block 1422 to another RF system (e.g., 106 in FIG. 1A) to transmit. In some embodiments, the second RF system 1411 transmits the second set of RF signals in the direction of the first object. In some embodiments, the second RF system 1411 transmits the second set of RF signals in all directions surrounding the RF system 1411. In some embodiments, the RF system 1411 transmits the second set of RF signals in one or multiple directions surrounding the RF system 1411. In some embodiments, the second RF system 1411 transmits the second set of RF signals also while continuing to track the movement of the first object. It is advantageous to track the location and/or movement of the first object to determine whether or not an antenna the second RF system 1411 is using to transmit the second set of RF signals may be unnecessary and another antenna may need to be used instead. For example, if the first object moves out of an area of coverage associated with a first antenna connected to the second RF system 1411 into an area of coverage associated with a second antenna connected to the same second RF system 1411, the second antenna should be turned on to maintain effective transmission in the area or direction of the first object. Additionally, the first antenna should/could be turned off to conserve power and/or to divert additional power to the second antenna that may provide a more effective signal in the area of the first object. For example, each RF system may include a power supply capable of a maximum power output, and in order to be effective, more power should be diverted from an antenna that is not facing the first object to an antenna that is facing the first object thereby allowing maximum power to be used most efficiently and effectively, and transmitted signals are not wasted being transmitted into open space with no object present (e.g., or an object that does not respond to or otherwise register the emitted signal). Also, for example, if the first object moves out of an area of coverage associated with a first antenna connected to the second RF system 1411 into an area of coverage associated with a second antenna connected to a different RF system (e.g., 106), the first antenna should be turned off to conserve power and/or the second antenna should be turned on to maintain effective transmission in the area or direction of the first object. More examples related to such hand-offs of transmission (e.g., on/off, delayed off, ramp up/down, and/or the like) or coordination between antennas of one RF system and antennas of multiple RF systems are described in more detail herein and with respect to FIG. 9.

FIG. 9 illustrates an example flow 1500 for coordinating multiple connected systems and devices, according to various embodiments of the present disclosure. For example, data can be moved between a first RF system (e.g., 102), second RF system (e.g., 106), additional systems or sensors (e.g., 104), and/or a central processing server (107). Data can also be provided by a user via a user device (e.g., 110).

At block 1502, a first RF system 1501 determines a type of object corresponding to a first object based on output from a machine learning model. For example, the machine learning model can comprise the steps and components of the machine learning model described with respect to FIGS. 5-6 and elsewhere herein. Also, for example, the machine learning model can comprise the steps and components similar to blocks 1308 and 1310 in FIG. 7 as well as blocks 1418 and 1420 in FIG. 8.

At block 1504, the first RF system 1501 determines a second set of RF signals to transmit (e.g., in the direction of the first object). In some embodiments, the second set of RF signals are based on the type of object (e.g., as determined by using the machine learning model) and/or any additional features determined. For example, the determination of the second set of RF signals can comprise the steps and components similar to blocks 1312 and 1314 in FIG. 7 as well as block 1422 in FIG. 8.

At block 1506, the first RF system 1501 can monitor and/or track movement of the first object. For example, the determination of the second set of RF signals can comprise the steps and components similar to block 1306 in FIG. 7 as well as block 1404 in FIG. 8.

At block 1508, the first RF system 1501 generates and causes transmission of the second set of RF signals using one or more antennas connected to the first RF system 1501. For example, the generating and transmitting of the second set of RF signals can comprise the steps and components similar to block 1316 in FIG. 7 as well as block 1424 in FIG. 8.

At block 1510, the first RF system 1501 determines that the first object is moving out of a region of coverage associated with one or more antennas corresponding to the first RF system and into a region of coverage associated with one or more antennas corresponding to a second RF System. In some embodiments, the first RF system 1501 transmits the second set of RF signals in the direction of the first object (e.g., block 1508) also while continuing to monitor and/or track the movement of the first object (e.g., block 1506). It can be advantageous to track the location and/or movement of the first object to determine whether or not an antenna the first RF system 1501 is using to transmit the second set of RF signals may be unnecessary (e.g., since the first object may no longer be located in a region of coverage associated with the first RF system 1501) and another antenna may need to be used instead. For example, if the first object moves out of an area of coverage associated with a first antenna connected to the first RF system 1501 into an area of coverage associated with a second antenna connected to the same first RF system 1501, the second antenna should be turned on to maintain effective transmission in the area or direction of the first object. Additionally, the first antenna should be turned off to conserve power and/or to divert additional power to the second antenna. For example, each RF system may include a power supply capable of a maximum power output, and in order to be effective, more power should be diverted from an antenna that is not facing the first object to an antenna that is facing the first object thereby allowing maximum power to be used most efficiently and effectively, and transmitted signals are not wasted being transmitted into open space with no object present. Also, for example, if the first object moves out of an area of coverage associated with a first antenna connected to the first RF system 1501 into an area of coverage associated with a second antenna connected to a different RF system (e.g., 1515), the second antenna should be turned on to maintain effective transmission in the area or direction of the first object and the first antenna should be turned off or use less power. See block 1514 for examples regarding power allotment to antennas.

At block 1512, the first RF system 1501 optionally generates and causes transmission of data packets comprising information associated with the second set of RF signals to the second RF System 1515 (and/or other system(s), such as the central processing server, etc.). For example, the data packets may not comprise the second set of RF signals, but information corresponding to the second set of RF signals so that the second RF System 1515 can generate the second set of RF signals. This might be advantageous in some embodiments because transmitting the second set of RF signals may interfere with communication between multiple RF systems or friendly devices. Also, for example, in some embodiments, the data packets may comprise the actual second set of RF signals. Additionally, as noted above, further examples of communicating and coordinating with one or more external or other systems, device, and/or sensors components are provided in, for example, the '059 Publication and the '824 Publication.

At block 1514, the first RF system 1501 the adjusts power to one or more antennas being used by the first RF system 1501 during transmission of the second set of RF signals at block 1508 (e.g., based on the first object moving out of the region of coverage associated with the first RF system, as determined at block 1510). As mentioned herein, in some embodiments, there can be no adjustment to the power level so that the active antenna(s) continue operating (e.g., emitting one or more RF signals, monitoring and/or tracking the first object or another object, or the like).

In some embodiments, the first RF system 1501 continues to transmit the second set of RF signals in the direction of the first object (e.g., block 1508) after transmitting data packets comprising information associated with the second set of RF signals to the second RF system 1515 (e.g., block 1512). For example, as the first object passes from a first region coverage associated with the first RF system 1501 into a region of coverage associated with the second RF system 1515, there may be a period of time where the regions of coverage overlap, or a degree of delay or uncertainty in determining the precise location of the first object, so that it would be advantageous for both the first RF system 1501 and the second RF system 1515 transmit the second set of RF signals concurrently and in tandem at a designated power level (e.g., maximum power).

In some embodiments, for example, if the first object moves farther away from the first region of coverage associated with the first RF system 1501 and further into the second region of coverage associated with the second RF system 1515, the first RF system 1501 can turn off power to the antenna(s) that were transmitting the second set of RF signals since the signals would no longer be reaching the first object in order to be effective (e.g., the signal may be too weak at such an angle or otherwise not detectable). For example, the first RF system 1501 can cease transmission of the second set of RF signals by the antenna(s) that were transmitting the second set of RF signals.

In some embodiments, for example, while the first object is moving out of the first region of coverage associated with the first RF system 1501 and into a region of coverage associated with the second RF system 1515, the first RF system may shut off, decrease, or cease supplying, power to one or more of the first RF system's transmitting antennas as soon as, or contemporaneously as, the second RF system 1515 begins transmitting (e.g., increasing, or initiating, a supply of power to) the second set of RF signals. In some embodiments, power can be shut off from the transmitting antennas associated with the first RF system 1501 slowly and/or in increments (e.g., moving to 90% power for a specified amount of time, then 80% power for the same or different amount of time, then 70%, and so on). In some embodiments, power can be shut off from the transmitting antennas associated with the first RF system 1501 using a delay of a specified amount of time (e.g., 5 seconds, 30 seconds, 1 minute, 10 minutes, and/or the like). In some embodiments, power can remain on as long as the second RF system 1515 remains transmitting (e.g., at block 1520). For example, since the first RF system 1501 and the second RF system 1515 are in communication, a signal can be sent from the first RF system 1501 to the second RF system 1515 with a data packet indicating that transmission of the second set of RF signals has begun, continues, or ends. In some embodiments, total power used at any moment in time by the first RF system (e.g., any transmitting antenna(s)) and a second RF system (e.g., any transmitting antenna(s)) can remain constant at a particular power draw/level at any moment in time (e.g., as one or more of the RF systems ramps down/up or otherwise adjusts its corresponding power level).

In some embodiments, the first object may move out of a region of coverage associated with a first antenna corresponding to the second RF system 1515 and into a region of coverage associated with a second antenna corresponding to the same second RF system 1515. In this situation, the second RF system 1515 may include only one power supply (e.g., with a maximum power output) and can transfer power from the first antenna to the second antenna so that the second antenna has more power to transmit. This can be done in several ways. For example, the first antenna's power can be ramped down (e.g., moving to 90% power for a specified amount of time, then 80% power for the same or different amount of time, then 70%, and so on) at the same time the second antenna's power can be ramped up (e.g., moving to 10% power, then 20% power, then 30%, and so on) in lock step with the ramping down of the first antenna so that a total of 100% power is used at any given time. The ramping down/up can be based on the movements and location of the first object such that if, for example, the first object is moving quickly into the region of coverage associated with a second antenna, then the ramp down/up can be performed quickly. Also, the ramping down/up can be based on the movements and location of the first object such that if, for example, the first object is moving slowly into the region of coverage associated with a second antenna, then the ramp down/up can be performed quickly. In some embodiments, once the first object moves out of a region of coverage associated with the first antenna and into a region of coverage associated with the second antenna, the first antenna can be immediately shut off and the second antenna can be immediately turned on to transmit the second set of RF signals as soon as the first antenna is turned off.

In some embodiments, a machine learning model can be used to predict movements of the first object and, for example, generate a score indicating a likelihood of a particular movement. For example, if the first object moves back and forth between regions of coverage, or is moving quickly in a specific direction, the score can be adjusted based on such movements and that could affect how an RF system transmits the second set of RF signals. In some embodiments, the machine learning model can also be based on the type of object corresponding to the first object determined from the machine learning model applied at block 1502, for example.

In some embodiments, the first object may move out of a region of coverage associated with the second RF system 1515 and enter a region of coverage associated with a third RF system, and similar procedure may apply. In some embodiments, all RF systems in an area may transmit the second set of RF signals upon detection of a first object. In some embodiments, RF systems adjacent to the RF system doing the detection in an area may transmit the second set of RF signals upon detection of a first object. For example, as an object moves between RF systems, there may be 3 antennas turned on at a time (e.g., a first antenna that detects the object and 2 antennas that cover adjacent areas to the first).

In some embodiments, the first RF system 1501, second RF system 1515, any other RF systems, and/or any other external systems may operate together to determine the most effective, optimal, and/or efficient response to a detection of an object (e.g., the first object). For example, varying one or more of the following to maximize effectiveness and/or efficiency may be implemented: which RF systems (and/or corresponding antenna(s)) are activated to search for RF signals, which RF systems (and/or corresponding antenna(s)) are activated to transmit RF signals, power levels associated with any activated RF systems, any external systems to activate (e.g., separately or in tandem with the RF systems), or the like. For example, an object may be moving closer to a first RF system perpendicularly from the first RF system's location (e.g., similar to how object 254 is moving as compared to RF system 252 in FIG. 2B), and there may be a second RF system that is located in a place where the object is headed so that the object is headed directly towards the second RF system. In some embodiments, both the first RF system and second RF system may activate (e.g., track and/or monitor the object, transmit signals towards the object, and/or the like) one or more antennas (e.g., at maximum power) in the direction of the object. In some embodiments, the first RF system may activate, and the second RF system may not activate immediately, and vice versa. For example, the object may be closer to one of the first and/or second RF systems and the first and/or second RF systems may determine which of the devices to activate based on the velocity and detected location of the object. In some embodiments, the detected location can be determined by the RF system(s), any other systems or sensors, and/or by data provided by manual input, for example. In some embodiments, one or more of the RF systems that consider whether to activate may also determine what power level to use as well. In some cases, there may be some circumstances where low or moderate power is more appropriate than maximum power (e.g., for efficiency purposes, to limit heat generation, to limit disruption with other equipment in the area, or the like). For instance, if there is sensitive equipment nearby, in addition to any optional signal filtering performed (e.g., as described herein), a plurality of RF systems may activate and transmit an RF signal towards the object with less than maximum power so as to focus the effect of the transmitted signal in the area near the object but to limit the transmission's effect on the area surpassing or surrounding the identified object and/or transmitting antennas.

At block 1516, the second RF system 1515 optionally receives (e.g., from the first RF system 1501 and/or other system(s), such as the central processing server, or the like) the data packets comprising the information associated with the second set of RF signals. As discussed herein, for example, the data packets may not comprise the second set of RF signals, but information corresponding to the second set of RF signals so that the second RF System 1515 can generate the second set of RF signals. This might be advantageous in some embodiments because transmitting the second set of RF signals may interfere with communication between multiple RF systems or friendly devices. Also, for example, in some embodiments, the data packets may comprise the actual second set of RF signals. In some embodiments, the first RF system 1501 and second RF system 1515 can operate independently at any point in time and can locate, track, identify, and transmit without communication with each other and/or any other devices or sensors. For example, blocks 1518 and 1520 can function without any input received from the first RF system 1501 and/or any other system. Additionally, as noted above, further examples of communicating and coordinating with one or more external or other systems, device, and/or sensors components are provided in, for example, the '059 Publication and the '824 Publication.

At block 1518, the second RF system 1515 can monitor and/or track movement of the first object. For example, the determination of the second set of RF signals can comprise the steps and components similar to block 1506 as well as block 1306 in FIG. 7 and block 1404 in FIG. 8.

At block 1520, the second RF system 1515 generates and causes transmission of the second set of RF signals using one or more antennas connected to the second RF system 1515. For example, the generating and transmitting of the second set of RF signals can comprise the steps and components similar to block 1512 as well as block 1316 in FIG. 7 and block 1424 in FIG. 8. In some embodiments, the second RF system 1515 can communicate with the first RF system 1501 regarding transmission power and status of the first object's location and/or movement patterns. For example, it may be beneficial to transmit a data packet to the first RF system 1501 indicating that the first object is moving back into a region of coverage associated with the first RF system 1501 prior to actual entry into the region of coverage associated with the first RF system 1501 prior to actual entry into the region of coverage.

VII. Additional Implementation Details and Embodiments

In an implementation the system (e.g., one or more aspects of the RF system 102, RF systems 106, the central processing server 107, user devices 110, other aspects of the operating environment 100, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 3) to implement one or more aspects of the modules and/or functionality described herein. Further, in this implementation, one or more services/modules/engines and/or the like, of the system may be understood as comprising one or more rules engines of the virtual computing environment that, in response to inputs received by the virtual computing environment, execute rules and/or other program instructions to modify operation of the virtual computing environment. For example, a request received from the user computing device 301 may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid-state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Java, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In various embodiments, electronic circuitry including, for example, programmable logic circuitry, field-programmable gate arrays ("FPGA"), or programmable logic arrays ("PLA") may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 3 shows a block diagram that illustrates a computer system 300 upon which various implementations and/or aspects (e.g., one or more aspects of the RF system 102, RF systems 106, the central processing server 107, user devices 110, other aspects of the operating environment 100, and/or the like) may be implemented. Computer system 300 includes a bus 302 or other communication mechanism for communicating information, and a hardware processor, or multiple processors, 304 coupled with bus 302 for processing information. Hardware processor(s) 304 may be, for example, one or more general purpose microprocessors.

Computer system 300 also includes a main memory 306, such as a random-access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions. The main memory 306 may, for example, include instructions to implement **\*\***, and/or other aspects of functionality of the present disclosure, according to various implementations.

Computer system 300 further includes a read only memory (ROM) 308 or other static storage device coupled to bus 302 for storing static information and instructions for processor 304. A storage device 310, such as a magnetic disk, optical disk, or USB thumb drive (Flash drive), and/or the like, is provided and coupled to bus 302 for storing information and instructions.

Computer system 300 may be coupled via bus 302 to a display 312, such as a cathode ray tube (CRT) or LCD display (or touch screen), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 300 may include a user interface module to implement a GUI that may be stored in a mass storage device as computer executable program instructions that are executed by the computing device(s). Computer system 300 may further, as described below, implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more computer-readable program instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

Various forms of computer-readable storage media may be involved in carrying one or more sequences of one or more computer-readable program instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN (or WAN component to communicated with a WAN). Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

VIII. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A system for monitoring objects surrounding an area, the system comprising: a first RF system comprising: one or more first antennas that are positioned to face a first direction; and a first processing module in communication with the one or more first antennas, wherein the first processing module comprises: a computer readable storage medium comprising program instructions and a machine learning model, wherein the machine learning model has been trained to identify a type of object associated with a first set of RF signals; and one or more first processors that are configured to execute the first program instructions to cause the first RF system to: collect, using the one or more first antennas, a first set of RF signal data associated with a first object; identify, by application of the machine learning model, a type of object associated with the first object; based at least in part on the type of object, generate and cause transmission of, using the one or more first antennas, a second set of RF signals different from the first set of RF signals; and based on a determination that the first object is moving away from the first direction and towards a second direction corresponding to a second one or more antennas, transmit, to a second RF system, a data packet associated with the second set of RF signals; and the second RF system comprising: the one or more second antennas that are positioned to face the second direction different from the first direction; and a second processing module in communication with to the one or more second antennas and comprising a second one or more processors configured to execute second program instructions to cause the second RF system to: receive, from the first RF system, the data packet; and generate and cause transmission of, using the one or more second antennas, the second set of RF signals.

Clause 2: The system of clause 1, wherein the first one or more antennas and the second one or more antennas are directional, broad-bandwidth, or both.

Clause 3: The system of any of clauses 1-2, wherein the first direction and the second direction are both facing away from an area.

Clause 4: The system of clause 3, wherein the area corresponds to a building or multiple buildings.

Clause 5: The system of any of clauses 1-4, wherein the transmission of the second set of RF signals by the one or more first antennas is transmitted in the first direction.

Clause 6: The system of any of clauses 1-5, wherein the transmission of the second set of RF signals by the one or more second antennas is transmitted in the second direction.

Clause 7: The system of any of clauses 1-6, wherein the one or more first processors are configured to execute the first program instructions to cause the first RF system to: in response to the determination that the first object is moving out of the first direction and into the second direction, reduce power output of the transmission of the second set of RF signals by the first one or more antennas over a period of time.

Clause 8: The system of clause 7, wherein the one or more second processors are configured to execute the first program instructions to cause the second RF system to: in response to receiving the data packet, increase power output of the transmission of the second set of RF signals by the second antenna over the period of time.

Clause 9: The system of any of clauses 1-8, wherein the object comprises a velocity.

Clause 10: The system of any of clauses 1-9, wherein the one or more first antennas includes a first antenna that radiates or receives signals over an area that is between 80 degrees and 110 degrees in a direction the first antenna is configured to face.

Clause 11: The system of any of clauses 1-10, wherein the one or more first antennas comprises two, three, or four antennas.

Clause 12: The system of any of clauses 1-11, wherein the one or more first antennas are configured to be adjustable with respect to an angle of elevation or tilt as compared to a plane the first RF system is stationed on.

Clause 13: The system of any of clauses 1-12, wherein the first processing module further comprises: one or more graphical processing units (GPUs) configured to execute the machine learning model.

Clause 14: A computer implemented method comprising, by a first RF system comprising one or more hardware processors executing program instructions: receiving, via one or more directional antennas, a first set of RF signals; identifying, by application of a machine learning model, a type of object associated with the first set of RF signals; based at least in part on the type of object, generating and causing transmission of a second set of RF signals different from the first set of RF signals; and based on a determination that a first object is moving away from the first direction and towards a second direction corresponding to a second one or more antennas, transmitting, to a second RF system, a data packet associated with the second set of RF signals.

Clause 15: The computer implemented method of clause 14, wherein the second RF system is configured to receive the data packet and cause transmission of the second set of RF signals.

Clause 16: The computer implemented method of any of clauses 14-15, wherein the second set of RF signals are transmitted via one or more directional antennas.

Clause 17: The computer implemented method of clause 16, wherein the one or more directional antennas include a first set of directional antennas associated with the first RF system, and a second set of directional antennas associated with the second RF system.

Clause 18: The computer implemented method of clause 17, wherein the first set of directional antennas are generally oriented in a first directions, and the second set of directional antennas are generally oriented in a second directions different from the first direction.

Clause 19: A system comprising: a computer readable storage medium having program instructions embodied therewith; and one or more processors configured to execute the program instructions to cause the system to perform the computer-implemented method of any of clauses 14-18.

Clause 20: A computer program product comprising a computer-readable storage medium having program instructions embodied therewith, the program instructions executable by one or more processors to cause the one or more processors to perform the computer-implemented method of any of clauses 14-18.

Clause 21: A modular RF system comprising: a first module enclosure configured to house a first plurality of modules; one or more antennas coupled to the module enclosure on one or more exterior surfaces of the module enclosure and configured to receive RF signals and transmit RF signals; a first channel extending from a bottom portion of the first module enclosure, through an interior portion of the first module enclosure, to a top portion of the first module enclosure; a first one or more heat sinks positioned within the first channel and thermally coupled to the first plurality of modules; and at least one fan positioned at a top or a bottom of the first module enclosure and configured to cause air to flow through the first channel and the first one or more heat sinks.

Clause 22: The modular RF system of clause 21 further comprising: a direction finder coupled to an exterior surface of the RF system, in communication with at least one of the first plurality of modules, and configured to receive RF signals and provide direction finding information to the at least one of the first plurality of modules.

Clause 23: The modular RF system of any of clauses 21-22, wherein the one or more antennas comprise a first two antennas, and wherein the first two antennas are in electrical communication with at least two of the first plurality of modules.

Clause 24: The modular RF system of any of clauses 21-23 further comprising: a second module enclosure configured to house a second plurality of modules and coupled to the first module enclosure; a second channel extending from a bottom portion of the second module enclosure, through an interior portion of the second module enclosure, to a top portion of the second module enclosure, wherein the second channel is aligned with the first channel; and a second one or more heat sinks positioned within the first channel and thermally coupled to the first plurality of modules, wherein the at least one fan is configured to cause air to flow through the first and second channels, through and the first and second one or more heat sinks.

Clause 25: The modular RF system of clause 24, wherein the one or more antennas comprise four antennas, wherein two antennas of the four antennas are in electrical communication with at least two of the first plurality of modules, and wherein two other antennas of the four antennas are in electrical communication with at least two of the second plurality of modules.

Clause 26: The modular RF system of any of clauses 24-25, wherein the second module enclosure is coupled to the first module enclosure via a joining enclosure.

Clause 27: The modular RF system of any of clauses 21-26 further comprising: an upper enclosure with air vents; and a lower enclosure with air vents.

Clause 28: The modular RF system of clause 27, wherein a first fan is positioned in the upper enclosure, and wherein a second fan is positioned in the lower enclosure.

Clause 29: The modular RF system of any of clauses 21-28, wherein the first plurality of modules includes at least one of: a power supply module, an RF module, or a processing module.

Clause 30: The modular RF system of any of clauses 21-29, wherein the first plurality of modules is housed within a peripheral portion of the first module enclosure that surrounds the first channel and is configured to hermetically seal the first plurality of modules within the peripheral portion.

Clause 31: The modular RF system of any of clauses 21-30, wherein the one or more antennas comprise broad-bandwidth, directional antennas.

Clause 32: The modular RF system of any of clauses 21-31, wherein: each of the one or more antennas radiates or receives greater power in a specific direction, the one or more antennas are configured to operate independently, and each of the one or more antennas is configured operate in coordination with one or more other of the one or more antennas.

Clause 33: The modular RF system of any of clauses 21-32, wherein the one or more antennas includes a first antenna that radiates or receives signals over an area that is between 80 degrees and 110 degrees in a direction the first antenna is configured to face.

Clause 34: The modular RF system of any of clauses 21-33, wherein one or more antennas comprises two, three, or four antennas.

Clause 35: The modular RF system of any of clauses 21-34, wherein the one or more antennas are configured to be adjustable with respect to an angle of elevation or tilt as compared to a plane the modular RF system is stationed on.

Clause 36: The modular RF system of any of clauses 21-35, wherein the first plurality of modules comprises at least: a power supply module, two RF modules, and a processing module.

Clause 37: The modular RF system of clause 36, wherein the power supply module is configured to provide power to at least the two RF modules and the processing module.

Clause 38: The modular RF system of any of clauses 36-37, wherein each respective one of the two RF modules is in electrical communication with a respective one of the one or more antennas, and wherein each of the two RF modules is in electrical communication with the processing module and configured with at least: a multiplexer, a reception amplifier, and a transmission amplifier.

Clause 39: The modular RF system of any of clauses 36-38, wherein each of the RF modules is configured to: receive RF signals from an antenna of the one or more antennas; amplify, filter, and/or limit the received RF signals; and provide the amplified, filtered, and/or limited received RF signals to the processing module.

Clause 40: The modular RF system of any of clauses 36-39, wherein each of the RF modules is configured to: receive RF signals from the processing module; amplify, filter, and/or limit the received RF signals; and transmit the amplified, filtered, and/or limited received RF signals via an antenna of the one or more antennas.

Clause 41: The modular RF system of any of clauses 36-40, wherein the processing module is configured to: receive RF signals; process RF signals; determine RF signals to transmit based on the processed RF signals; generate RF signals to transmit; and cause transmission of generated RF signals.

Clause 42: The modular RF system of any of clauses 36-41, wherein the processing module comprises at least: a processor, a graphics processing unit (GPU), a software defined radio (SDR) transceiver, and a storage device.

Clause 43: An antenna mount of an RF system, the antenna mount comprising: a first coupling feature positioned in a track of a side of the RF system, wherein the first coupling feature may slidably move in the track; an antenna bracket coupled to the first coupling feature, wherein the coupling between the antenna bracket and the first coupling feature provides a first pivot point, and wherein an antenna is coupled to the antenna bracket; a fixed mount on the side of the RF system; and a second coupling feature coupled to the fixed mount, wherein the coupling between the fixed mount and the second coupling feature provides a second pivot point, and wherein the second coupling feature is coupled to the antenna bracket providing a third pivot point.

Clause 44: The antenna mount of clause 43, wherein the first coupling feature is configured to be slid along the track to provide a target angle for the antenna by movement of the first, second, and third pivot points.

Clause 45: The antenna mount of any of clauses 43-44, wherein the antenna bracket is coupled to the first coupling feature by insertion of a first locking portion of the antenna bracket into a receiving locking portion of the first coupling feature at a first angle, and then rotation of the antenna bracket causing engagement of the first locking portion with the receiving locking portion.

Clause 46: The antenna mount of any of clauses 43-45, wherein the second coupling feature is coupled to the fixed mount with a locking pin.

Clause 47: The antenna mount of any of clauses 43-46, wherein the first coupling feature is releasably locked in place on the track using a locking component.

Clause 48: An antenna mounting method in an RF system, the method comprising: providing a first coupling feature of an antenna mount in a track of a side of the RF system, wherein the first coupling feature may slidably move in the track; providing a fixed mount on the side of the RF system; coupling an antenna bracket to the first coupling feature, wherein the coupling between the antenna bracket and the first coupling feature provides a first pivot point, and wherein an antenna is coupled to the antenna bracket; coupling a second coupling feature of the antenna mount to the fixed mount, wherein the coupling between the fixed mount and the second coupling feature provides a second pivot point, and wherein the second coupling feature is coupled to the antenna bracket providing a third pivot point; and sliding the first coupling feature along the track to provide a target angle for the antenna by movement of the first, second, and third pivot points.

Clause 49: The method of clause 48, wherein coupling the antenna bracket to the first coupling feature comprises inserting a first locking portion of the antenna bracket into a receiving locking portion of the first coupling feature at a first angle, and then rotating the antenna bracket to cause the first locking portion to engage with the receiving locking portion.

Clause 50: The method of any of clauses 48-49, wherein the second coupling feature is coupled to the fixed mount using a locking pin.

Clause 51: The method of clause any of clauses 48-50 further comprising: locking the first coupling feature in place on the track using a locking component.

Clause 52: An RF transceiver system comprising: a first module enclosure comprising: a first inner portion comprising a first cavity that is open on a top and a bottom of the first module enclosure portion, and a first peripheral portion that surrounds the first cavity and is configured to support a first one or more modules; a first one or more heat sinks positioned in the first inner portion of the first module enclosure; a first one or more thermal interfaces on at least one wall of the first inner portion of the first module enclosure and configured to provide thermal coupling between the first one or more heat sinks and the first one or more modules; and a first fan configured to cause air to flow through the first cavity and the first one or more heat sinks.

Clause 53: The RF transceiver system of clause 52, wherein the first one or more modules include at least one of: a power supply module, an RF module, or a processing module.

Clause 54: The RF transceiver system of any of clauses 52-53, wherein each of the first one or more modules includes a housing comprised of a thermally conductive material.

Clause 55: The RF transceiver system of any of clauses 52-54, wherein each of the first one or more thermal interfaces comprises a thermally conductive material.

Clause 56: The RF transceiver system of any of clauses 52-55, wherein the first module enclosure is configured to hermetically seal first one or more modules within the first peripheral portion.

Clause 57: The RF transceiver system of any of clauses 52-56 further comprising: a lower enclosure coupled to the bottom of the first module enclosure and supporting the first fan, wherein the lower enclosure includes one or more vents through which air may flow.

Clause 58: The RF transceiver system of any of clauses 52-57 further comprising: a second fan configured to cause air to flow through the first cavity and the first one or more heat sinks.

Clause 59: The RF transceiver system of clause 58 further comprising: an upper enclosure supporting the second fan, wherein the upper enclosure includes one or more vents through which air may flow.

Clause 60: The RF transceiver system of clause 59 further comprising: a second module enclosure comprising: a second inner portion comprising a second cavity that is open on a top and a bottom of the second module enclosure portion, and a second peripheral portion that surrounds the second cavity and is configured to support a second one or more modules; a second one or more heat sinks positioned in the second inner portion of the second module enclosure; and a second one or more thermal interfaces on at least one wall of the second inner portion of the second module enclosure and configured to provide thermal coupling between the second one or more heat sinks and the second one or more modules.

Clause 61: The RF transceiver system of clause 60, wherein the first module enclosure is coupled to the second module enclosure to provide an alignment between the first cavity and the second cavity.

Clause 62: The RF transceiver system of clause 61, wherein the upper enclosure is coupled to the top of the second module enclosure.

Clause 63: The RF transceiver system of any of clauses 52-62 further comprising: a plug in an opening between the first one or more heat sinks to direct air flow though the first one or more heat sinks.

Clause 64: A thermal management method of an RF system, the thermal management method comprising: providing one or more heat sinks on an inner portion of the RF system, wherein the inner portion comprises a cavity in a module enclosure portion of the RF system that is open on a top and a bottom of the module enclosure portion; providing thermal coupling, via thermal interfaces on the inner portion of the RF system, between the one or more heat sinks, and one or more modules, wherein the one or more modules include at least one of: a power supply module, an RF module, or a processing module; and providing at least a first fan configured to draw air through the cavity and the one or more heat sinks to draw heat from the one or more modules.

Clause 65: The method of clause 64, wherein the one or more modules are positioned in a peripheral portion of the module enclosure that surrounds the cavity.

Clause 66: The method of clause 65, wherein the one or more modules are hermetically sealed within the peripheral portion of the module enclosure.

Clause 67: The method of any of clauses 64-66, wherein the first fan is positioned in at least one of: an upper portion of the RF system, or a lower portion of the RF system.

Clause 68: The method of any of clauses 64-67, further comprising: at least a second fan configured to draw air through the cavity and the one or more heat sinks to draw heat from the one or more modules.

Clause 69: The method of clause 68, wherein the first fan is positioned in at least one of: an upper portion of the RF system, or a lower portion of the RF system; and wherein the second fan is positioned in a different one of at least one of: the upper portion of the RF system, or the lower portion of the RF system.

Clause 70: The method of any of clauses 64-69, wherein the first and second fans are configured to draw air in a same direction through the cavity.

Clause 71: The method of any of clauses 64-70, wherein the first and second fans are configured to draw air from the lower portion of the RF system to the upper portion of the RF system.

Clause 72: The method of any of clauses 64-71, further comprising: activating at least the first and second fans.

Clause 73: The method of any of clauses 64-72, further comprising: activating at least the first fan.

Clause 74: The method of any of clauses 64-73, further comprising: providing second one or more heat sinks on a second inner portion of the RF system, wherein the second inner portion comprises a second cavity in a second module enclosure portion of the RF system that is open on a top and a bottom of the second module enclosure portion; and providing thermal coupling, via thermal interfaces on the second inner portion of the RF system, between the second one or more heat sinks, and second one or more modules, wherein the second one or more modules include at least one of: a power supply module, an RF module, or a processing module, wherein the second module enclosure portion is coupled to the first module enclosure portion to provide an alignment between the cavity and the second cavity such that at least the first fan is configured to draw air through both the cavity, the one or more heat sinks, the second cavity, and the second one or more heat sinks to draw heat from the one or more modules and the second one or more modules.

Clause 75: The method of clause 74, wherein the second one or more modules are positioned in a peripheral portion of the second module enclosure that surrounds the second cavity.

Clause 76: The method of any of clauses 64-75 further comprising: providing a plug in an opening between the one or more heat sinks to direct air flow though the one or more heat sinks.

Clause 77: A system comprising: a first directional antenna; a first RF module in communication with the first directional antenna; and a first processing module in communication with the first RF module, wherein the system is configured to: receive first RF signals via the first directional antenna and the first RF module; process the first RF signals using the first processing module; generate second RF signals using the first processing module; and transmit the second RF signals via the first RF module and the first directional antenna.

Clause 78: The system of clause 77 further comprising: a second directional antenna; and a second RF module in communication with the second directional antenna, wherein the first processing module is in communication with the second RF module, and wherein the system is further configured to: receive the first RF signals via the second directional antenna and the second RF module.

Clause 79: The system of clause 78, wherein the system is further configured to: transmit the second RF signals via the second RF module and the second directional antenna.

Clause 80: The system of clause 79, wherein the system is further configured to: selectively transmit the second RF signals at varying powers via both the first RF module and first directional antenna, and the second RF module and second directional antenna.

Clause 81: The system of clause 80 further comprising: third and fourth directional antennas; third and fourth RF modules in communication with the respective third and fourth directional antennas; and a second processing module in communication with the third and fourth RF modules, wherein the system is further configured to: receive the first RF signals via the third directional antenna and the third RF module, and via the fourth directional antenna and the fourth RF module.

Clause 82: The system of clause 81, wherein the system is further configured to: transmit the second RF signals via the third directional antenna and the third RF module, and via the fourth directional antenna and the fourth RF module.

Clause 83: The system of clause 82, wherein the system is further configured to: selectively transmit the second RF signals at varying powers via all of the first RF module and first directional antenna, the second RF module and second directional antenna, the third RF module and the third directional antenna, and the fourth RF module and the fourth directional antenna.

Clause 84: The system of clause 81, wherein the first and second processing modules are in communication with one another and configured to coordinate with one another.

Clause 85: The system of any of clauses 77-84, the RF module comprises at least: a multiplexer, a reception amplifier, and a transmission amplifier.

Clause 86: The system of any of clauses 77-85, the processing module comprises at least: a processor, a graphics processing unit (GPU), a software defined radio (SDR) transceiver, and a storage device.

Clause 87: The system of any of clauses 77-86, further comprising: a power supply module in electrical communication with the first RF module and the processing module.

Clause 88: A method of assembling an RF system, the method comprising: providing a module enclosure; providing one or more modules in the module enclosure, the one or more modules comprising at least one of: a power supply module, an RF module, or a processing module; providing one or more heat sinks in an interior portion of the module enclosure and thermally coupled to the one or more modules; coupling upper and lower enclosures to the module enclosure, wherein the upper and lower enclosures each comprise a respective fan; and providing communications links and power connections among the one or more modules.

Clause 89: The method of clause 88 further comprising: coupling one or more antennas to exterior portions of the module enclosure; and providing communications links between the one or more antennas and one or more of the one or more modules.

Clause 90: The method of clause 89 further comprising: mounting the RF system so that the upper enclosure is oriented at a top of the RF system.

Clause 91: A method of assembling an RF system, the method comprising: providing a first module enclosure; providing a first one or more modules in the first module enclosure, the first one or more modules comprising at least one of: a power supply module, an RF module, or a processing module; providing a first one or more heat sinks in an interior portion of the first module enclosure and thermally coupled to the first one or more modules; providing a second module enclosure; providing a second one or more modules in the second module enclosure, the second one or more modules comprising at least one of: a power supply module, an RF module, or a processing module; providing a second one or more heat sinks in an interior portion of the second module enclosure and thermally coupled to the second one or more modules; coupling the first module enclosure to the second module enclosure using a joining enclosure; coupling an upper enclosure to the first module enclosure, wherein the upper enclosure comprises a fan; coupling a lower enclosure to the second module enclosure, wherein the lower enclosure comprises a fan; and providing communications links and power connections among the first and second one or more modules.

Clause 92: The method of clause 91 further comprising: coupling one or more antennas to exterior portions of at least one of the first module enclosure of the second module enclosure; and providing communications links between the one or more antennas and one or more of the first one or more modules and the second one or more modules.

Clause 93: The method of clause 92 further comprising: mounting the RF system so that the upper enclosure is oriented at a top of the RF system.

Clause 94: A computer implemented method for training model to detect RF signals, the computer implemented method comprising, by one or more hardware processors executing program instructions: accessing raw RF signal data; sampling the raw RF signal data; generating a spectrogram based on the sampled raw RF signal data; generate and cause transmission of display instructions configured to display the spectrogram; receive annotation data corresponding to a signal of interest included in the spectrogram; based at least in part on the annotations, generating a first subset of RF signal data corresponding to the signal of interest; and training a machine learning model by inputting, into the machine learning model, the first subset of RF signal data for training the machine learning model.

Clause 95: The computer implemented method of clause 94, wherein the raw RF signal data are collected from one or more broad-bandwidth directional antennas.

Clause 96: The computer implemented method of any of clauses 94-95, further comprising, by the one or more hardware processors executing program instructions: filtering raw RF signal data.

Clause 97: The computer implemented method of clause 96, wherein the filtering includes a complete or partial suppression of one or more aspects of the raw RF signal data, the sampled raw RF signal data, or the first subset of RF signal data.

Clause 98: The computer implemented method of any of clauses 96-97, wherein the filtering comprises removing one or more RF signals from the raw RF signal data that correspond to: (1) one or more base line RF signals, (2) one or more previously-identified RF signals, (3) one or more RF signals already identifiable or otherwise known, (4) RF signals associated with friendly equipment, (5) RF signals associated with equipment that has been manually or automatically flagged as friendly, or (6) a preconfigured whitelist or blacklist.

Clause 99: The computer implemented method of any of clauses 94-98, wherein the sampling of the raw RF signal data comprises sampling the raw RF signal data at a preconfigured timestep.

Clause 100: The computer implemented method of clause 99, wherein the preconfigured timestep is between 0ms and 15 ms.

Clause 101: The computer implemented method of any of clauses 99-100, wherein the preconfigured timestep is further based at least in part on hardware components associated with an RF system implementing the method.

Clause 102: The computer implemented method of any of clauses 94-101, wherein the spectrogram comprises the sampled raw RF signal data as a function of frequency, time, and/or intensity.

Clause 103: The computer implemented method of any of clauses 94-102, wherein the annotation data further correspond to a period of time in which the signal of interest is present on the spectrogram.

Clause 104: The computer implemented method of any of clauses 94-103, wherein the annotation data further correspond to one or more frequencies or frequency bands associated with the signal of interest.

Clause 105: The computer implemented method of any of clauses 94-104, wherein the generating of the first subset of RF signal data includes removal of at least a portion of the raw RF signal data that is not part of the signal of interest.

Clause 106: The computer implemented method of any of clauses 94-105, wherein an output of the trained machine learning model is configured to be predicted classes and probabilities corresponding to the signal of interest that can be used to identify a type of object.

Clause 107: A system comprising: a computer readable storage medium having program instructions embodied therewith; and one or more processors configured to execute the program instructions to cause the system to perform the computer-implemented method of any of clauses 94-106.

Clause 108: A computer program product comprising a computer-readable storage medium having program instructions embodied therewith, the program instructions executable by one or more processors to cause the one or more processors to perform the computer-implemented method of any of clauses 94-106.

Clause 109: A computer implemented method for applying a machine learning model to identify one or more RF signals, the computer implemented method comprising, by one or more hardware processors executing program instructions: accessing raw RF signal data; sampling the raw RF signal data; inputting, into a machine learning model, the sampled RF signal data; and based on an output from the machine learning model, identify a type of object.

Clause 110: The computer implemented method of clause 109, wherein the raw RF signals are collected from one or more broad-bandwidth directional antennas.

Clause 111: The method of any of clauses 109-110, further comprising, by the one or more hardware processors executing program instructions: filtering raw RF signal data.

Clause 112: The method of clause 111, wherein the filtering includes a complete or partial suppression of one or more aspects of the raw RF signal data, the sampled raw RF signal data, or a subset of RF signal data.

Clause 113: The method of any of clauses 111-112, wherein the filtering comprises removing one or more RF signals from the raw RF signal data that correspond to: (1) RF signals associated with friendly equipment, (2) RF signals associated with equipment that has been manually or automatically flagged as friendly, or (3) a preconfigured whitelist or blacklist.

Clause 114: The method of any of clauses 109-113, wherein the sampling of the raw RF signal data comprises sampling the raw RF signal data at a preconfigured timestep.

Clause 115: The method of clause 114, wherein the preconfigured timestep is between 0ms and 15 ms.

Clause 116: The method of any of clauses 114-115, wherein the preconfigured timestep is further based at least in part on hardware components associated with an RF system implementing the method.

Clause 117: The method of any of clauses 109-116, wherein an output of the machine learning model includes predicted classes and probabilities corresponding to one or more RF signals that are identified by the machine learning model.

Clause 118: The method of clause 117, wherein identification of the type of object is further based on bandwidth, channel, signal rate associated with the one or more RF signals that are identified by the machine learning model.

Clause 119: A system comprising: a computer readable storage medium having program instructions embodied therewith; and one or more processors configured to execute the program instructions to cause the system to perform the computer-implemented method of any of clauses 109-118.

Clause 120: A computer program product comprising a computer-readable storage medium having program instructions embodied therewith, the program instructions executable by one or more processors to cause the one or more processors to perform the computer-implemented method of any of clauses 109-118.

Clause 121: A computer implemented method comprising, by one or more hardware processors executing program instructions: collecting, by a first set of antennas, a first set of RF signal data associated with a first object; inputting, into a machine learning model, the first set of RF signal data; based on an output from the machine learning model, identify a type of object associated with the first object; based at least in part on the type of object, generating a second set of RF signals different from the first set of RF signals; and generating and causing transmission, using a second set of antennas, of the second set of RF signals.

Clause 122: The computer implemented method of clause 121, wherein the first set of antennas are directional, broad-bandwidth, or both.

Clause 123: The computer implemented method of any of clauses 121-122, wherein the first set of RF signal data is sampled prior to inputting the first set of RF signal data into the machine learning model.

Clause 124: The computer implemented method of any of clauses 121-123, further comprising, by the one or more hardware processors executing program instructions: determine additional features associated with the first set of RF signals or the type of object.

Clause 125: The computer implemented method of clause 124, wherein the additional features associated with the first set of RF signals include one or more of: bandwidth, channel, and signal rate.

Clause 126: The computer implemented method of any of clauses 121-125, wherein the first set of antennas are the same as the second set of antennas.

Clause 127: The computer implemented method of any of clauses 121-126, wherein the first set of antennas are different from the second set of antennas.

Clause 128: The computer implemented method of any of clauses 121-127, wherein the transmission of the second set of RF signals includes transmission of the second set of RF signals in a direction associated with the first object.

Clause 129: The computer implemented method of any of clauses 121-128, further comprising, by the one or more hardware processors executing program instructions: accessing a preconfigured list of RF frequencies; and prior to transmission of the second set of RF signals, filtering the second set of RF signals to remove one or more RF frequencies based at least in part on the preconfigured list.

Clause 130: The computer implemented method of any of clauses 121-129, further comprising, by the one or more hardware processors executing program instructions: while causing transmission of the second set of RF signals, automatically tracking a location of an object associated with the first set of RF signals.

Clause 131: The computer implemented method of clause 130, wherein the tracking of the location of the object is performed by a radio direction finder.

Clause 132: A system comprising: a computer readable storage medium having program instructions embodied therewith; and one or more processors configured to execute the program instructions to cause the system to perform the computer-implemented method of any of clauses 121-131.

Clause 133: A computer program product comprising a computer-readable storage medium having program instructions embodied therewith, the program instructions executable by one or more processors to cause the one or more processors to perform the computer-implemented method of any of clauses 121-131.

Clause 134: A RF system comprising: a direction finder; a plurality of antennas, wherein: each of the plurality antennas receives or radiates RF signals in a specific direction, the plurality antennas are configured to operate independently, and each of the plurality of antennas is configured operate in coordination with one or more other antennas of the plurality of antennas; and electronic circuitry comprising one or more hardware processors configured to execute programmable instructions to cause the RF system to: track a first RF signal using a first antenna; determine, using data collected from the direction finder or the first antenna: that the first RF signal is being emitted from an object, and a velocity associated with the object; and based at least in part on the determinations, activate a second antenna to continue tracking the first RF signal.

Clause 135: The RF system of clause 134, wherein the first RF signal is detected within a first area corresponding to the first antenna.

Clause 136: The RF system of any of clauses 134-135, wherein tracking the first RF signal is also based at least in part on information received from one or more of: other RF systems, devices, or sensors.

Clause 137: The RF system of any of clauses 134-136, wherein the object is moving relative to the first antenna.

Clause 138: The RF system of any of clauses 134-137, wherein the object is moving out of a first area.

Clause 139: The RF system of any of clauses 134-138, wherein the object is moving into a second area associated with a second antenna.

Clause 140: The RF system of any of clauses 134-139, wherein the one or more hardware processors are further configured to cause the RF system to: based at least in part on the activation of the second antenna, deactivate the first antenna.

Clause 141: The RF system of clause 140, wherein deactivation of the second antenna occurs contemporaneously after activation of the first antenna.

Clause 142: The RF system of any of clauses 140-141, wherein deactivation of the second antenna occurs once a period of time elapses after activation of the first antenna.

Clause 143: The RF system of clause 142, wherein the period of time is preconfigured or automatically configured based on the velocity that was determined.

Clause 144: A computer implemented method comprising, by one or more hardware processors executing program instructions: accessing or receiving detection data associated with a first object, wherein the detected data is collected or generated by one or more: RF systems, sensors, and devices configured to detect RF signals or objects; collecting, using one or more antennas, RF signal data associated with the first object; based at least in part on the detection data and the RF signal data, identifying a first set of RF signal data associated with the first object; identifying, by application of a machine learning model, a type of object associated with the first object; and based at least in part on the type of object, generating and causing transmission, using the one or more antennas, of a second set of RF signals different from the first set of RF signals.

Clause 145: The method of clause 144, wherein the detection data includes a portion of the first set of RF signals.

Clause 146: The method of any of clauses 144-145, wherein the detection data indicates a physical location associated with the first object.

Clause 147: The method of clause 146, wherein the one or more antennas are configured to face a direction corresponding to the physical location.

Clause 148: The method of any of clauses 144-147, wherein the one or more antennas are directional, broad-bandwidth, or both.

Clause 149: The method of any of clauses 144-148, wherein the causing transmission of the second set of RF signals includes transmission of the second set of RF signals in a direction associated with the first object.

Clause 150: The method of any of clauses 144-149, wherein the machine learning model comprises: inputting, into the machine learning model, the first set of RF signal data such that the machine learning model outputs the type of object associated with the first object.

Clause 151: A system comprising: a computer readable storage medium having program instructions embodied therewith; and one or more processors configured to execute the program instructions to cause the system to perform the computer-implemented method of any of clauses 144-151.

Clause 152: A computer program product comprising a computer-readable storage medium having program instructions embodied therewith, the program instructions executable by one or more processors to cause the one or more processors to perform the computer-implemented method of any of clauses 144-151.

Clause 153: A computer-implemented method comprising, by one or more hardware processors executing program instructions: based on a first set of RF signals associated with a first object and an application of a machine learning model that has been trained to identify a type of object associated with the first set of RF signals, generating and causing transmission of, using a first antenna corresponding to a first RF system, a second set of RF signals; determining that the first object is moving out of an area associated with the first antenna and into an area associated with a second antenna; and based on the determination: adjust power supplied to the first antenna; adjust power supplied to the second antenna; and cause transmission, using the second antenna, of the second set of RF signals.

Clause 154: The computer implemented method of clause 153, wherein the transmission of the second set of RF signals by the first antenna or the second antenna includes transmission of the second set of RF signals in a direction associated with the first object.

Clause 155: The computer implemented method of any of clauses 153-154, wherein the determination that the first object is moving out of an associated with the first antenna and into an area associated with a second antenna is performed using at least a direction finder.

Clause 156: The computer implemented method of any of clauses 153-155, wherein the second antenna corresponds to the first RF system.

Clause 157: The computer implemented method of any of clauses 153-156, wherein the second antenna corresponds to a second RF system.

Clause 158: The computer implemented method of any of clauses 153-157, wherein adjusting the power supplied to the first antenna comprises ceasing transmission of the second set of RF signals.

Clause 159: The computer implemented method of any of clauses 153-158, wherein adjusting the power supplied to the second antenna comprises initiating transmission of the second set of RF signals.

Clause 160: The computer implemented method of clause 159, further comprising, by the one or more hardware processors executing program instructions: in response to the initiating of the transmission of the second set of RF signals by the second antenna: reducing power output of the transmission of the second set of RF signals by the first antenna over a period of time; and contemporaneously increasing power output of the transmission of the second set of RF signals by the second antenna over the period of time.

Clause 161: The computer implemented method of clause 160, wherein the second antenna corresponds to the first RF system, and wherein total power used at any moment in time by the first antenna and the second antenna remains constant.

Clause 162: The computer implemented method of any of clauses 153-161, wherein the second antenna corresponds to a second RF system, and wherein total power used at any moment in time by the first antenna and the second antenna remains constant.

Clause 163: A system comprising: a computer readable storage medium having program instructions embodied therewith; and one or more processors configured to execute the program instructions to cause the system to perform the computer-implemented method of any of clauses 155-162.

Clause 164: A computer program product comprising a computer-readable storage medium having program instructions embodied therewith, the program instructions executable by one or more processors to cause the one or more processors to perform the computer-implemented method of any of clauses 155-162.

Clause 165: An RF system comprising: one or more antennas; an RF module electrically connected to the one or more antennas, wherein the RF module comprises a power amplifier; a processing module electrically connected to the RF module, wherein the processing module comprises; a first one or more graphical processing units (GPUs); a computer readable storage medium comprising program instructions and a machine learning model, wherein the machine learning model has been trained to identify a type of object associated with a first set of RF signals; and one or more first processors that are configured to execute the program instructions to cause the first RF system to: receive a data packet comprising software updates; and install the software updates to update functionality of the RF system.

Clause 166: The RF system of clause 165, wherein the one or more antennas are directional, broad-bandwidth, or both.

Clause 167: The RF system of clause 165, wherein the software updates include one or more of: firmware updates corresponding to hardware components of the RF system, updates corresponding to software components utilized by the RF system, and machine learning model updates.

Clause 168: The RF system of clause 165, wherein the data packet is received from a central processing server or another RF system.

Clause 169: A computer-implemented method for applying a machine learning model to identify one or more RF signals, the computer-implemented method comprising, by one or more hardware processors executing program instructions: receiving raw RF signal data through two or more directional antennas, wherein the two or more directional antennas are configured to be selectably activated; sampling the raw RF signal data; inputting, into a machine learning model, the sampled RF signal data; and based on an output from the machine learning model, identify a type of an object.

Clause 170: The computer-implemented method of clause 169, further comprising, by the one or more hardware processors executing program instructions: selecting for activation one or both of the two or more directional antennas for receiving the raw RF signals, wherein the two or more directional antennas comprise broad-bandwidth directional antennas.

Clause 171: The computer-implemented method of clause 170, further comprising, by the one or more hardware processors executing program instructions: determining, based on positioning of the two or more directional antennas, a location of the object.

Clause 172: The computer-implemented method of any of clauses 169-171, further comprising, by the one or more hardware processors executing program instructions: filtering the raw RF signal data.

Clause 173: The computer-implemented method of clause 172, wherein the filtering includes a complete or partial suppression of one or more aspects of the raw RF signal data, the sampled raw RF signal data, or a subset of RF signal data.

Clause 174: The computer-implemented method of any of clauses 172-173, wherein the filtering comprises removing one or more RF signals from the raw RF signal data that correspond to: (1) RF signals associated with friendly equipment, (2) RF signals associated with equipment that has been manually or automatically flagged as friendly, or (3) a preconfigured whitelist or blacklist.

Clause 175: The computer-implemented method of any of clauses 169-174, wherein the sampling of the raw RF signal data comprises sampling the raw RF signal data at a preconfigured timestep.

Clause 176: The computer-implemented method of clause 175, wherein the preconfigured timestep is between 0ms and 15 ms.

Clause 177: The computer-implemented method of any of clauses 175-176, wherein the preconfigured timestep is further based at least in part on hardware components associated with an RF system implementing the method.

Clause 178: The computer-implemented method of any of clauses 169-177, wherein an output of the machine learning model includes predicted classes and probabilities corresponding to one or more RF signals that are identified by the machine learning model.

Clause 179: The computer-implemented method of clause 179, wherein identification of the type of object is further based on bandwidth, channel, signal rate associated with the one or more RF signals that are identified by the machine learning model.

Clause 180: The computer-implemented method of any of clauses 169-179, wherein an output of the machine learning model includes predicted classes and probabilities corresponding to one or more RF signals that are identified by the machine learning model.

Clause 181: The computer-implemented method of any of clauses 169-180 further comprising training the machine learning model, wherein training the machine learning model comprises: based at least in part on annotations corresponding to a signal of interest included in a spectrogram, generating a first subset of RF signal data corresponding to the signal of interest, wherein the spectrogram is generated based on raw RF signal training data; and inputting, into the machine learning model, the first subset of RF signal data for training the machine learning model to identify the signal of interest.

Clause 182: The computer-implemented method of clause 181, wherein the raw RF signal training data are collected from one or more broad-bandwidth directional antennas.

Clause 183: The computer-implemented method of any of clauses 181-182, wherein the spectrogram comprises the raw RF signal training data as a function of frequency, time, and/or intensity.

Clause 184: The computer-implemented method of any of clauses 181-183, wherein the annotations further correspond to a period of time in which the signal of interest is present on the spectrogram.

Clause 185: The computer-implemented method of any of clauses 181-184, wherein the annotations further correspond to one or more frequencies or frequency bands associated with the signal of interest.

Clause 186: The computer-implemented method of any of clauses 181-185, wherein the generating of the first subset of RF signal data includes removal of at least a portion of the raw RF signal training data that is not part of the signal of interest.

Clause 187: A system comprising: a computer readable storage medium having program instructions embodied therewith; and one or more processors configured to execute the program instructions to cause the system to perform the computer-implemented method of any of clauses 169-186.

Clause 188: A computer program product comprising a computer-readable storage medium having program instructions embodied therewith, the program instructions executable by one or more processors to cause the one or more processors to perform the computer-implemented method of any of clauses 169-186.

What is claimed is:

1. A computer-implemented method for applying a machine learning model to identify one or more RF signals, the computer-implemented method comprising, by one or more hardware processors executing program instructions:
   receiving raw RF signal data through two or more directional antennas corresponding to a first RF system, wherein the two or more directional antennas are configured to be selectably activated, wherein the first RF system comprises a processing module, and wherein the processing module comprises a machine learning component;
   sampling, by the processing module of the first RF system, the raw RF signal data to generate sampled RF signal data;
   transmitting the sampled RF signal data to the machine learning component for input into a machine learning model;
   receiving, from the machine learning component, an output from the machine learning model; and
   based on RF signal attributes and the output, identifying a type of an object, wherein the RF signal attributes comprise bandwidth, channel, and signal rate that are each associated with the raw RF signal data.

2. The computer-implemented method of claim 1, further comprising, by the one or more hardware processors executing program instructions:
   selecting for activation one or both of the two or more directional antennas for receiving the raw RF signal data, wherein the two or more directional antennas comprise broad-bandwidth directional antennas.

3. The computer-implemented method of claim 2, further comprising, by the one or more hardware processors executing program instructions:
   determining, based on positioning of the two or more directional antennas, a location of the object.

4. The computer-implemented method of claim 1, further comprising, by the one or more hardware processors executing program instructions:
   filtering the raw RF signal data.

5. The computer-implemented method of claim 4, wherein the filtering includes a complete or partial suppression of one or more aspects of the raw RF signal data, the sampled raw signal data, or a subset of RF signal data.

6. The computer-implemented method of claim 4, wherein the filtering comprises removing one or more RF signals from the raw RF signal data that correspond to: (1) RF signals associated with friendly equipment, (2) RF signals associated with equipment that has been manually or automatically flagged as friendly, or (3) a preconfigured whitelist or blacklist.

7. The computer-implemented method of claim 1, wherein the sampling of the raw RF signal data comprises sampling the raw RF signal data at a preconfigured timestep.

8. The computer-implemented method of claim 7, wherein the preconfigured timestep is between 0ms and 15 ms.

9. The computer-implemented method of claim 7, wherein the preconfigured timestep is further based at least in part on hardware components associated with an RF system implementing the method.

10. The computer-implemented method of claim 1, wherein the output includes predicted classes and probabilities corresponding to a subset of RF signals from the sampled RF signal data.

11. The computer-implemented method of claim 10, wherein identification of the type of object is further based on bandwidth, channel, and signal rate that are each associated with the subset of RF signals.

12. The computer-implemented method of claim 1, wherein an output of the machine learning model includes predicted classes and probabilities corresponding to one or more RF signals that are identified by the machine learning model.

13. The computer-implemented method of claim 1 further comprising training the machine learning model, wherein training the machine learning model comprises:
   based at least in part on annotations corresponding to a signal of interest included in a spectrogram, generating a first subset of RF signal data corresponding to the signal of interest, wherein the spectrogram is generated based on raw RF signal training data; and
   inputting, into the machine learning model, the first subset of RF signal data for training the machine learning model to identify the signal of interest.

14. The computer-implemented method of claim 13, wherein the spectrogram comprises the raw RF signal training data as a function of frequency, time, and/or intensity.

15. The computer-implemented method of claim 13, wherein the annotations further correspond to a period of time in which the signal of interest is present on the spectrogram.

16. The computer-implemented method of claim 13, wherein the annotations further correspond to one or more frequencies or frequency bands associated with the signal of interest.

17. The computer-implemented method of claim 13, wherein the generating of the first subset of RF signal data includes removal of at least a portion of the raw RF signal training data that is not part of the signal of interest.

18. A system comprising:
   a computer readable storage medium having program instructions embodied therewith; and
   one or more processors configured to execute the program instructions to cause the system to perform the computer-implemented method of claim 1.

19. A computer program product comprising a non-transitory computer-readable storage medium having program instructions embodied therewith, the program instructions executable by one or more processors to cause the one or more processors to perform the computer-implemented method of claim 1.

20. The computer-implemented method of claim 1, wherein the raw RF signal data is sampled at a rate that is based on at least one of: (1) a temperature of the one or more hardware processors, or (2) a quantity of raw RF signal data.

* * * * *